United States Patent
Neuer, III et al.

(10) Patent No.: US 10,880,437 B1
(45) Date of Patent: *Dec. 29, 2020

(54) TRANSFERRING AN INTERACTION BETWEEN AN AGENT AT A CONTACT CENTER AND A PARTY FROM A FIRST CHANNEL OF COMMUNICATION TO A SECOND CHANNEL OF COMMUNICATION

(71) Applicant: Noble Systems Corporation, Atlanta, GA (US)

(72) Inventors: Ellwood I. Neuer, III, Newnan, GA (US); Christopher S. Haggerty, Atlanta, GA (US); Karl H. Koster, Sandy Springs, GA (US)

(73) Assignee: Noble Systems Corporation, Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/575,857

(22) Filed: Sep. 19, 2019

Related U.S. Application Data

(63) Continuation of application No. 15/791,512, filed on Oct. 24, 2017, now Pat. No. 10,523,816.

(51) Int. Cl.
*H04M 3/51* (2006.01)
*H04M 3/42* (2006.01)
(Continued)

(52) U.S. Cl.
CPC ..... *H04M 3/5183* (2013.01); *H04M 3/42059* (2013.01); *H04M 3/5133* (2013.01);
(Continued)

(58) Field of Classification Search
CPC ......... H04M 3/5233; H04M 2203/551; H04M 3/5191; H04M 3/5232; H04M 3/5183;
(Continued)

(56) References Cited

U.S. PATENT DOCUMENTS

| | | |
|---|---|---|
| 5,621,789 A | 4/1997 | McCalmont |
| 6,332,154 B2 | 12/2001 | Beck et al. |

(Continued)

FOREIGN PATENT DOCUMENTS

WO    WO 02/09406    1/2002

OTHER PUBLICATIONS

U.S. Appl. No. 15/248,013 Office Action, dated Mar. 12, 2018, 31 pages.

(Continued)

*Primary Examiner* — Ahmad F. Matar
*Assistant Examiner* — Kharye Pope

(57) ABSTRACT

Various embodiments of the invention provide methods, systems, and computer program products for changing an interaction taking place between an agent and a party from a first channel of communication to a second channel of communication. A communication assembly comprising the interaction is linked to a first communication session currently being held between the agent and party using the first channel of communication. A second communication session to be held between the agent and party using the second channel of communication at a future time is reserved and linked to the communication assembly. The first communication session is then terminated and at the future time, a communication involving the party and using the second channel of communication is established. Accordingly, the communication is linked with the second communication session and routed to the agent so that the agent can interact with the party over the second channel of communication.

20 Claims, 27 Drawing Sheets

(51) Int. Cl.
*H04M 3/523* (2006.01)
*H04L 12/66* (2006.01)

(52) U.S. Cl.
CPC ....... *H04M 3/5231* (2013.01); *H04M 3/5232* (2013.01); *H04M 3/5233* (2013.01)

(58) Field of Classification Search
CPC ........... H04M 3/42068; H04M 3/5175; H04M 2203/408; H04M 3/523; H04M 3/5238; H04M 3/5133; H04M 3/5235; H04M 7/003; H04M 3/42221; H04M 3/42059; H04M 3/5141; H04M 2201/60; H04M 3/2218; H04L 67/306; H04L 67/141; H04L 51/04; H04L 51/16; H04L 67/14; H04L 41/5051; H04L 51/02; H04L 67/22; H04L 12/1831
USPC ............ 379/265.09, 265.12, 265.02, 207.02, 379/265.11, 265.13; 370/352; 705/304
See application file for complete search history.

(56) References Cited

U.S. PATENT DOCUMENTS

| | | | |
|---|---|---|---|
| 6,389,132 B1 | 5/2002 | Price | |
| 6,704,409 B1 | 3/2004 | Dilip et al. | |
| 6,771,760 B1 | 8/2004 | Vortman et al. | |
| 6,934,381 B1 | 8/2005 | Klein et al. | |
| 6,978,136 B2 | 12/2005 | Jenniges et al. | |
| 7,308,093 B2 | 12/2007 | Annadata et al. | |
| 7,315,616 B2 | 1/2008 | Annadata et al. | |
| 7,337,158 B2 | 2/2008 | Fratkina et al. | |
| 7,353,182 B1 | 4/2008 | Missinhoun et al. | |
| 7,373,410 B2 | 5/2008 | Monza et al. | |
| 7,418,094 B2 | 8/2008 | Golitsin et al. | |
| 7,539,295 B1 * | 5/2009 | Amir | H04M 3/5183 |
| | | | 379/265.01 |
| 7,542,561 B1 | 6/2009 | Jabbour | |
| 7,606,909 B1 | 10/2009 | Ely et al. | |
| 8,855,292 B1 * | 10/2014 | Brunson | H04M 3/523 |
| | | | 379/266.01 |
| 8,873,737 B2 | 10/2014 | Moran et al. | |
| 8,929,536 B2 | 1/2015 | Mathur et al. | |
| 8,958,542 B1 | 2/2015 | Kaufman | |
| 9,106,724 B1 * | 8/2015 | Harris | H04L 51/16 |
| 9,292,861 B2 | 3/2016 | Spievak et al. | |
| 9,407,768 B2 | 8/2016 | Conway et al. | |
| 9,742,916 B1 | 8/2017 | Christopher | |
| 10,142,476 B1 | 11/2018 | Chen | |
| 2002/0060988 A1 | 5/2002 | Shtivelman et al. | |
| 2003/0185379 A1 * | 10/2003 | O'Connor | H04L 51/14 |
| | | | 379/265.02 |
| 2004/0218749 A1 * | 11/2004 | Shaffer | H04L 65/1096 |
| | | | 379/265.02 |
| 2005/0100159 A1 * | 5/2005 | Fink | H04M 3/5191 |
| | | | 379/265.11 |
| 2006/0167949 A1 * | 7/2006 | Berger | G06F 16/10 |
| 2006/0245577 A1 | 11/2006 | Mancuso et al. | |
| 2006/0262921 A1 | 11/2006 | Eppel et al. | |
| 2007/0206584 A1 * | 9/2007 | Fulling | H04L 67/327 |
| | | | 370/356 |
| 2007/0280460 A1 | 12/2007 | Harris et al. | |
| 2008/0037764 A1 | 2/2008 | Lee et al. | |
| 2008/0118051 A1 | 5/2008 | Odinak et al. | |
| 2008/0175374 A1 | 7/2008 | Lauridsen et al. | |
| 2009/0245500 A1 | 10/2009 | Wampler | |
| 2010/0058234 A1 | 3/2010 | Salame et al. | |
| 2010/0325216 A1 | 12/2010 | Singh et al. | |
| 2011/0153378 A1 | 6/2011 | Costello et al. | |
| 2011/0158398 A1 * | 6/2011 | Kannan | H04M 3/5191 |
| | | | 379/265.09 |
| 2011/0187547 A1 | 8/2011 | Kweon | |
| 2013/0051545 A1 | 2/2013 | Ross et al. | |
| 2013/0060871 A1 | 3/2013 | Downes et al. | |
| 2013/0094647 A1 | 4/2013 | Mauro et al. | |
| 2013/0129074 A1 * | 5/2013 | Peterson | H04M 3/5141 |
| | | | 379/265.09 |
| 2013/0173687 A1 | 7/2013 | Tuchman | |
| 2013/0282844 A1 | 10/2013 | Logan et al. | |
| 2014/0089822 A1 | 3/2014 | Wu et al. | |
| 2014/0122482 A1 * | 5/2014 | Auger | G06F 16/185 |
| | | | 707/736 |
| 2014/0140495 A1 * | 5/2014 | Ristock | H04M 3/5232 |
| | | | 379/265.05 |
| 2014/0161249 A1 | 6/2014 | Tolksdorf | |
| 2014/0164530 A1 * | 6/2014 | Stoertenbecker | H04L 12/1822 |
| | | | 709/206 |
| 2014/0279718 A1 | 9/2014 | Southey et al. | |
| 2014/0282083 A1 | 9/2014 | Gaetano | |
| 2014/0282125 A1 | 9/2014 | Duneau | |
| 2014/0307863 A1 | 10/2014 | Snyder et al. | |
| 2015/0039521 A1 * | 2/2015 | Schubert | G06Q 30/016 |
| | | | 705/304 |
| 2015/0049869 A1 | 2/2015 | Petrovykh et al. | |
| 2015/0056964 A1 * | 2/2015 | Williams | G06Q 10/10 |
| | | | 455/414.1 |
| 2015/0163361 A1 | 6/2015 | George | |
| 2015/0170153 A1 * | 6/2015 | Sloan | G06Q 30/016 |
| | | | 705/304 |
| 2015/0289130 A1 | 10/2015 | Aleksin et al. | |
| 2015/0334233 A1 | 11/2015 | OConnor et al. | |
| 2016/0034930 A1 | 2/2016 | Verschoor et al. | |
| 2016/0099892 A1 | 4/2016 | Palakovich et al. | |
| 2016/0150084 A1 | 5/2016 | Hickey et al. | |
| 2016/0212266 A1 | 7/2016 | Soundar | |
| 2016/0344869 A1 | 11/2016 | Patel | |
| 2016/0349960 A1 | 12/2016 | Kumar | |
| 2016/0381091 A1 | 12/2016 | OConnor et al. | |
| 2017/0034353 A1 * | 2/2017 | Bell | H04W 12/06 |
| 2017/0118341 A1 | 4/2017 | Kelly et al. | |
| 2017/0230505 A1 * | 8/2017 | McCarthy-Howe | H04L 51/18 |
| 2018/0063325 A1 | 3/2018 | Wilcox et al. | |
| 2018/0084111 A1 | 3/2018 | Pirat et al. | |
| 2018/0115644 A1 | 4/2018 | Al-Khaja | |
| 2018/0376003 A1 | 12/2018 | Shinseki | |

OTHER PUBLICATIONS

U.S. Appl. No. 15/393,509 Office Action dated Feb. 13, 2018, 21 pages.
Notice of Allowance Received for U.S. Appl. No. 15/485,568 dated Apr. 25, 2018.
Office Action Received for U.S. Appl. No. 15/393,509 dated May 18, 2018.
Office Action Issued for U.S. Appl. No. 15/248,013 dated Jun. 29, 2018.
Office Action Received for U.S. Appl. No. 15/393,509 dated Feb. 15, 2019.
Office Action Received for U.S. Appl. No. 15/248,013 dated Mar. 7, 2019.
Notice of Allowance Received for U.S. Appl. No. 16/008,243 dated Jul. 17, 2019.
Notice of Allowance Received for U.S. Appl. No. 15/393,509 dated Jul. 24, 2019.
Notice of Allowance Received for U.S. Appl. No. 15/248,013 dated Sep. 18, 2019.

* cited by examiner

TRANSFERRING AN INTERACTION BETWEEN AN AGENT AT A CONTACT CENTER AND A PARTY FROM A FIRST CHANNEL OF COMMUNICATION TO A SECOND CHANNEL OF COMMUNICATION

CROSS REFERENCE TO RELATED APPLICATIONS

This application is a continuation of U.S. patent application Ser. No. 15/791,512, filed on Oct. 24, 2017, of which the entire contents are incorporated by reference for all that they teach.

BACKGROUND

Early call centers were structured around handling voice calls that may have been inbound, outbound, or combination of both. While voice calls are a common way of engaging customers, modern call centers now handle many other types of communication channels. For instance, many call centers can support other various channels such as email, texts (short messaging service ("SMS"), multimedia messaging service ("MMS")), video chat, social media, fax, and web-based chat. Accordingly, many call centers managing these additional channels have become to be referred to as "contact centers" to reflect that they support many different modes of engaging customers, as opposed to only handling voice calls. Thus, today a party may engage in an interaction with a contact center using any one of a number of different channels of communication.

However, once a party and an agent at a contact center begin to interact over a particular channel of communication, circumstances may change so that the party may no longer be able to continue to interact with the agent although the party and agent are not finished with the interaction. For example, a party may be involved in a Web chat on his home PC with an agent about a certain product being advertised on a web site and may need to leave for work although the party is not finished chatting with the agent. Normally, the party would have no option but to end the chat and contact the center at a later time via a new chat or through some other channel of communication to continue the discussion on the product. In this instance, the party is not likely to be connected with the same agent he was conversing with before on the chat and the party may then have to spend time with the new agent explaining his previous chat with the first agent in order to bring the new agent up to speed so that the party and new agent can continue the conversation on the product. Accordingly, this can be quite frustrating for the party since the party has to spend time rehashing over what has already been discussed in the previous chat.

Therefore, a need in the art exists that would allow for a party engaged in an interaction with a contact center to be able to transfer the interaction from a first channel of communication to a second channel of communication. For example, a party engaged in a voice call with an agent of a contact center may wish to end the voice call but continue the engagement with the agent via text messaging. In this instance, it would be helpful if the agent were able to end the voice call with the party and then initiate text messaging with the party to continue the engagement. In addition, it would be helpful in many instances if the multiple communication channels being used by the agent to engage the party could be "linked" so that the contact center is aware that the agent is engaging with a single party by using the multiple channels of communication. It is with respect to these considerations and others that the disclosure herein is presented.

SUMMARY

In general, embodiments of the present invention provide computer program products, methods, systems, apparatus, and computing entities for changing an interaction taking place between an agent in a contact center and a party from a first channel of communication to a second channel of communication. In various embodiments, a communication assembly comprising the interaction taking place between the agent and the party is linked to a first communication session comprising a logically related series of one or more communications currently being held between the agent and the party using the first channel of communication. For example, the communication assembly may entail the agent and the party conducting an interaction to discuss a product over a series of Web chat messages that make up the first communication session. Here, the first channel of communication being a Web chat.

As the agent and party exchange Web chat messages, the party may suddenly need to end the Web chat session although the two have not completed their conversation. Therefore, the agent and party may wish to continue their conversation over a second channel of communication such as text messaging. Here, the second channel of communication may be different than the first channel of communication. Accordingly, a new communication session is reserved for the text messaging and is linked to the communication assembly. Here, the reserved communication session comprises a logically related series of one or more communications to be held between the agent and the party using the second channel of communication at a future time.

The agent and party end the Web chat session. That is to say, the first communication session is terminated prior to the future time. And then in particular embodiments, a notification is received at the future time of a communication involving the party at a communications handler system. This particular communication using the second channel of communication and a contact for the party. Accordingly, the communication assembly is identified based on at least one of the party and the contact and in consequence, the second communication session is identified. At that point, the communication involving the party is linked with the second communication session and is routed to the agent so that the agent can now interact with the party over the second channel of communication. That is to say, the agent can now interact with the party using text messaging.

In particular embodiments, the communication assembly is placed in a state of suspension upon reserving the second communication session and terminating the first communication session and is then placed in a state of active once the received communication is linked with the second communication session and routed to the agent. In addition, in particular embodiments, the routing of the communication to the agent is carried out by determining a current number of sessions the agent is actively engaged in is less than a maximum number of sessions the agent is authorized to be actively engaged in and/or a current number of session the agent is actively engaged in using the second channel of communication is less than a maximum number of sessions the agent is authorized to be actively engaged in using the second channel of communication. Furthermore, in particular embodiments, the routing of the communication to the agent is carried out by determining a proficiency level for the agent in handling communications using the second channel of communication is over a predefined proficiency level for the second channel of communication.

Finally, in various embodiments, an icon may be displayed on a workstation being used by the agent for the second communication session to alert the agent that the communication has been routed to the agent. In particular embodiments, the icon is configured to be selected by the agent to cause information on the communication to be displayed on the workstation. In addition, in particular embodiments, the icon is displayed along with a second icon for the first communication session to demonstrate the first communication session and the second communication session are part of the same communication assembly.

This Summary is provided to exemplify concepts at a high level form that are further described below in the Detailed Description. This Summary is not intended to identify key or essential features of the claimed subject matter, nor is it intended that this Summary be used to limit the scope of the claimed subject matter. Furthermore, the claimed subject matter is not limited to implementations that address any or all disadvantages noted in any part of this disclosure.

BRIEF DESCRIPTION OF THE DRAWINGS

Reference will now be made to the accompanying drawings, which are not necessarily drawn to scale, and wherein:

FIG. 10 illustrates a graphical user interface ("GUI") used in various embodiments by an agent engaged in various assemblies involving multiple sessions.

FIGS. 16A-C illustrate the current session information session for a text session.

DETAILED DESCRIPTION

Figure 1:
FIG. 1 illustrates a communication architecture used in accordance with various embodiments of the present invention.

Various embodiments for practicing the technologies disclosed herein are described more fully hereinafter with reference to the accompanying drawings, in which some, but not all embodiments of the technologies disclosed are shown. Indeed, the embodiments disclosed herein are provided so that this disclosure will satisfy applicable legal requirements and should not be construed as limiting or precluding other embodiments applying the teachings and concepts disclosed herein. Like numbers in the drawings refer to like elements throughout.

Channels of Communication

As mentioned, agents in call centers have traditionally interacted with customers one at a time using a voice channel. However, many call centers today have evolved into contact centers that allow agents to interact with customers using many different channels of communication. These channels of communication may include, for example, voice calls, video chats/calls, emails, web-based chats, texts (SMS and MMS), fax, and social media. However, the principles and technologies described herein are illustrated using voice calls, emails, web-based chats, and texts. Accordingly, reference to "web-based chat" is also sometimes referred to as "Web chat" or simply "chat." In addition, "SMS text" and "MMS text" is also simply referred to as "text." With that said, several aspects of using these various channels of communication is noted.

Firstly, a voice call is typically intolerant of delay. By "delay," reference is made to the willingness of a party on a call to tolerate delay in receiving a response during a conversational dialogue. Typically, a party conversing with an agent on a call expects the agent to respond in real-time, e.g., within a few seconds. For example, if a party asks an agent a question while conversing, the agent is expected to provide the party with a timely response. While an agent may not always readily know the answer to a question during a call and he or she may need to perform some type of inquiry offline to obtain the answer, the agent is nevertheless expected to inform the party of this situation in a timely manner to set the party's expectation. That is to say, a response of some sort is expected to be provided in real-time in response to a party's verbal question.

Furthermore, an incoming voice call typically requires a near immediate response upon receipt. Thus, many contact centers are designed to automatically route an inbound call or an answered outbound call to an agent, or if an agent is not available, play an announcement to the party on the call and place the call on hold before transferring the call to an agent when one becomes available.

In contrast, non-voice (or "data-oriented") communications typically do not demand such immediate response by agents. For instance, a chat communication typically occurs as a result of a party interacting with a website selecting a chat function provided on the site. Here, the party normally interacts with an agent by typing messages on a keyboard connected to some type of computing device such as a personal computer. However, the party involved in the chat communication with the agent does not normally have an expectation that responses from the agent will occur as quickly as responses received during a voice call. That is to say, a party involved in a chat with an agent typically views a delay of a few seconds up to a few minutes occurring before receiving a response to a chat message as acceptable.

Likewise, a party's expectations during a text communication are typically the same. Here, a text communication normally occurs as a result of a party interacting with a hand-held device and selecting the texting capability on the device. The party interacts with an agent by typing text messages on a keyboard provided on the touch screen of the device and the text messages between the party and agent are generally exchanged using rather quick transmission times. Although the party may expect a fairly rapid response to each of his or her text messages, like during a chat, he or she does not typically expect a response quite as rapidly as in a voice call. Instead, a party involved in a text communication with an agent normally views a delay of several seconds up to several minutes occurring before receiving a response to a text message as acceptable, depending on the context of the text message.

Finally, a party's expectations during an email exchange may be more tolerant with respect to delay in relation to other types of communication channels. An email communication normally involves a party opening an email application on a device and composing an email that is then sent to an addressed recipient. Therefore, an email communication between a party and agent may involve the party and/or the agent drafting and sending one or more emails to each other over a time period. Generally speaking, an email is typically not transmitted as fast as text or chat messages and may take a minute (or several minutes) to be received by a recipient. Further, an email requires a recipient to open his or her email application and select the email to view it. Contrast this to chat or text, which is normally displayed to a party without requiring the party to make any effort to do so. Furthermore, an email is normally used for composing longer messages than are composed in text or chat messages. Thus, a party engaged in an email exchange with an agent normally views a delay of minutes up to possibly hours in length occurring before receiving a response to an email as acceptable, depending on the context of the email exchange.

Of course, the general expectations of parties involved in communications using the above-discussed channels may be different depending on the circumstances surrounding the communications. For example, a party engaged in a voice call with an agent may request information from the agent that is needed during the voice call and the agent may provide the party with the information via an email. In this instance, the party would expect to receive the email with the information in a short amount of time (e.g., one to two minutes) so that the information is available during the phone call. Therefore, in various circumstances, different levels of expectation may exist based on the context of the interactions being conducted between parties and agents.

The level of agent interaction that is required or expected for communications has a bearing on how many communications an agent may handle at any given time. Since a voice call is highly interactive, an agent can typically handle only one voice call at a time. That is to say, it is impractical to expect an agent to be able to handle two voice calls at the same time and converse with both parties on the calls. Even if an agent were able to put one party on hold while talking to the other, the agent's attempt at a back-and-forth conversation between the two parties would likely result in a poor experience for at least one party, if not both. However, since a chat and a text typically require less immediate interaction than a voice call, it may be possible for an agent to handle multiple chat or text interactions simultaneously. The same can be said for email since it is frequently considered to require less interaction than other channels of communication. In fact, in many instances, an agent may be able to handle combinations of communications simultaneously such as, for example, a voice call and a chat, a voice call and an email, or a voice call and two texts.

Furthermore, different agents possess different skill levels with respect to their multi-tasking abilities. Thus, different agents are able to handle different combinations of communication interactions. For example, a first agent may be able to handle a voice call and several non-voice channels, such as a chat and two emails, at virtually the same time while a second agent is only able to handle a voice call and one non-voice channel at virtually the same time. In addition, the number of interactions an agent can handle may also be impacted by the nature of the information being conveyed for each of the interactions. That is to say, an interaction that involves conveying basic information (such as operating hours of a store) may provide an instance where it is easier for an agent to multi-task during the interaction as opposed to an interaction that involves conveying complex troubleshooting advice. Thus, an important aspect in using various channels of communication in many circumstances is managing the number and type of channels that can be handle at any given time on a per-agent basis.

Communication Architecture

As mentioned, an object of the current invention is to facilitate an agent in a contact center to be able to continue to interact with a party by changing to a different channel of communication. For instance, an agent and a party may be conversing on a Web chat that the party initiated on a website about a product advertised on the website. In this instance, the party is conducting the Web chat with the agent on the party's desktop computer at home. While the party and agent are chatting, the party may realize that he has to leave his home for an appointment although the party and the agent are not done chatting. Accordingly, it would be helpful if the party could continue his conversation with the agent during his commute to his appointment. However, the party is not able to continue the current Web chat since the chat is taking place over the party's desktop computer and he cannot take the computer with him to the appointment. Therefore, it would be helpful if the party could continue the conversation with the agent on a different device while using a different channel of communication.

However with that said, there may be times where a party may wish to continue an interaction with a contact center at a later time using the same, or a different, channel of communication. For instance, returning to the example, the party may not wish to continue the conversation with the agent during his commute to this appointment but instead he may wish to continue the Web chat with the agent at a later time. Therefore, another object of the current invention is to facilitate an agent in a contact center to be able to continue to interact with a party using a particular channel of communication, suspend the interaction for a particular time period, and then resume the interaction with the party at a later time using the same, or a different, channel of communication.

Thus, various embodiments of the invention involve using a communication architecture that facilitates the "linking" of multiple communication channels that are used during a single interaction between a party and an agent. One such architecture is shown in FIG. 1 and comprises of a hierarchical structure that includes: a communication assembly 110; one or more communication sessions 120, 125; one or more communication channels 130, 135; and one or more communication instances 140, 141, 142, 145, 146. Here, the particular architecture shown in FIG. 1 is specific with respect to the example involving the party having a conversation with the agent about the advertised product over a Web chat and continuing the conversation over a different channel of communication, such as text. However, with that said, the hierarchical components of the architecture are common in various embodiments with respect to other communication interactions occurring between agents and parties. Therefore, the reader should understand the particular architecture shown in FIG. 1 is provided to help facilitate the discussion of such an architecture and should not be construed to limit the scope of the invention.

Turning now to FIG. 1, the top component in the hierarchy of the communication architecture is a communication assembly (or simply an "assembly") 110. A communication assembly 110 refers to an interaction that takes place between a party and a contact center over one or more channels of communication for a specific purpose that may involve an agent or a group of agents. For instance, in the example, the assembly 110 refers to the interaction that takes place between the party and the agent to discuss the product advertised on the website. Generally speaking, the beginning of a communication assembly 110 requires the recognition of a new communication (e.g., a Web chat) occurring that does not involve a party who is actively engaged in another assembly 110 that is currently taking place or an assembly that has been suspended. For instance, in the example, the party may have initiated the interaction with the agent by selecting an option on the website to begin a chat with an agent. Here, the contact center recognizes a new assembly 110 is taking place because the party is not actively engaged in another assembly 110 that is currently taking place or an assembly that has been suspended. As discussed in more detail below, such recognition may occur in different ways depending on the embodiment. For instance, the agent fielding the chat with the party may indicate the chat is part of a new assembly 110. While in another instance, the contact center (e.g., some component within the center such as a communications handler) may automatically recognize the chat is part of a new assembly 110 by querying the assemblies 110 currently taking place or suspended and determining the party on the chat is not actively engaged in any of the assemblies 110 currently taking place or suspended.

The agent involved may also signal the end of an assembly 110 in particular embodiments. While in other embodiments, the contact center (e.g., some component within the center) may recognize the end of an assembly 110. For instance, a component within the contact center may recognize that a particular assembly 110 no longer has any active communication channels associated with the assembly 110 or that a particular assembly 110 has not had a communication associated with the assembly 110 occur over a particular time period. Here, the contact center may use a timer to track the time between communications occurring for an assembly 110 and determine the assembly 110 has ended upon the timer expiring without a new communication occurring for the assembly 110.

The next component found in the hierarchy of the communication architecture shown in FIG. 1 is a communication session 120, 125. A communication session (or simply "session") 120, 125 refers to a logically related series of one or more communications between an agent and a party using a specific channel of communication 130, 135. Thus, in some instances, a session 120, 125 may constitute a single communication between an agent and a party and not necessarily a series of communications. In addition, a communication session 120, 125 may be initiated by either a party or an agent and may include a series of inbound communications, a series of outbound communications, or a combination of both.

Within the hierarchy, each communication session 120, 125 for the assembly 110 has a single, related channel of communication 130, 135. Specifically, this is the channel of communication 130, 135 used to conduct the communication session 120, 125. For instance, returning to the example, the first communication session 120 found in the assembly 110 involving the party and agent conversing on the product advertised on the website is the Web chat initiated by the party. Here, the associated channel of communication 130 is a Web chat. Likewise, the second communication session 125 associated with the assembly 110 is the texting that the agent and party switch to continue their conversation on the product while the party is traveling to his appointment. Here, the associated channel of communication 135 is text.

Next, each communication session 120, 125 also has one or more associated communication instances 140, 141, 142, 145, 146. A communication instance 140, 141, 142, 145, 146 refers to a single communication during a communication session 120, 125. Again, returning to the example, the Web chat session 120 between the party and the agent includes an instance 140, 141, 142 that constitutes a single chat message sent from the party to agent or from the agent to the party during the Web chat. Although depending on the embodiment, an instance may encompass more than one chat message. For instance, in particular embodiments, an instance may encompass a single exchange of chat messages between the party and the agent or include the entire exchange of chat messages between the party and the agent. With respect to the text session 125 in the example, this session 125 includes a first text instance 145 that occurs when the agent initiates contact with the party by sending an initial text message to the party and a second text instance 146 that occurs when the party replies with a response text message to the agent.

Communication States

In conjunction with the communication architecture described above, a communication assembly in various embodiments is considered to be in some "state" at any given time over the course of the assembly. In many instances, the state of an assembly depends on the status of the related communication session(s) being carried out for the assembly. For instance, an assembly that has started and currently has at least one related communication session that the party is actively engaged with is said to be in an "active" state (or is said to be an "active assembly"). Here, the party involved with the assembly is still actively engaged in some type of communication related to the purpose of the assembly. For instance, returning to the example, the assembly 110 is considered to be in an active state during the time the party and the agent converse on the Web chat and also during the time they converse via the text messages.

Furthermore, in particular embodiments, an assembly may also be in a "suspended" or "parked" state. This state represents a period of time in which the assembly has not ended, however the assembly does not currently have a related communication session that the party is actively engaged with. For instance, returning to the example, the party may inform the agent to wait ten minutes before initiating the text session with the party so that the party has time to log off his computer and wait for an Uber® to pick him up outside his home. During this ten minutes, the party is not actively engaged in the Web chat session and the text session has not yet begun. However, the assembly has not ended. Therefore, the assembly is placed in a suspended state until the text session begins, at which point the assembly is placed back in an active state.

As already mentioned, the beginning of a communication assembly usually involves the recognition of a new communication occurring that does not involve a party who is actively engaged in another assembly that is currently taking place. Thus, in various embodiments, an assembly is placed in the active state upon the recognition and creation of a new assembly. In addition, the corresponding communication that signaled the start of the new assembly and involved party are "linked" to the assembly. Here, the assembly typically stays in the active or suspended state until all of the associated communication sessions for the assembly have wrapped up and are ended so that no further communication is to take placed between the party and the contact center for the purpose that initiated the assembly (that initiated the communication that started the assembly). At this point, the assembly is placed in an "inactive" or "terminated" state.

Similar to assemblies, communication sessions are also considered to be in different "states" in various embodiments depending on the status of the related series of communication instances being carried out for the sessions. For instance, a voice call session may be in a "connected" state, reflecting that the voice call is active with a party on the call. Similarly, a non-voice communication session that has started and is still actively involved in related communications is said to be in an "active" state (or is said to be an "active session"). In particular embodiments, the ending of a session signals the session is no longer in a connected or active state. For instance, returning to the example, the Web chat is considered to be in an active state while the party and agent are engaged in dialogue on the chat. However, once the Web chat session is disconnected, the chat is no longer considered to be in an active state. Instead, such a communication session is considered to be in an "inactive" or "terminated" state. Furthermore, as discussed further herein, when an assembly is placed in a "suspended" state, a channel of communication may be reserved that is used at a later time to communicate with the involved party and resume the assembly. A session that is to be conducted using the selected channel of communication at a later time is said to be in a "reserved" state until communication is initialized using the selected channel of communication and the assembly is resumed.

Accordingly, sessions may also be placed in other states in particular embodiments such as a "pending" state that indicates when a new session involving a non-voice communication channel has been assigned to an agent but the agent has not yet acknowledged the session. For instance, an initial text message may be received by a contact center, triggering a new assembly and session. The contact center may then go through a process to identify an agent to handle the new assembly and session and accordingly, may forward the text message to the agent. At this point, the new session is considered to be in a pending state until the agent acknowledges receipt of the text message by taking some action such as responding to the text message. Once the agent acknowledges the communication session, the state of the session is changed to active. Similarly, a new session involving a voice communication channel (a voice call) that has not yet been acknowledged by an agent (answered by an agent) is considered in the "ringing" state.

Another state for sessions that is found in various embodiments is an "attention needed" state. This state indicates when a session involving a non-voice communication channel is waiting on an agent to respond in some fashion. For example, a party involved in a chat communication session may have sent a chat message that has not yet been answered by an agent. In this instance, the chat session is considered to be in the attention needed state.

Finally, another state for sessions found in various embodiments is a "paused"/"hold" state. This state indicates when a session has been momentarily paused, but has not been ended. For example, an agent may be engaged with a party in a voice call and may place the call on hold for a couple of minutes while the agent gathers some information for the party. While the call is on hold, the associated session is considered to be in a hold state. Other states may be used to indicate the current status of a communication session in other embodiments as those of ordinary skill in the art can envision in light of this disclosure.

With that said, determining the beginning and ending of a communication session can be important with respect to setting the states for the session. The beginning and ending of a communication session involving a voice call is usually easy to identify. In these instances, the beginning of such a session is typically marked by the ringing of a device for the voice call and the ending of the session is typically marked by the terminating (disconnecting) of the voice call. The series of verbal exchanges during the call (communication instance) are inherently associated with the session because they occur on the same telephone call. Thus, a voice call can be viewed as a connection-oriented communication session in that the beginning and ending of the connection of the call mark the beginning and ending of the session and the verbal exchanges that occur during the call mark the related communication instance.

The beginning and ending of a communication session involving a chat is also usually easy to identify. Here, the beginning of such a session is typically marked by a party interacting with a website and requesting a chat or accepting an invitation to begin a chat with an agent. For instance, the party may open a "chat window" on the party's computer by selecting a "chat link" on the website or by selecting an "OK" button on an "invitation window" appearing on the party's computer inviting the party to begin a chat with an agent. The agent involved in the session may mark (confirm) when the chat session has ended or the chat window being closed may mark when the chat session has ended. While in some instances, a chat session may be considered as having ended even if the chat window has not been closed by the party or agent. For example, a timeout may occur after a time period has passed in which the party has not further engaged with the chat session and the chat window is closed automatically. A chat session is typically considered a connection-oriented communication session although such a session may use a connectionless underlying communication service.

On the other hand, a communication session involving text(s) is typically considered a connectionless communication session because each text message is potentially a 'stand-alone' communication instance. Here, delineating the beginning and ending of a text session may be complex. For instance, an initial text message can be considered as marking the beginning of a session, however there may be a question as to whether any particular text message is an initial text message establishing (marking the beginning of) a new session or is a further communication instance for a prior established text session. Furthermore, determining what event marks the ending of a text session can be hard. Thus, in various embodiments, a timer may be started that is reset upon receiving/sending a text message (upon the receiving of a communication instance) such that if the timer expires, it signals the ending of the associated session. In other embodiments, the agent may indicate the ending of a text session. While in other embodiments, a single exchange of text messages between a party and an agent (e.g., an exchange of a received text message and response text message between a party and an agent) may mark the beginning and ending of a text session.

Finally, an email is another example of a connectionless communication session. In many instances, an initial email results in a response email, however there are instances when a response email may not be necessary or the exchange of multiple emails may be necessary. Thus, like text sessions, delineating the beginning and ending of an email session may be complex. Again, an initial email can be considered as marking the beginning of the session, however there may be a question as to whether any particular email is an initial email establishing (marking the beginning of) a new session or is a further communication instance for a prior established email session. Therefore similar to text sessions, a timer may be started in various embodiments that is reset upon receiving/sending an email such that if the timer expires, it signals the ending of the associated session. In other embodiments, the agent may indicate the ending of an email session. While in other embodiments, a single exchange of emails between a party and an agent may mark the beginning and ending of an email session.

Exemplary Contact Center Architecture

Figure 2:
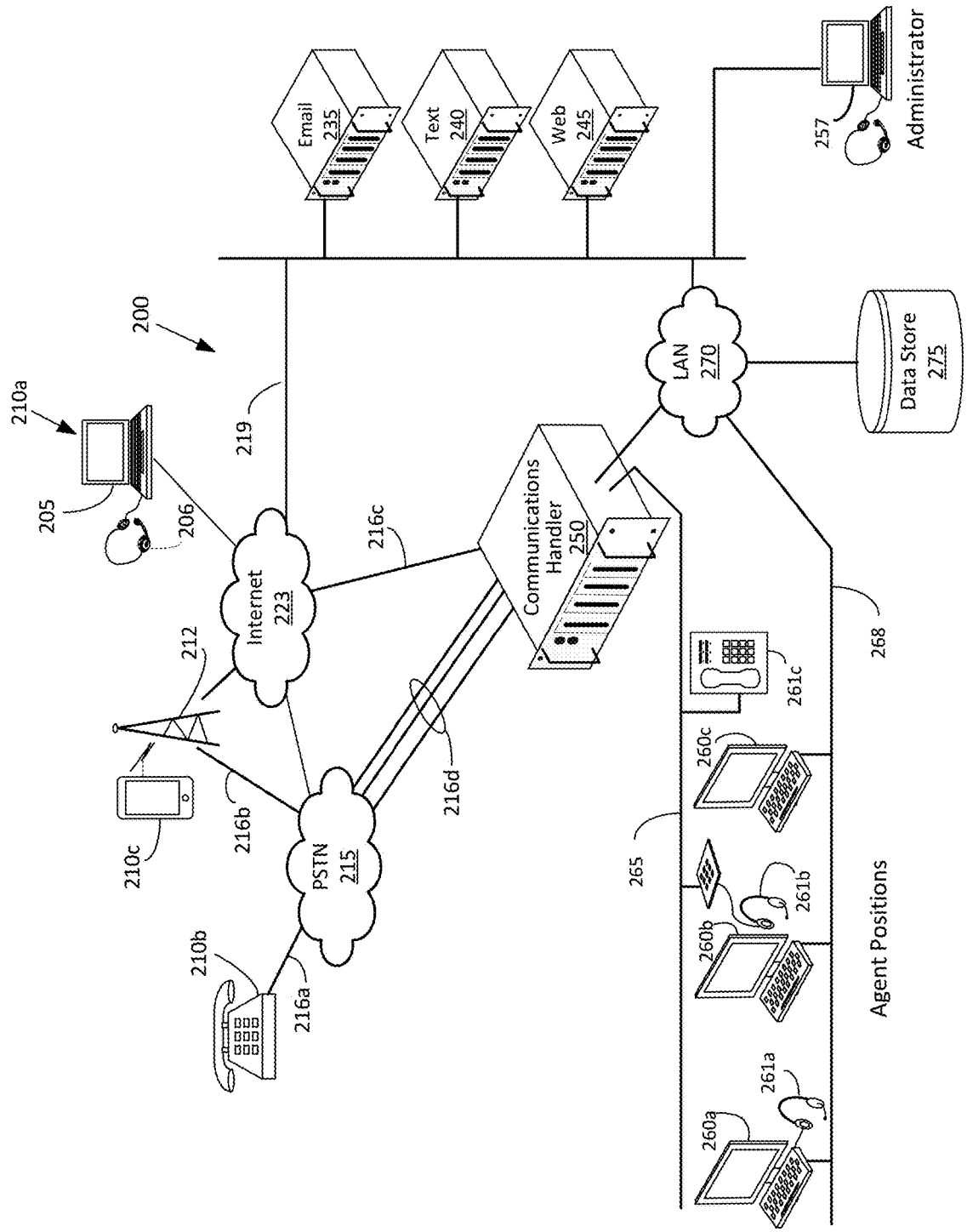
FIG. 2 illustrates an architecture of various components of a contact center that may be used in accordance with various embodiments of the present invention.

FIG. 2 illustrates a contact center architecture 200 that may be used in accordance with the various technologies and concepts disclosed herein. The contact center architecture 200 shown in FIG. 2 may process voice communications and non-voice communications that are inbound-only, outbound-only, or a combination of both (sometimes referred to as a "blended" contact center). Therefore, although many aspects of contact center operation may be disclosed in the context of voice calls, the contact center may process other forms of communication such as, for example, facsimiles, emails, text messages, video chats/calls, and Web chats.

Since the contact center may handle communications originating from a party, or initiated to a party, the term "party," "user," or "customer" without any further qualification, refers to a remote person associated with a communication processed by the contact center, where the communication is either received from or placed to the party. Thus, use of these terms is not intended to limit the concepts described in this application.

Accordingly, inbound voice calls can originate from calling parties using a variety of different phone types. For instance, a calling party may originate a call from a conventional analog telephone 210b connected to a public switched telephone network ("PSTN") 215 using an analog plain old telephone service ("POTS") line 216a. The calls may be routed by the PSTN 215 and may comprise various types of facilities 216d, including, but not limited to: T1 trunks, SONET based fiber optic networks, ATM networks, etc. Various types of routers, switches, bridges, gateways, and other types of equipment may be involved in the processing of the calls.

Inbound voice calls may also originate from a mobile phone device 210c, such as a smart phone, tablet, or other mobile device, which wirelessly communicates with a mobile service provider ("MSP") 212. The voice calls may be routed to the PSTN 215 using an integrated services digital network ("ISDN") interface 216b or other types of interfaces that are well known to those skilled in the art. In particular embodiments, the MSP 212 may also route calls as packetized voice, referred to herein as voice-over-IP ("VoIP") to an Internet provider 223 using Internet-based protocols, such as SIP or H.323 protocols. For convenience, unless indicated otherwise, the term "trunk" refers to any type of facility 216c, 216d providing voice calls to, or from, the contact center, regardless of the type of protocol or technology used. Specifically, a "trunk" is not limited to time-division multiplexing ("TDM") technology, but could refer various VoIP communication channels.

Inbound voice calls may also originate from a calling party employing a so-called "IP phone," "VoIP phone," or "soft phone" 210a. In particular embodiments, this device may comprise a computing device 205, such as a laptop, computing tablet, or other electronic device, which interfaces with a headphone/microphone combination, also referred to as a "headset" 206. An IP phone may use a digital voice control protocol and may process packetized voice data according to various Internet based voice protocols, such as session initiated protocol ("SIP") and the call may be conveyed by an Internet provider 223. Those skilled in the art will recognize that a variety of Internet Protocols ("IP") and facilities may be used to convey voice calls.

The term "voice call" may encompass a voice call using any form of currently available technology and/or originating from any type of device, such as a soft phone 210a, a conventional telephone 210b, a mobile phone 210c, or other device known in the art. The term "call" as used herein may encompass an active instance of two-way communication, an attempt to establish two-way communication, or a portion of the two-way communication. For example, a user at a conventional telephone 210b can dial a voice call in an attempt to establish two-way communication, and a call can be said to exist even prior to establishment of the two-way connection.

In various embodiments, inbound voice calls from calling parties to the contact center may be received at a communications handler 250, which could be, for instance, an automatic call distributor ("ACD"). In particular embodiments, the communications handler 250 may be a specialized switch for receiving and routing inbound calls under various conditions. Further, the communications handler 250 may be embodied as a dedicated form of equipment readily available from various manufacturers, or the communications handler 250 may be a so-called "soft switch" comprising a suitable programming module executed by a processing device to perform the necessary specialized functions. The communications handler 250 may route an incoming call over contact center facilities 265 to a phone device used by an available agent for servicing. Depending on the embodiment, the facilities 265 may be any suitable technology for conveying the call, including but not limited to a local area network ("LAN"), wide area network ("WAN"), ISDN, or conventional TDM circuits. In addition, the facilities 265 may be the same or different from the facilities used to transport the call to the communications handler 250.

The physical area at which the agent sits is often referred to as an agent "position" and these positions are often grouped into clusters managed by a supervisor, who may monitor calls and the agents' productivity. An agent typically uses a specially configured computing device 260a-260c, such as a computer with a display, and a voice device 261a-261c that is adapted for various contact center functions associated with processing communications. For instance, the voice device 261a-261c may be a soft phone device exemplified by a headset 261a connected to the computer 260a. Here, the soft phone device may be a virtual telephone implemented in part by an application program executing on the computer 260a. Further, the phone may also comprise an Internet Protocol ("IP") based headset 261b or a conventional phone 261c. Use of the term "phone" is intended to encompass all these types of voice devices used by an agent, unless indicated otherwise.

The combination of computing device 260a-260c and voice device 261a-261c may be referred to as a "workstation." Thus, for these particular embodiments, the workstation collectively has a data capability and a voice capability, although separate devices may be used. Here, data may be provided to an agent's workstation computer 260a-260c over facilities 268 along with routing the call to the agent's workstation voice device 261a-261c over other facilities 265. In some instances, "workstation" may be used in reference to either the data or voice capability at the agent's position. For example, "routing the call to the agent's workstation" means routing a call to one of the voice devices 261a-261c at the agent's position. Similarly, "routing the call to the agent" means routing a call to the appropriate equipment at an agent's position. The workstation typically has a display, provided via a computer monitor. This is used to convey information to the agent about the calls, and the agent may interact with the communications handler 250 using a mouse or other pointing device in conjunction with their computer display.

Depending on the embodiment, the agent positions may be co-located in a single physical contact center or multiple physical contact centers. The agents may be remotely located from the other components of the contact center, and may also be remotely located from each other, sometimes referred to as a "virtual contact center." In particular instances, a virtual contact center may describe a scenario in which agents work at home, using their own computers and telephones as workstations. In some configurations, a single physical location of the contact center may not be readily identifiable. For instance, this may occur when the call processing functions are provided as a service in a hosted cloud computing environment and the agents positions are in their individual residences. It is even possible for the supervisor to be remotely located (e.g., work at home), and such an arrangement does not negate the existence of the contact center.

Agents typically log onto their workstations prior to handling calls. The workstation may also communicate this login information to the communications handler 250 to allow the contact center (including the communications handler 250) to know which agents are available for handling calls. In particular embodiments, the communications handler 250 may also maintain data on an agent's skill level that may be used to route a specific call to the agent or group of agents having the same skill level. The communications handler 250 may also know what types of channels and combinations of channels the agent can handle.

Accordingly, in various embodiments, the communications handler 250 may place a call in a queue if there are no suitable agents available to handle the call, and/or the handler 250 may route the call to an interactive voice response system (e.g., server) ("IVR") (not shown) to play voice prompts. In particular embodiments, these prompts may be defined to be in a menu type structure and the IVR may collect and analyze responses from the party in the form of dual-tone multiple frequency ("DMTF") tones and/or speech. In addition, the IVR may be used to further identify the purpose of the call, such as, for example, prompting the party to enter account information or otherwise obtain information used to service the call. Further, in particular embodiments, the IVR may interact with other components such as, for example, a data store 275 to retrieve or provide information for processing the call. In other configurations, the IVR may be used to only provide announcements.

As noted, the contact center may also receive non-voice communications such as, for example, text messages, emails, and chats. For instance, text messages may be sent by parties using smart phones 210c over a MSP 212 and the Internet 223 and are received by a text gateway server 240. Once received, the text gateway server 240 in particular embodiments may inform the communications handler 250 of the text messages and the handler 250 may then queue up the text messages for appropriate agents.

In other embodiments, the contact center may make use of one or more components separate from the handler 250, such as a communications router (not shown in FIG. 2) that instead handles the routing of various communications to agents. For instance, in these particular embodiments, the text gateway server 240 may instead inform a communications router of the text messages and the router may then queue up the text messages for appropriate agents. Similarly, the communications handler 250 may also inform the communications router of various calls so that the router can then queue up the calls for appropriate agents. However, with that said, the remainder of the specification makes reference to a communications handler 250 to carry out such functionality, although it should be understood that portions of the communication handler's 250 functionality may be performed by one or more other components within the contact center architecture 200.

Similarly, emails may be sent by users over the Internet 223 to an email server 235, and the email server 235 may inform the communications handler 250 of the emails so that the communications handler 250 can queue up the emails for appropriate agents. With respect to chats, in various embodiments a party can request a chat by accessing a website via a Web server 245. In turn, the Web server 245 informs the communications handler 250 of the chat and the handler 250 queues the appropriate agent to handle the chat.

Depending on the embodiment, the interactions between the various components shown may involve using a local area network ("LAN") 270. However, other configurations are possible, such as, but not limited to, using a wide area network, wireless network, router, bridge, direct point-to-point links, etc. Furthermore, in lieu of using facilities 265 directly linked to the communications handler 250 for conveying audio to the agents, other facilities 268 associated with the LAN 270 may be used.

In addition to receiving inbound communications, the contact center may also originate communications to parties, referred to herein as "outbound" communications. For instance, in particular embodiments, the communications handler 250 may be a dialer, such as a predictive dialer, that originates outbound calls at a rate designed to meet various criteria. Here, the communications handler 250 may include functionality for originating calls, and if so, this functionality may be embodied as a private automatic branch exchange ("PBX" or "PABX"). In addition, the communications handler 250 may directly interface with voice trunks using facilities 216c, 216d to the PSTN 215 and/or Internet provider 223 for originating calls. After the calls are originated, the communications handler 250 may perform a transfer operation to connect the calls with agents, a queue, or an IVR. Furthermore, in various embodiments, the communications handler 250 may make use of one or more algorithms to determine how and when to dial a list of numbers so as to minimize the likelihood of a called party being placed in a queue while maintaining target agent utilization. In similar fashion, the email server 235, text gateway server 240, and the Web server 245 can be utilized in various embodiments to originate outbound emails, text messages, and chats with parties.

As is discussed in greater detail, in various embodiments, the communications handler 250 determines which agent is authorized and available to handle a communication upon being made aware of a voice or non-voice communication, and thereafter appropriately coordinates any response to the communication. In addition, the communications handler 250 may also make use of one or more schemes in allocating communications to agents such as, for example, on a round-robin basis, a least-number-served basis, a first available agent basis, and/or a seniority basis.

Finally, an administrator may configure the different components 235, 240, 245 and communications handler 250 in various embodiments via an administrator workstation 257 to affect how various communications are routed to agents. For instance, in particular embodiments, an administrator has access through the administrator workstation 257 to various data structures for defining what channels of communication and combinations of communication channels agents are able to handle. That is to say, the administrator has access through the administrator workstation 257 to adjust the "mix" of channels of communications and combinations of channels agents are able to handle.

Although a number of the above components are referred to as a "server," each may also be referred to in the art as a "computing device," "processing system," "unit," or "system." A server may incorporate a local data store and/or interface with an external data store. Use of the word "server" does not require the component to interact in a client-server arrangement with other components, although that may be the case. Further, the above components may be located remotely from (or co-located with) other components. Furthermore, one or more of the components may be implemented on a single processing device to perform the functions described herein. For example, in various embodiments, one or more functionalities of the communications handler 250 or other component may be combined into a single hardware platform executing one or more software modules. In addition, the contact center architecture 200 may be provided as a hosted solution, where the call processing functionality is provided as a communication service (a so-called "communication-as-a-service" or "CaaS") to a contact center operator. Thus, there is no requirement that the components identified above actually be located or controlled by a contact center operator. Those skilled in art will recognize FIG. 2 represents one possible configuration of a contact center architecture 200, and that variations are possible with respect to the protocols, facilities, components, technologies, and equipment used.

Exemplary Communication Assembly Data Architecture

Figure 3:
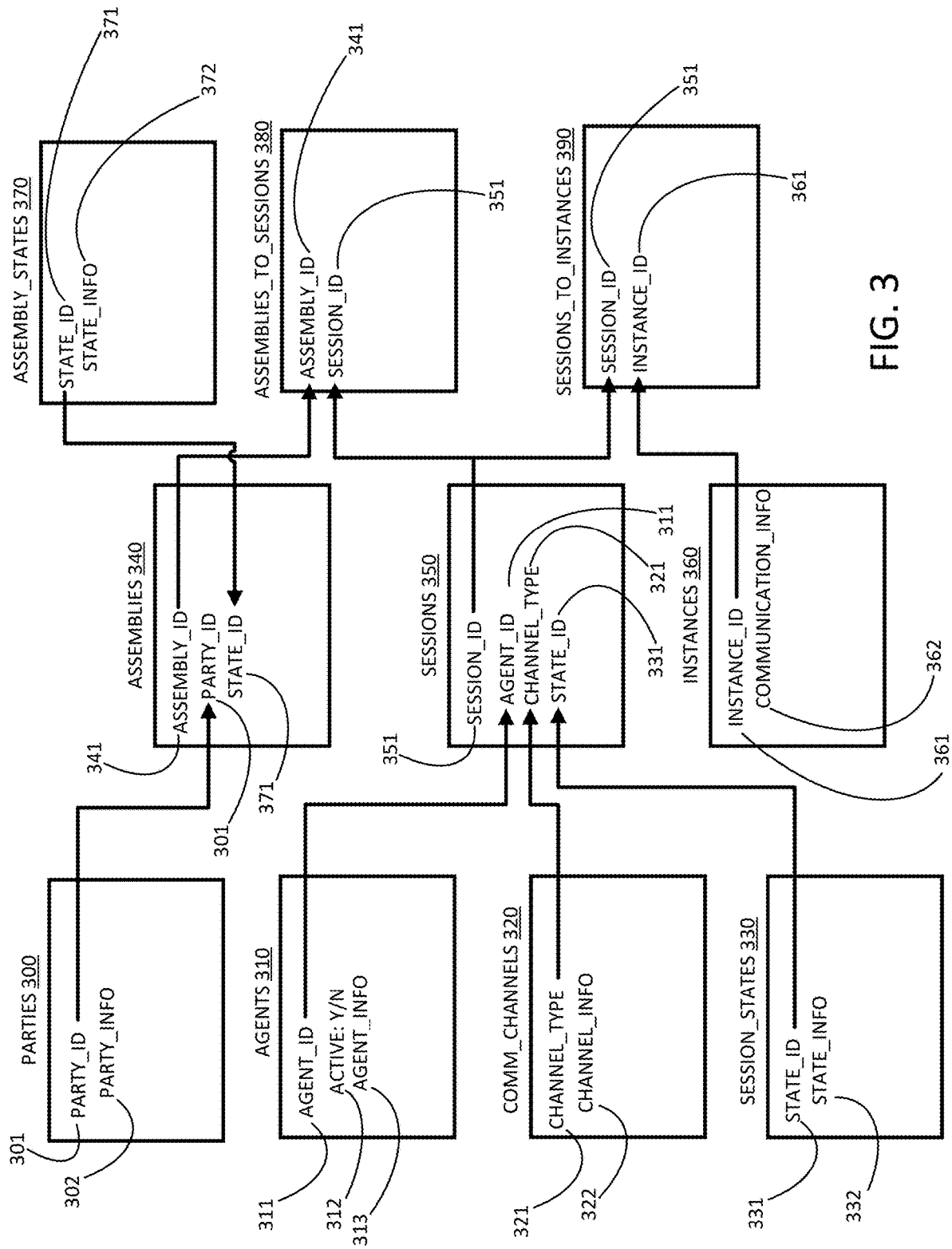
FIG. 3 illustrates a data architecture in accordance with various embodiments of the present invention.

FIG. 3 provides a data architecture for storing information for communication assemblies and associating various data elements for the information in accordance with various embodiments of the invention. For instance, this particular architecture may be utilized as a file structure or a database structure in particular embodiments. That is say, for example, the primary structures 300, 310, 320, 330, 340, 350, 360, 370, 380, 390 shown in FIG. 3 may be constructed as individual files or tables depending on whether a file structure or a database structure is used.

Looking at FIG. 3, the architecture includes a PARTIES structure 300 configured to store information on the parties that are involved in communication interactions with the contact center. For this particular configuration, the PARTIES structure 300 includes a party identifier (PARTY_ID 301) for each party that uniquely identifies the party. Accordingly, this identifier 301 can be used to retrieve, as well as associate, information stored in other data structures for the party. The PARTIES structure 300 may also include PARTY_INFO 302 that provides general information about the party such as, for example, the party's name, home address, and/or contact information for various channels of communication. Depending on the embodiment, the PARTY_INFO 302 may be separated out into multiple data elements (e.g., fields) and/or multiple structures for storage purposes. For example, in one embodiment, a party's contact information for different channels of communication may be stored in a separate data structure along with the party's identifier 301 so that the contact information can be queried for the party.

Similarly, the architecture includes an AGENTS structure 310 configured to store information on the agents employed by the contact center to handle communication interactions for the contact center. Here, the AGENTS structure 310 includes an agent identifier (AGENT_ID 311) for each agent that uniquely identifies the agent. Similar to the party identifier 301, the agent identifier 311 can be used to retrieve, as well as associate, information stored in other data structures for the agent. The AGENTS structure 310 may also include AGENT_INFO 313 that provides general information about the agent such as, for example, the agent's name, job title, and pay grade. Depending on the embodiment, the AGENT_INFO 313 may also be separated out into multiple data elements and/or multiple structures for storage purposes.

In addition, the AGENTS structure 310 for this particular configuration also includes a data element (ACTIVE 312) that indicates whether the agent is currently active and available to handle communications for the contact center. In particular embodiments, the data element ACTIVE 312 may simply be a variable such as a Boolean (yes or no) that can be set to indicate whether an agent is currently available to handle communications. While in other embodiments, the data element ACTIVE 312 may be used to store different states for an agent such as, for example, active, on a call, paused, engaged in after work, on break, and inactive. Accordingly, components within the contact center may use this data element 312 in various embodiments to determine whether an agent at any given time is available to handle a communication.

The next structure that makes up part of the data architecture shown in FIG. 3 is a COMM_CHANNELS structure 320. The COMM_CHANNELS structure 320 stores unique identifiers (CHANNEL_TYPE 321) for each channel of communication that may be utilized by the contact center. For example, the contact center may be utilizing voice calls, text messages, emails, and chats to interact with parties. Therefore, in this instance, the COMM_CHANNELS structure 320 would include four unique CHANNEL_TYPE identifiers 321, one for each channel of communication being utilized by the contact center. In addition, the COMM_CHANNELS structure 320 may store information (CHANNEL_INFO 322) on the different channels in multiple data elements and/or multiple structures depending on the embodiment.

Continuing on, the next data structure that makes up the data architecture shown in FIG. 3 is a SESSION_STATES structure 330. The SESSION_STATES structure 330 stores information on the different states a session may be placed in such as, for example, connected, active, reserved, pending, ringing, attention needed, paused/hold, and terminated/inactive. Here, the SESSION_STATES structure 330 includes a unique identifier (STATE_ID 331) for each state as well as STATE_INFO 332 that may be stored in multiple data elements and/or multiple structures.

Likewise, the data architecture shown in FIG. 3 includes an ASSEMBLY_STATES structure 370 that stores information on the different states an assembly may be placed in such as, for example, active, suspended/parked, and terminated/inactive. Similar to the SESSION_STATES structure 330, the ASSEMBLY_STATES structure 370 includes a unique identifier (STATE_ID 371) for each state as well as STATE_INFO 372 that may be stored in multiple data elements and/or multiple structures.

Moving on, the data architecture shown in FIG. 3 includes an ASSEMBLIES structure 340. This structure 340 stores information on the various assemblies that take place involving interactions conduct by the contact center with different parties. Here, the ASSEMBLIES structure 340 includes a unique identifier (ASSEMBLY_ID 341) that identifies a particular assembly that takes place with a party, a data element for the identifier for the party (PARTY_ID 301 from the PARTY structure 300) involved in the assembly, and a data element for the identifier for the current state (STATE_ID 371 from the ASSEMBLY_STATES structure 370) of the assembly. Therefore, in particular embodiments, when the contact center determines a particular communication with a party involves a new assembly, the contact center generates and records an identifier 341 for the new assembly in the ASSEMBLIES structure 340 along with the identifier 301 for the party involved in the new assembly from the PARTY structure 300 and the identifier 371 for the state for the new assembly (e.g., the identifier 371 for the active state) from the ASSEMBLY_STATES structure 370.

Likewise, the data architecture shown in FIG. 3 also includes a SESSIONS structure 350 that stores information on the various sessions that take place for the assemblies. Here, the SESSIONS structure 350 includes a unique identifier (SESSION_ID 351) that is used to identify a particular session. For this particular configuration, each session is associated with a particular agent and therefore the SESSIONS structure 350 includes a data element for the identifier of the agent (AGENT_ID 311 from the AGENTS structure 310) involved in a particular session. If the agent engaged in a session happens to change during a session, such a situation may be handled differently in different embodiments. For instance, a party may be conversing with an agent on a voice call that represents a session. During the call, the agent may determine that a different agent is better suited to help the party and may transfer the call to the different agent. In particular embodiments, such a situation may be handled by updating the agent identifier 311 in the SESSIONS structure 350 for the session to the new agent's identifier 311 who is now handling the call. While in other embodiments, the situation may be handled by ending the session for the voice call involving the original agent and starting a new session (recording a new session in the SESSIONS structure 350) with the agent identifier for the new agent handling the transferred call.

The configuration of the SESSIONS structure 350 shown in FIG. 3 also includes a data element for the identifier indicating the current state (STATE_ID 331 from the SESSION_STATES structure 330) of the session. Therefore, returning to the example where a new session is started when the call is transferred to a different agent, the data element in the SESSIONS structure 350 for state identifier 331 for the first session involving the original agent is set to terminated or inactive upon transferring the call to the new agent and the data element in the SESSIONS structure 350 for the state identifier 331 for the new, second session involving the new agent is set to connected. Thus, in various embodiments, the state of any session can be determined by the contact center at any time by simply querying the state of the session from the SESSIONS structure 350. Finally, the configuration of the SESSIONS structure 350 shown in FIG. 3 includes a data element for the identifier for the channel (CHANNEL_TYPE 321 from the COMM_CHANNELS structure 320) being used to conduct the session.

Continuing on, the data structure shown in FIG. 3 includes an ASSEMBLIES_TO_SESSIONS structure 380 that links the various sessions to specific assemblies. Here, the ASSEMBLIES_TO_SESSIONS structure 380 shown in FIG. 3 includes a combination of an ASSEMBLY_ID 341 and a SESSION_ID 351 that are unique within the structure 380. Therefore, ideally, a session should only be assigned to one assembly and the ASSEMBLIES_TO_SESSIONS structure 380 is used to identify what sessions are related to any particular assembly.

Furthermore, the data architecture shown in FIG. 3 includes an INSTANCES structure 360 that contains information on various instances that take place during the sessions. This particular structure 360 includes a unique identifier (INSTANCE_ID 361) for a particular instance. In addition, the structure 360 includes information (COMMUNICATION_INFO 362) on the particular instance. For example, the COMMUNICATION_INFO 362 for an instance involving a voice call may include information such as the date and time the voice call took place, the number of minutes over which the voice call took place, and/or an actual recording of the voice call. Depending on the embodiment, the COMMUNICATION_INFO 362 may be separated out into multiple data elements and/or multiple structures for storage purposes. For instance, in particular embodiments, the COMMUNICATION_INFO 362 may include a pointer to a memory location where the recording of the voice call is being stored instead of actually storing the recording in the COMMUNICATION_INFO 362. In addition, depending on the embodiment, the COMMUNICATION_INFO 362 may include different information (e.g., different data elements) for different types of communications (e.g., voice calls versus emails versus text messages versus chats).

Finally, the data architecture shown in FIG. 3 includes a SESSIONS_TO_INSTANCES structure 390. Similar to the ASSEMBLIES_TO_SESSIONS structure 380, the SESSIONS_TO_INSTANCES structure 390 links the various instances to specific sessions. Thus, the SESSIONS_TO_INSTANCES structure 390 shown in FIG. 3 includes a combination of a SESSION_ID 351 and an INSTANCE_ID 361 that are unique within the structure 390. Therefore, ideally, an instance should only be assigned to one session and the SESSIONS_TO_INSTANCES structure 390 is used to identify what instances are related to any particular session.

Figure 4:
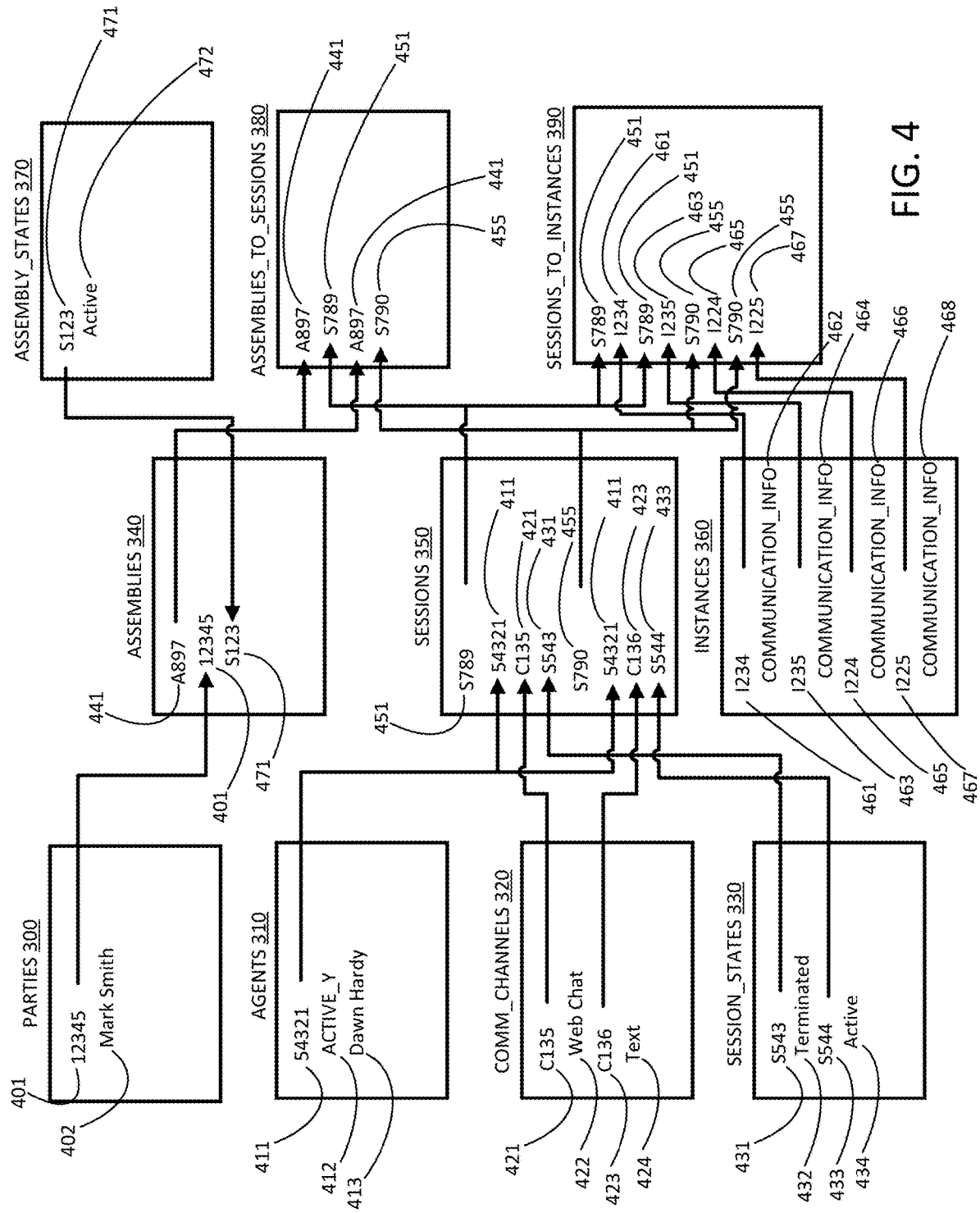
FIG. 4 illustrates data stored in the data architecture shown in FIG. 2.

Returning briefly to the example wherein a party and an agent are involved in a conversation via a Web chat to discuss a product advertised on a website and the conversation is continued through texting, FIG. 4 illustrates data stored in the data architecture shown in FIG. 3 for this example. Thus, turning to FIG. 4, the contact center considers the interaction between the agent and the party to discuss the advertised product to represent a communication assembly. Accordingly, an entry is placed in the ASSEMBLIES structure 340 for this assembly that is associated with the identifier "A897" 441. Here, the assembly entry also shows the assembly involves a party associated with the identifier "12345" 401 and is in a state corresponding to identifier "S123" 471. Hence, the entry shows the party involved in the assembly is "Mark Smith" 402 as identified in the PARTY structure 300 based on the identifier "12345" 401 and the assembly is currently in the "Active" state 472 as indicated in the ASSEMBLY_STATES structure 370 based on the identifier "S123" 471.

Since the assembly involves a Web chat that is continued using texts, each of these separate channels of communication used by the agent and party is considered a separate communication session. Therefore, a first entry is placed in the SESSIONS structure 350 for the Web chat that is associated with identifier "S789" 451 and a second entry is placed in the SESSIONS structure 350 for the exchange of text messages that is associated with identifier "S790" 455. Here, the first entry is identified as a Web chat because the entry includes a communication channel identifier of "C135" 421, which is associated with a "Web Chat" 422 in the COMM_CHANNELS structure 320. In addition, the second entry is identified as text because the entry includes a communication channel identifier of "C136" 423, which is associated with "Text" 424 in the COMM_CHANNELS structure 320.

Furthermore, both sessions are shown to involve an agent with the identifier "54321" 411 and this particular identifier 411 is associated with "Dawn Hardy" 413 in the AGENTS structure 310. As expected, the AGENTS structure 310 also indicates agent Dawn Hardy is currently active 412 and available. Finally, the Web chat session is shown to be currently in the "Terminated" state 432 as indicated by the identifier "S543" 431 and the text session is shown to be currently in the "Active" state 434 as indicated by the identifier "S544" 433 as both of these identifiers 431, 434 are identified in the SESSION_STATES structure 330 as "Terminated" 432 and "Active" 434," respectively.

Accordingly, the two sessions are shown to be associated with the assembly in the ASSEMBLIES_TO_SESSIONS structure 380. Here, an entry is found in the structure 380 linking the Web chat session identifier 451 to the assembly identifier 441 to demonstrate the Web chat session is associated with the assembly. Likewise, an entry is found in the structure 380 linking the text session identifier 455 to the assembly identifier 441 to demonstrate the text session is associated with the assembly.

Finally, the instances that make up the two communication sessions is shown in the INSTANCES and SESSIONS_TO_INSTANCES structures 360, 390. Firstly, the INSTANCES structure 360 includes an entry for each Web chat instance with identifiers "1234" 461 and "1235" 463. As previously mentioned, in various embodiments, each chat message provided during a Web chat is considered an instance for the chat session. Therefore, each of the two Web chat instances shown in the INSTANCES 360 structure represents a chat message exchanged between the party and agent during the Web chat. Normally, a Web chat would involve more exchanges than just two messages. However, the INSTANCES structure 360 shown in FIG. 3 only includes two instances for the Web chat session for illustrative purposes.

Secondly, the INSTANCES structure 360 includes an entry for a first text instance that represents an initial text message sent by the agent to the party to initiate the text session. This particular entry is associated with identifier "1224" 465. In addition, the INSTANCES structure 360 includes an entry for a second text instance that represents a text message sent as a response by the party to the agent. This particular entry is associated with identifier "1225" 467. Again, The INSTANCES structure only includes two instances for the text session for illustrative purposes. Here, all of the entries also include information for the corresponding instances shown as COMMUNICATION_INFO 462, 464, 466, 468.

The association of these four instances to their corresponding sessions is found in the SESSIONS_TO_INSTANCES structure 390. Here, an entry is found in the structure 390 linking each of the Web chat instance identifiers 461, 463 to the Web chat session identifier 451 to demonstrate the Web chat instances are associated with the Web chat session. Likewise, entries are found in the structure 390 linking the text instance identifiers 465, 467 to the text session identifier 455 to demonstrate the text instances are associated with the text session.

Figure 5:
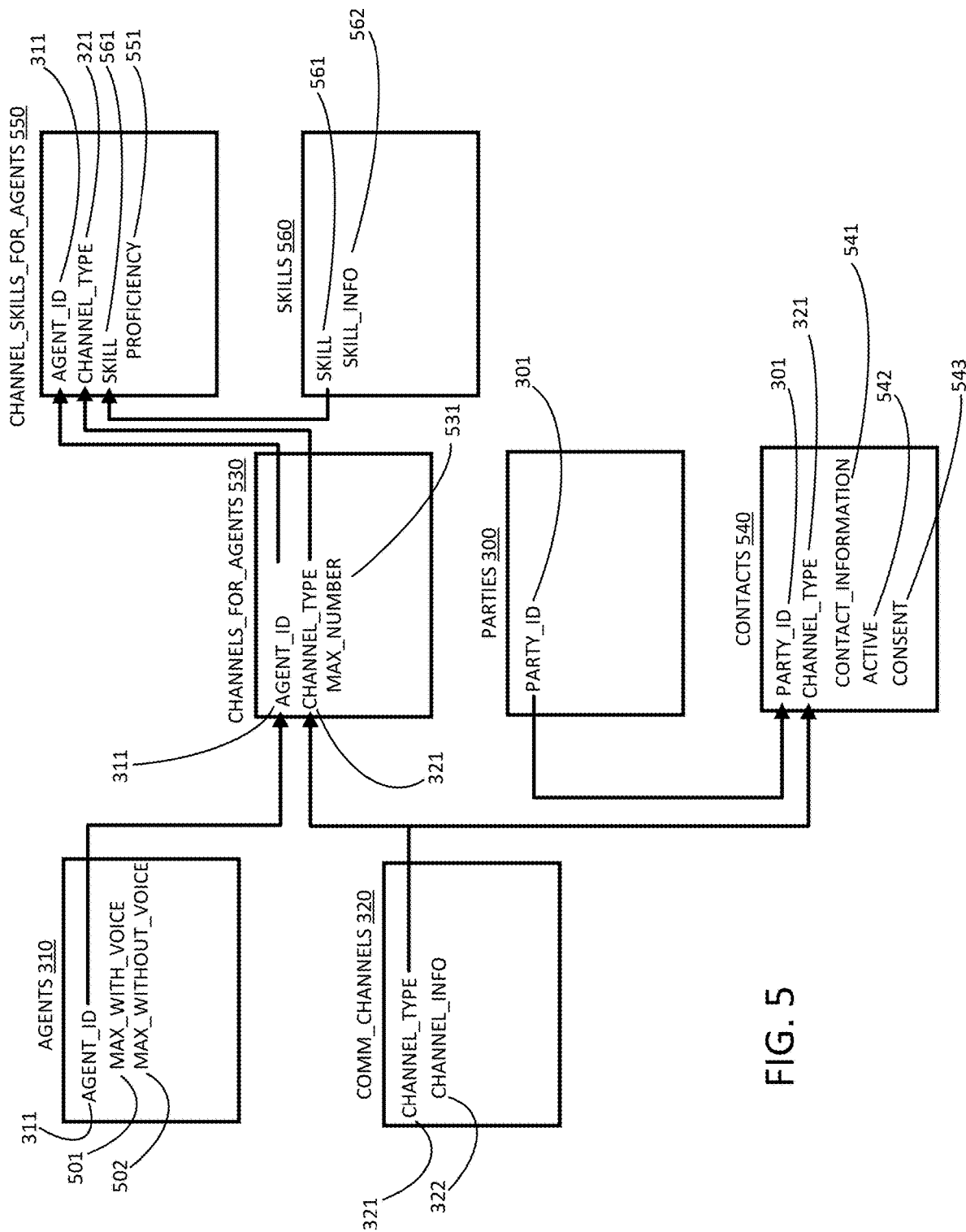
FIG. 5 illustrates a continuance of the data architecture shown in FIG. 2.

As the reader may recall, different agents possess different skill levels with respect to their abilities to handle various channels of communication and also with respect to their abilities to handle multiple communications using various channels of communication at virtually the same time. With this in mind, FIG. 5 provides additional structures within the data architecture for handling agents' different abilities to handle multiple communications. In addition, FIG. 5 provides structures for handling contacts for parties.

Here, the particular configuration of the data architecture shown in FIG. 5 provides an AGENTS structure 310 that includes a data element 501 to record an agent's maximum number of communication sessions the agent is authorized to handle at virtually the same time when one of the sessions the agent is actively handling is a voice call and a data element 502 to record the agent's maximum number of communication sessions the agent is authorized to handle at virtually the same time when none of the sessions the agent is actively handling is a voice call. The reason for the two different data elements 501, 502 in this configuration is because a voice call typically requires a significant amount of the agent's attention when handling, leaving him with less capacity to handle other types of communications. Therefore, the maximum number of communication sessions is reduced when an agent is actively handling a voice call to compensate for the agent's needed attention for the voice call.

Accordingly, the AGENTS structure 310 in other embodiments may have different data elements contingent on other channels of communication in addition to or instead of a voice call. For example, a contact center may consider a chat session to require a fair amount of an agent's attention when handling and have the maximum number of communications an agent is authorized to handle at virtually the same time to be different depending on whether an agent is currently handling a chat session. Those of ordinary skill in the art can envision other data elements that may be included in the AGENTS structure 310 to compensate for an agent's required attention for various channels of communication in light of this disclosure.

Furthermore, a variety of key performance indicators ("KPIs") can be used in various embodiments to also deduce whether an agent is overwhelmed or is able to handle more communication sessions at virtually the same time. Specifically, the contact center can monitor various KPIs for an agent such as, for example, a conversation rate, sale volume, or promise to pay and if the agent is having a better than average day with respect to these KPIs (relative to his or her prior history or relative to other agents working), then the contact center may increase the agent's maximum number of communications he or she is authorized to handle at virtually the same time. Conversely, if the agent's KPIs are below average, then the contact center may decrease the agent's maximum number of communications he or she is authorized to handle at virtually the same time. Thus, in particular embodiments, the maximum number of communication sessions an agent is authorized to handle at virtually the same time can be varied for an agent in real-time based on various types of performance parameters.

With that said, the maximum number of communication sessions data elements 501, 502 found in the AGENTS structure 310 may be independent of the channels of communication that may make up the combination of channels of communication used for the sessions. For instance, an agent's maximum number of communication sessions may be set to four when the agent is actively handling a voice call. Therefore, the agent cannot have more than four communication sessions that are actively being handled by the agent (e.g., cannot have more than four communication sessions in the "connected," "active," "pending," "ringing," "attention needed," and "paused/hold" state) at any given time when she is handling a voice call. However, the three remaining sessions apart from the one voice call session may be made up of any combination of channels. For example, the four sessions may include: (1) a voice call session, two text sessions, and a chat session; (2) a voice call session, a chat session, a text session, and an email session; (3) a voice call session, a chat session, and two email sessions; or (4) a voice call session and three chat sessions.

Instead, the data architecture shown in FIG. 5 includes a CHANNELS_FOR_AGENTS structure 530 to control the combination of channels that can make up the sessions an agent is actively handling at any given time. Firstly, the CHANNELS_FOR_AGENTS structure 530 includes a data element to store an agent's unique identifier 311 to identify the agent. Secondly, the structure 530 includes a data element to store a CHANNEL_TYPE 321. As already discussed, the CHANNEL_TYPE 321 is defined in the COMM_CHANNELS structure 320 along with information on the channel 322. Finally, the CHANNELS_FOR_AGENTS structure 530 includes a data element (MAX_NUMBER 531) that identifies the maximum number of sessions the agent is authorized to actively handle at any given time using the associated channel of communication.

For example, an agent may be currently handling four communication sessions. These sessions may include a voice call session, two chat sessions, and an email session. The contact center receives an email and looks to see whether the agent is able to handle this email along with the voice call session, two chats sessions, and the email session he is already handling. Accordingly, the contact center first looks at the maximum number of communication sessions the agent is authorized to handle at virtually the same time when one of the sessions the agent is actively handling is a voice call 501 in the AGENTS structure 310. In this example, the data element 501 is set to five. Therefore, the agent is able to handle another session along with the voice call session, two chat sessions, and the email session that he is currently handling.

However, the contact center must still look to see whether the agent is authorized to handle the combination of a voice call session, two chats sessions, and two emails sessions at virtually the same time. Therefore, the contact centers looks at the maximum number of emails the agent is authorized to handle at virtually the same time in the CHANNELS_FOR_AGENTS structure 530. The contact center queries the structure 530 for this particular channel of communication (CHANNEL_TYPE 321) for the agent (AGENT_ID 311) and finds the maximum number of emails (MAX_NUMBER 531) the agent is authorized to handle at virtually the same time is one. Therefore, the contact center concludes the newly received email cannot be routed to this particular agent.

Accordingly, the CHANNELS_FOR_AGENTS structure 530 in particular embodiments may also include multiple data elements for the maximum number of sessions 531 an agent is authorized to handle at any given time for a particular channel of communication to compensate for the agent's needed attention for handling certain channels of communication similar to the maximum number of sessions data elements 501, 502 found in the AGENTS structure 310. Thus, in these particular embodiments, the combination of sessions a particular agent is authorized to handle at any given time can be dynamically changed based on the agent's current mix of channels of communications he or she is handling.

Moving on, the data architecture shown in FIG. 5 includes a CHANNEL_SKILLS_FOR_AGENTS structure 550 in particular embodiments to define required skill levels an agent must have in handling a communication session using a particular channel of communication to further control the combination of channels that can make up the sessions an agent is actively handling at any given time. Again, the CHANNEL_SKILLS_FOR_AGENTS structure 550 includes a data element to store an agent's unique identifier 311 to identify the agent and a data element to store a CHANNEL_TYPE 321. However, in addition, the CHANNEL_SKILLS_FOR_AGENTS structure 550 includes a SKILL data element 561 identifying a skill an agent possesses in handling a communication session for a particular channel of communication. The specific skills that can be assigned to an agent are managed in the SKILLS structure 560 as shown in FIG. 5. The SKILLS structure 560 includes a unique identifier 561 for a skill and a data element storing information on the skill 562.

Accordingly, in particular embodiments, the communications handler 250 is required to associate each communication session with any required skills to handle the communication session, and then only consider agents with the corresponding required skills to handle the communication session. For example, Spanish speaking agents may have a skill element 561 set to "Spanish" for voice call sessions so that such agents are only considered for handling calls involving Spanish speaking callers.

Finally, the CHANNEL_SKILLS_FOR_AGENTS structure 550 in particular embodiments may include a data element for a proficiency level 551 associated with each skill 561 indicating an agent's proficiency level for the corresponding skill. For example, an agent may have the skill "Spanish" set for voice call sessions indicating the agent is able to handle Spanish speaking callers, in addition to, or instead of, English speaking callers. However, not all Spanish speaking agents may necessarily have the same proficiency level in speaking Spanish. Some agents may speak Spanish as a first language, whereas other agents may speak Spanish as a second language. Therefore, the communications handler 250 may determine an inbound call requires a Spanish speaking agent with a minimum proficiency level of seven (out of ten, with ten being the highest proficiency level), and this information can be used to determine which agents to considering in assigning to the call.

Returning now to FIG. 5, the data architecture also includes a CONTACTS structure 540 for the various contacts (e.g., contact information used to initiate a communication instance with an individual) the contact center may have for parties. In this configuration, an entry for each contact for a particular party is placed in the CONTACTS structure 540 by identifying the particular party with the party's unique identifier 301 and the type of channel by the channel's identifier 321. Here, the structure 540 includes a data element CONTACT INFORMATION 541 that provides information on the contact such as, for example, a telephone number or email address. In addition, the CONTACTS structure 540 includes a data element ACTIVE 542 that indicates whether the particular contact is active (current) or not for contacting the associated party. For instance, in particular embodiments, ACTIVE 542 is a Boolean data element that basically indicates whether the contact is active by a "yes" or "no" ("true" or "false") value. Furthermore, the CONTACTS structure 540 includes a CONSENT data element 543. This particular data element 543 indicates whether a party has consented to being contacted using the contact. Again, this element 543 is a Boolean in particular embodiments. Having a party's consent to be contacted using a particular contact may allow the contact center to use particular procedures and/or components to contact the party such as, for example, a predictive dialer, that the center may not otherwise be able to use.

Figure 6:
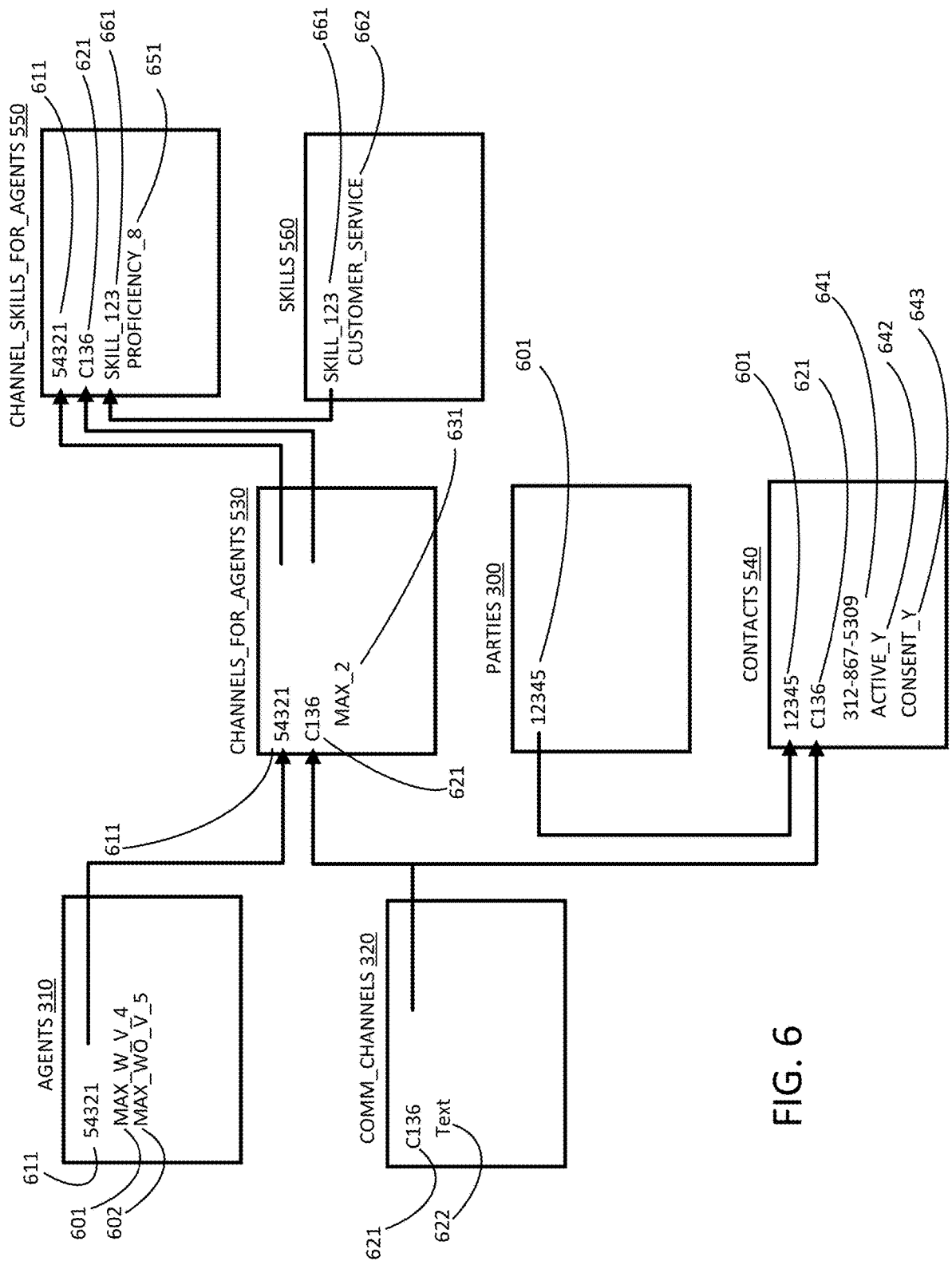
FIG. 6 illustrates data stored in the data architecture shown in FIG. 5.

Turning now to FIG. 6, this figure illustrates data stored in the data architecture shown in FIG. 5. The same example as discussed in FIG. 4 is used here again. Specifically, the AGENTS structure 310 includes an entry for the agent Dawn Hardy (AGENT_ID="54321" 611) and shows that she has a maximum number of four sessions 601 allowed at any given time when one of the sessions is a voice call and a maximum number of five sessions 602 allowed at any given time when none of the sessions is a voice call. Accordingly, the CHANNELS_FOR_AGENTS structure 530 shows agent Dawn Hardy can have a maximum number of two 631 text sessions (CHANNEL_TYPE="C136" 621 and CHANNEL_INFO="Text" 622) at any given time. Further, the contact center has a contact (e.g., a mobile phone number) to send party Mark Smith (PARTY_ID="12345" 601) text messages (CHANNEL_TYPE="C136" 621) found in the CONTACTS structure 540. Here, this particular contact has a telephone number of "312-867-5309" 641 as the contact information and is active 642. Furthermore, party Mark Smith has provided his consent 643 to be contacted via text messages to the number "312-867-5309" 641.

Therefore, if the contact center wants to send Mark Smith a text message, the contact center checks the CONTACTS structure 540 and determines the center has a contact number of "312-867-5309" 641 that is active 642 for Mark Smith 601 to send him text messages 621 and also has his consent 643 to send messages 621 to this number 641. Accordingly, the contact center sends Mark Smith a text message to the number and receives a text message back from him.

The contact center needs to then determine who can handle the text message received from Mark Smith and inquiries about agent Dawn Hardy. Dawn Hardy is currently handling a voice call and a text session. Here, looking at the AGENTS structure 310, the maximum number of sessions Dawn Hardy 611 is authorized to handle at any given time when one of the sessions is a voice call is four 601. Therefore, the contact center determines Dawn Hardy has the capacity to handle the text message from Mark Smith. However, the contact center also needs to determine whether Dawn Hardy is allowed to handle a combination of a voice call and two text sessions. Therefore, the contact center concludes from the CHANNELS_FOR_AGENTS structure 530 that Dawn Hardy can indeed handle the text message from Mark Smith because the maximum number of sessions Dawn 611 is authorized to handle for text 621 is two 631.

Lastly, the contact center needs to ensure that Dawn Hardy has the required skill and proficiency to handle the text message from Mark Smith. The subject matter of the text message involves customer service and requires a proficiency with respect to this skill of six. Here, the CHANNEL_SKILLS_FOR_AGENTS and SKILLS structures 550, 560 indicate Dawn (AGENT_ID="54321" 611) has the customer service skill (SKILL="SKILL_123" 661 and SKILL_INFO="CUSTOMER_SERVICE" 662) for the text channel (CHANNEL_TYPE="C136" 621) with a proficiency level of eight (PROFICIENCY="PROFICIENCY_8" 651). Therefore, Dawn Hardy has the required skill and proficiency to handle the text message from Mark Smith. Accordingly, the contact center forwards the text message received from Mark Smith to agent Dawn Hardy to handle.

Thus, the data architecture shown in FIGS. 3-6 demonstrates how a communication assembly representing an interaction conducted between an agent and a party for a particular purpose is associated ("linked") to its corresponding sessions and how the corresponding sessions are associated ("linked") to their corresponding instances. In addition, the data architecture shown in these figures demonstrates how an agent's mix of communication sessions is handled, as well as contacts for parties. Furthermore, the data architecture demonstrates how information related to different agents, parties, assemblies, sessions, and instances is recorded in various structures within the architecture so that such information is also associated ("linked") with the agents, parties, assemblies, sessions, and instances and can be retrieved and viewed with respect to any one of the agents, parties, assemblies, sessions, and instances.

Exemplary System Operation

The logical operations described herein may be implemented (1) as a sequence of computer implemented acts or one or more program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states, operations, structural devices, acts, or modules. These operations, structural devices, acts, and modules may be implemented in software, in firmware, in special purpose digital logic, and any combination thereof. Greater or fewer operations may be performed than shown in the figures and described herein. These operations may also be performed in a different order than those described herein.

Handle Communication Module

Figure 7:
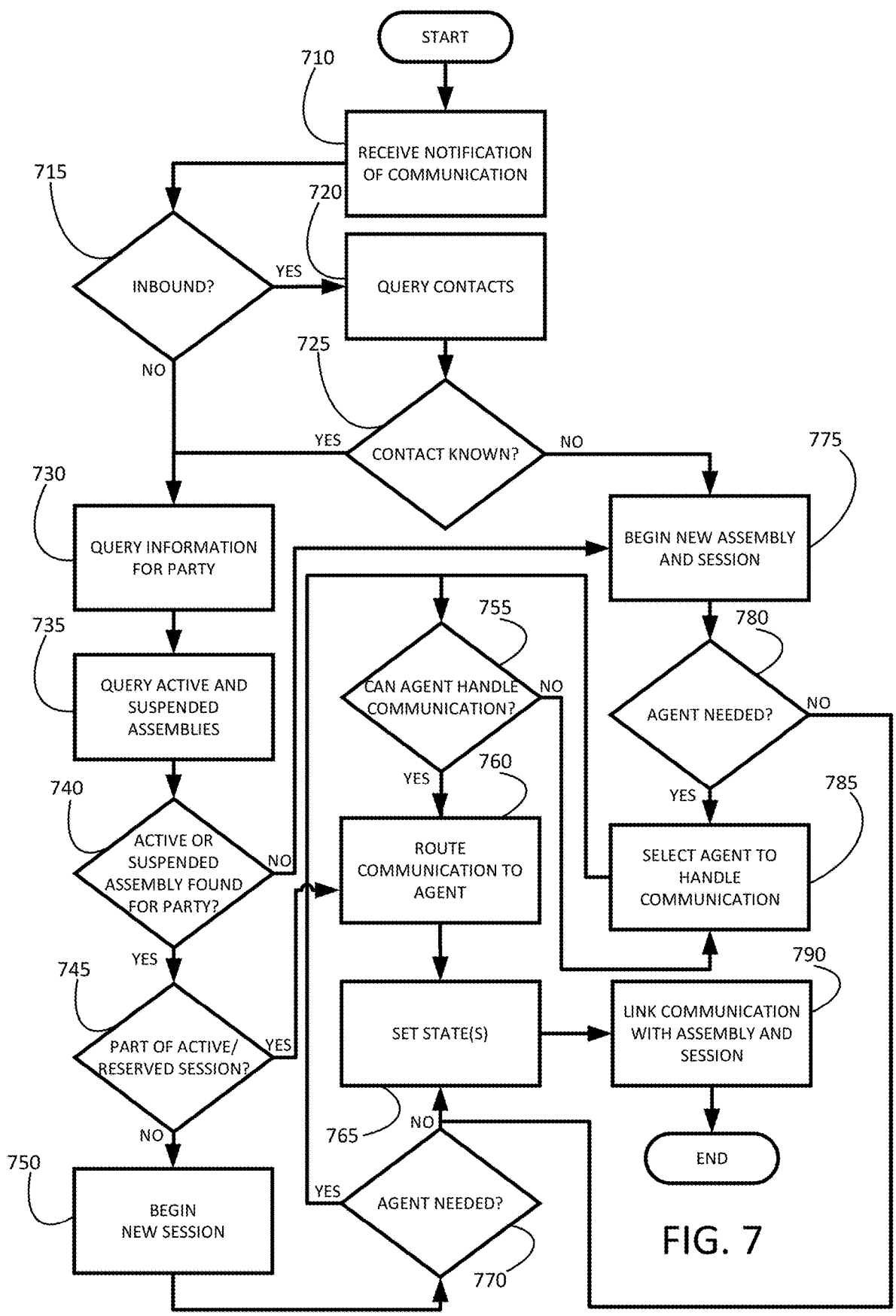
FIG. 7 illustrates a process flow for handling a communication in accordance with various embodiments of the present invention.

Turning now to FIG. 7, additional details are provided regarding a process flow for handling a communication according to various embodiments of the invention. In particular, FIG. 7 is a flow diagram showing a handle communication module for performing such functionality according to various embodiments of the invention. For example, the flow diagram shown in FIG. 7 may correspond to operations carried out by one or more processors in one or more components, such as, for example, the communications handler 250 described above, as it executes the handle communication module stored in the component's volatile and/or nonvolatile memory.

The process flow begins with the handle communication module receiving a notification of a communication in Operation 710. Here, the communication may be an inbound communication that is initiated by a remote party and received by the contact center or an outbound communication that is to be sent to a remote party. Accordingly, the communication can be received or sent via any one of a number of different channels of communication such as, for example, a voice call, an email, a chat, or a text message. For instance, returning to the example, the communication may be an outbound communication being send by the agent as a text message through a text gateway server 240 within the contact center and the text gateway server 240 may have informed the communications handler 250 of the text message, resulting in the handle communication module receiving a notification of the text message. While in another instance, the communication may be an inbound communication that is received from a remote party such as an email at an email server 235 and the server 235 may have informed the communications handler 250 of the email, resulting in the handle communication module receiving a notification of the email.

Next, the handle communication module determines whether the communication is an inbound communication in Operation 715. This operation is carried out because an inbound communication may be received by the contact center from a party that has never been in contact with the center before. That is to say, the inbound communication may be received by the contact center from a party who is unknown to the center. Furthermore, an inbound communication may be received by the contact center from a party who is known by the center however, the party may be using a contact unknown to the contact center. For example, a party who the contact center is familiar with may have recently purchased a new mobile phone along with a new telephone number and the party has placed a call using the mobile phone to the contact center. In this instance, the contact center would not recognize the new telephone number, although the party placing the call is familiar to the contact center.

As for an outbound communication, since the contact center is placing/sending such a communication, the center is typically familiar with the party the outbound communication is being placed/sent to and the contact used to place/send the outbound communication. However, with that said, an agent may be interacting with a party in some instances and may need to send the party an outbound communication to a contact that the party provides the agent as a new contact for the party. Therefore, the contact center may not necessarily recognize the contact being used to place/send the outbound communication because it is new. Therefore, in these instances, the agent handling the interaction may be required to record the new contact first for the party (e.g., record the new contact in the CONTACTS structure 540) before placing/sending the outbound communication so that the contact center now recognizes the contact and party associated with the communication.

At this point, the handle communication module is tasked with determining whether the communication is part of an ongoing (active or suspended) assembly taking place for the contact center or is independent of any such assembly and thus, a communication for a new assembly. Accordingly, if the handle communication module determines in Operation 715 that the communication is inbound, then the handle communication module queries the contacts known by the contact center based on the contact used to send the communication in Operation 720. For instance, returning to the example where the contact center has received an inbound email, the handle communication module queries the email addresses stored by the contact center for known parties based on the email address used to send the email. The handle communication module performs this operation to determine whether the email received by the contact center is associated with a party who the contact center recognizes.

Here, the handle communication module then makes a determination in Operation 725 as to whether the contact associated with the inbound communication is known or not. If the contact is not known, then the handle communication module assumes the communication has been received from either a party who is not familiar to the contact center (e.g., a party who has never communicated with the contact center before) or from a party who the contact center is familiar with but who is using a contact never used by the party before in communicating with the contact center. In either case, when the contact is not known, the contact center assumes the inbound communication received from the unknown contact is not part of an ongoing (active or suspended) assembly. Therefore, if the handle communication module determines in Operation 725 the contact is unknown, then the module handles such a determination in various embodiments by beginning a new assembly and session in Operation 775 for the inbound communication received by the contact center. For instance, in particular embodiments, this particular operation entails the handle communication module recording new entries in the ASSEMBLIES structure 340, the SESSIONS structure 350, and the INSTANCES structure 360 and linking each of these entries as appropriate in the ASSEMBLIES_TO_SESSIONS structure 380 and the SESSIONS_TO_INSTANCES structure 390.

At this point, the handle communication module determines whether the communication requires an agent in Operation 780. For instance, in particular embodiments, the contact center may initially route inbound voice calls to an interactive voice response system ("IVR") to gather information from the calling party to determine how to handle the call. From this information, the IVR may determine that the call can be handled without routing the call to an agent. For example, a party may be calling the contact center to access a balance on a credit card. In response, the IVR may be able to access the party's balance automatically and provide the balance without having to involve an agent.

In other instances, the communication may be an outbound voice call being placed for the purpose of playing a recording to the receiving party. Here, the communication does not require an agent to handle the voice call. Therefore, the handle communication module may be provided information along with the notification of the communication indicating the communication is to be an outbound voice call for the purpose of playing a message.

As for other channels of communication such as chats, texts, and emails, the contact center may use some type of technology, such as optical character recognition for example, to analyze the content of a communication to determine that an agent is not required to handle the communication. For example, a party may send the contact center a text message requesting information on a particular product and the contact center may determine from the content of the text message what information is being requested and return the information to the party without having to involve an agent.

Accordingly, if the handle communication module determines the communication does not require an agent, then the module sets the state of the new assembly to active and the state of the new session to terminated/inactive in Operation 765. For instance, in particular embodiments, the handle communication module carries out this operation by sending one or more messages to a set state module (detailed in FIG. 9).

In addition, the module links the communication to the new assembly and session in Operation 790. For instance, in particular embodiments, the handle communication module updates the ASSEMBLIES, SESSIONS, ASSEMBLIES_TO_SESSIONS, INSTANCES, and SESSIONS_TO_INSTANCES structures 340, 350, 380, 360, 390 to reflect the relationships between the communication, new assembly, and new session. In addition, in particular embodiments, the handle communication module records any known information for the communication.

However, if instead the handle communication module determines the communication does require an agent in Operation 780, then the module selects an agent to handle the inbound communication in Operation 785. As detailed below, this particular operation is carried out by the handle communication module in different ways in various embodiments depending on the contact center. For instance, in particular embodiments, the handle communication module may be configured to select an available agent based on length of time the agent has been available (e.g., a first in, first out selection process). In addition, the handle communication module may be configured to select an available agent from a pool of agents having the required skills to handle the communication. Those of ordinary skill in the art can envision other selection criteria the handle communication module may use to select an agent in light of this disclosure.

Once the agent has been selected, the handle communication module determines whether the selected agent can handle the communication in Operation 755. As discussed earlier, different agents possess different skill levels with respect to their multi-tasking abilities and thus, different agents are able to handle different combinations of communication sessions. Therefore, in various embodiments, the handle communication module is configured to determine whether the selected agent has the capacity to handle the additional communication with respect to the communications sessions the agent is currently handling. For instance, the handle communication module is configured in particular embodiments to carry out this operation by invoking an agent capacity module (detailed in FIG. 8) to assess the selected agent's capacity to handle the communication.

If the selected agent is unable to handle the communication, then the handle communication module returns to Operation 785 and selects a different agent. However, if the selected agent is able to handle the communication, then the handle communication module routes the inbound communication to the selected agent in Operation 760. In addition, in particular embodiments, the handle communication module sets the states for the communication session and assembly associated with the communication by sending one or more messages to the set state module (detailed in FIG. 9) in Operation 765.

As a result, the selected agent's display (e.g., graphical user interface ("GUI")) may be updated to alert the agent to the inbound communication and to provide any information known for the communication. For instance, the alert may indicate the inbound communication involves an unknown party. Accordingly, the agent is then made aware that he or she should inquire as to whether the party is actually new or whether the party was not recognized because he or she is using a new contact. In either case, the agent should update the contact center's records accordingly (e.g., update the PARTY structure 300 by recording a new party in the structure 300 and/or update the CONTACTS structure 540 by recording a new entry for the party in the structure 540 to reflect the new contact).

Finally, the handle communication module links the communication with the new assembly and session in Operation 790. In addition, the handle communication module may record any known information for the communication such as, for example, the identifier for the agent selected for the assembly and session in the SESSIONS structure 350. At this point, the agent begins to engage the party by responding to the inbound communication received from the party.

Returning for a moment to the assumption that an inbound communication received from an unknown contact is not part of an ongoing (active or suspended) assembly, this assumption may not be true in some situations. For instance, an agent may be conversing with a party on a voice call and the party decides to send the agent some information in an email. The agent provides the party his email address and the party sends the information in an email accordingly. However, the party has never communicated with the contact center before using her email address and as a result, the contact center does not have the party's email address in its records. Therefore, when the email is received by the contact center, the handle communication module queries the contact center's recorded contacts, does not find a contact matching the party's email address, and thus determines the party who sent the email is unknown. Accordingly, the handle communication module begins a new assembly and session for the email, selects an agent, and routes the email to the selected agent although the email is actually part of an active assembly. As a result, the email never reaches the agent who is actually conversing with the party on the voice call.

To handle such situations, the contact center in particular embodiments may instruct agents to ensure that a contact being used by a party to send an inbound communication during an interaction with the party (during an active or suspended assembly with the party) is recorded in the contact center's records (e.g., is recorded in the CONTACTS structure 540) prior to the party using the contact to send the inbound communication. This way when the inbound communication is received, the handle communication module queries the contact center's known contacts and finds the party's contact being used to send the inbound communication. While in other embodiments, the agents may provide the parties with some type of identifying information to provide in the inbound communications so that the parties are recognized upon receipt of the communications. For example, if the inbound communication is a chat, the agent may first provide the party with some type of identifying information. The party may then visit a website associated with the contact center, start a chat session, and provide the identifying information in a chat message so that the party is recognized and the handle communication module can route the chat to the agent accordingly.

While further, in particular embodiments, the contact center may handle such situations by having the handle communication module also consider the contact the communication has been sent to in determining whether the inbound communication is associated with an active assembly. For instance, returning to the example involving the inbound email, if the handle communication module is configured to also consider the contact the communication was sent to, then the module may determine the email has been sent to an agent's email address who is actively engaged in an assembly. Here, the handle communication module, upon determining the agent is actively engaged in an assembly, may then inquire the agent as to whether he or she is expecting an email for the agent's assembly. The agent may respond back yes and identify the assembly associated with the email. Thus, the handle communication module may route the email to the agent accordingly.

Returning now to Operations 715 and 725, if the handle communication module instead determines the communication is an outbound communication at Operation 715 or the contact used to send the inbound communication is known at Operation 725, then the handle communication module queries information for the party associated with the known contact (that is, the party who is receiving the outbound communication or the party who sent the inbound communication) in Operation 730. Such information may include, for example, the party name, address, and the contacts known for the party. For instance, returning to the example where the party and agent are conversing on a chat and the agent and party decide to end the chat and continue their conversation over text. Assuming the party's telephone number for his mobile device is recorded in the contact center's records, the handle communication module would determine the telephone number is known and would query information for the party associated with the known telephone number.

Next, the handle communication module queries the assemblies that are currently being handled by agents (e.g., assemblies that are currently active or suspended) for the contact center based on the party's information in Operation 735. The purpose of this query is to determine whether the party is associated with an existing assembly that is currently active or suspended in Operation 740. Therefore, returning to the example, the handle communication module queries the parties associated with assemblies that are currently active or suspended and finds an assembly that is currently suspended involving the party who is to receive the text message being sent.

If the handle communication module does determine an active or suspended assembly exists for the party associated with the communication, then the handle communication module determines whether the communication is part of a session that is actively being handled by an agent for the assembly or is reserved for the assembly in Operation 745. Recall that in particular embodiments, a session using a particular channel of communication may be reserved to resume a suspended assembly at a later time. Thus, in various embodiments, the handle communication module determines whether any of the sessions that are actively being handled by an agent for the assembly or are reserved for the assembly involve the same channel of communication as the channel used for the communication. For example, in particular embodiments, the handle communication module determines whether a session for the assembly in the SESSIONS structure 350 has a state 331 of "connected," "active," "reserved," "pending," "ringing," "attention needed," or "paused/hold" and a channel type 321 that matches the channel of communication used for the communication.

If the handle communication module determines that such a session exists for the communication, then the handle communication module routes the communication to the appropriate agent in Operation 760 and sets the state for the session as required in Operation 765. In addition, the handle communication module links the communication to the assembly and session in Operation 790. For instance, in particular embodiments, the handle communication module records a new instance in the INSTANCES structure 360 for the communication and links the new instance to the corresponding session in the SESSIONS_TO_INSTANCES structure 390. At this point, the agent then handles the communication as required.

However, returning to Operation 745, if the handle communication module instead determines a session that is actively being handled by agent for the assembly or is reserved for the assembly does not exist for the communication, then the handle communication module responds to such a determination by beginning a new session for the text message in Operation 750. Thus, in particular embodiments, the handle communication modules carries out this operation by placing an entry for the communication in the INSTANCES structure 360, placing an entry for the new session in the SESSIONS structure 350, and linking the new instance to the new session in the SESSIONS_TO_INSTANCES structure 390.

At this point, the handle communication module determines whether the agent involved in the associated assembly is needed to handle the communication in Operation 770. For instance, if the communication is an inbound communication, then the communication may simply be providing information to the contact center that does not require a response from the agent. For example, the party may have sent the contact center a text message confirming the party's agreement to a charity donation. Here, the agent does not necessarily need to respond to the text message. Instead, the contact center may simple record the text message as a confirmation. Therefore, in this instance, the handle communication module may determine from the message that the message is simply a confirmation and the agent is not needed to handle the text message.

Therefore, if an agent is not needed, the handle communication module sets the state for the new session in 765. In addition, if the associated assembly is suspended, the handle communication module may set the state for the assembly back to active. Furthermore, the agent's display may be updated as result, informing the agent of the text message received from the party confirming the party's donation (e.g., informing the agent of the new text session). In addition, the handle communication module links the communication with the created session and associated assembly in Operation 790. Specifically, in particular embodiments, the handle communication module links the new session to the associated assembly in the ASSEMBLIES_TO_SESSIONS structure 380.

Returning to Operation 770, if the handle communication module instead determines the agent involved in the active or suspended assembly is needed to respond to the communication, then the handle communication module determines whether the agent is able to handle the communication in Operation 755. As previously mentioned, in particular embodiments, the handle communication module carries out this particular operation by invoking an agent capability module (detailed in FIG. 8).

If the handle communication module determines the agent involved in the assembly cannot handle the communication, then the module in particular embodiments routes to Operation 785 to select a different agent to handle the communication. In addition, the handle communication module may communicate to the agent involved in the assembly that a new communication has been received for the assembly the agent is engaged in, however the communication is unable to be routed to the agent because the agent does not currently have the capability/capacity to handle the additional communication. In some embodiments, the agent may be able to override the handle communication module and have the module route the communication to the agent anyway. However, in other instances, the handle communication module may simply select a new agent in Operation 785 to handle the communication without giving the agent the opportunity to override the module. At this point, the handle communication module carries out the operations to select a new agent and route the communication to the new agent as previously described.

Thus, the communication is routed to the agent in Operation 760 and the state(s) are set for the corresponding session and assembly in Operation 765 and the session and assembly are linked in Operation 790. It is noted that depending on the embodiment, the operation to set the state(s) for the session and assembly (Operation 765) and the operation for linking the session to the assembly (Operation 790) may be performed by the handle communication module in a different order or at virtually the same time.

Agent Capacity Module

Figure 8:
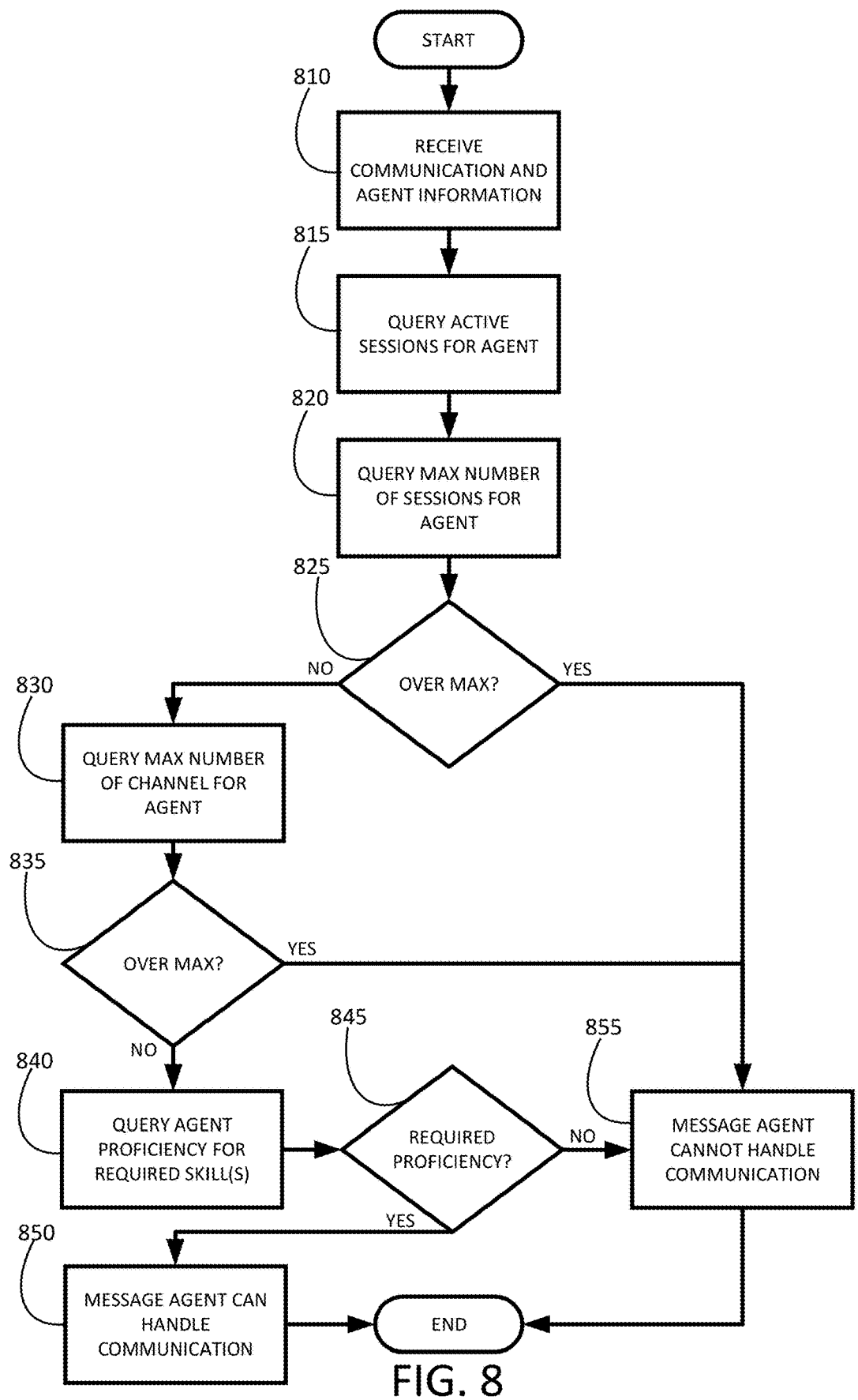
FIG. 8 illustrates a process flow for determining whether an agent can handle a particular communication in accordance with various embodiments of the present invention.

Turning now to FIG. 8, additional details are provided regarding a process flow for determining whether an agent can handle a particular communication according to various embodiments of the invention. In particular, FIG. 8 is a flow diagram showing an agent capacity module for performing such functionality according to various embodiments of the invention. For example, the flow diagram shown in FIG. 8 may correspond to operations carried out by one or more processors in one or more components, such as, for example, the communications handler 250 described above, as it executes the agent capacity module stored in the component's volatile and/or nonvolatile memory.

The process flow begins with the agent capacity module receiving information on a communication and agent in Operation 810. As previously mentioned, the agent capacity module may be invoked by the handle communication module upon the handle communication module selecting a particular agent to potentially handle a communication the contact center is placing/sending or has received. Accordingly, the information received by the agent capacity module may include different elements depending on the embodiment. However, in general, the information identifies the type of communication (e.g., the channel of communication) and the agent selected as the candidate to handle the communication.

Accordingly, in Operation 815, the agent capacity module queries the sessions that are actively being handled by the agent. This particular query is performed to identify the capacity of the selected agent currently being used to handle sessions. For instance, in particular embodiments, the agent capacity module queries the SESSIONS structure 350 for the sessions associated with the selected agent's identifier 311 and have a state 331 as "connected," "active," "pending," "ringing," "attention needed," and "paused/hold."

At this point, the agent capacity module also queries the maximum number of sessions the agent can handle at any given time in Operation 820. For instance, in particular embodiments, the agent capacity module queries the value from the AGENTS structure 310. Recall that in some instances, the maximum number of sessions may be contingent on the mix of sessions the agent is currently handling. For example, the maximum number may be one value if the agent is currently handling a voice call session and a second, different value if the agent is not currently handling a voice call session.

Once the agent capacity module knows the number of sessions the agent is currently handling and the maximum number of sessions the agent can handle at any given time, the agent capacity module determines whether adding a session for the new communication will result in the agent having a number of sessions he or she is actively handling over his or her allowable maximum in Operation 825. If adding a session for the new communication will result in the agent having a number of sessions he or she is actively handling over his or her allowable maximum, then the agent capacity module sends a message indicating the agent cannot handle the communication in Operation 855. For instance, in particular embodiments, the agent capacity module sends the message to the handle communication module.

However, if the agent capacity module instead determines adding a session for the new communication will not result in the agent having a number of sessions he or she is actively handling over his or her allowable maximum, then the agent capacity module must determine whether the new communication will result in the agent having too many sessions involving the same channel of communication as used for the new communication. Therefore, in Operation 830, the agent capacity module queries the maximum number of sessions the agent is allowed to actively have for the channel of communication used for the new communication. For instance, in particular embodiments, the agent capacity module queries the value from the CHANNELS_FOR_AGENTS structure 530. Again, the maximum number of sessions for the channel of communication may be contingent on the mix of sessions the agent is currently handling.

Once the agent capacity module knows the number of sessions the agent is allowed to handle at any given time for the channel of communication, the agent capacity module determines in Operation 835 whether the new communication will result in the agent having a number of sessions he or she is actively handling and involving the channel of communication over the maximum number of sessions allowed for the channel of communication. If so, then the agent capacity module sends a message indicating the agent cannot handle the communication in Operation 855. Again, in particular embodiments, the agent capacity module sends the message to the handle communication module.

However, if instead the agent capacity module determines the new communication will not result in the agent having a number of sessions he or she is actively handling and involving the channel of communication over the maximum number of sessions allowed for the channel of communication, then the agent capacity module determines whether the selected agent has a high enough proficiency level for any skills required to handle the communication in Operation 840. For instance, in particular embodiments, the agent capacity module queries the agent's proficiency for any required skills to handle the communication from the CHANNEL_SKILLS_FOR_AGENTS structure 550.

Once the agent capacity module knows the agent's proficiency level for any required skills to handle the communication, then the agent capacity module determines in Operation 845 whether the agent has a high enough proficiency level for any required skills to handle the communication. If not, then the agent capacity module sends a message indicating the agent cannot handle the communication in Operation 855. However, if the agent does have a high enough proficiency level for any required skills to handle the communication, then the agent capacity module sends a message indicating the agent can handle the communication in Operation 850.

As noted above, the handle communication module invokes the agent capacity module in various embodiments to determine whether a selected agent can handle a particular communication prior to routing the communication to the agent. However, other components within the contact center may also invoke the agent capacity module. For instance, in particular embodiments, an agent's workstation, the communications handler 250, the email server 235, the text gateway server 240, and/or web server 245 may invoke the agent capacity module to determine whether an agent is authorized to originate an outbound communication to a party using a particular channel of communication prior to initiating the outbound communication. For instance, returning to the example, an agent may be conversing with a party on a chat and may decide to end the chat and continue their conversation via text. Here, the agent's workstation and/or the text gateway server 240 may first invoke the agent capacity module prior to the agent ending the chat with the party and/or prior to initiating the text message to the party to determine whether the agent has the capacity to handle a text session along with the other sessions the agent is actively handling at that time. If not, then the agent's workstation and/or the text gateway server 240 may have a message displayed to the agent informing him or her that he or she is not authorized to start a text session. In addition, the message may also indicate to the agent whether any other channel of communication may be used at that time.

Set State Module

Figure 9:
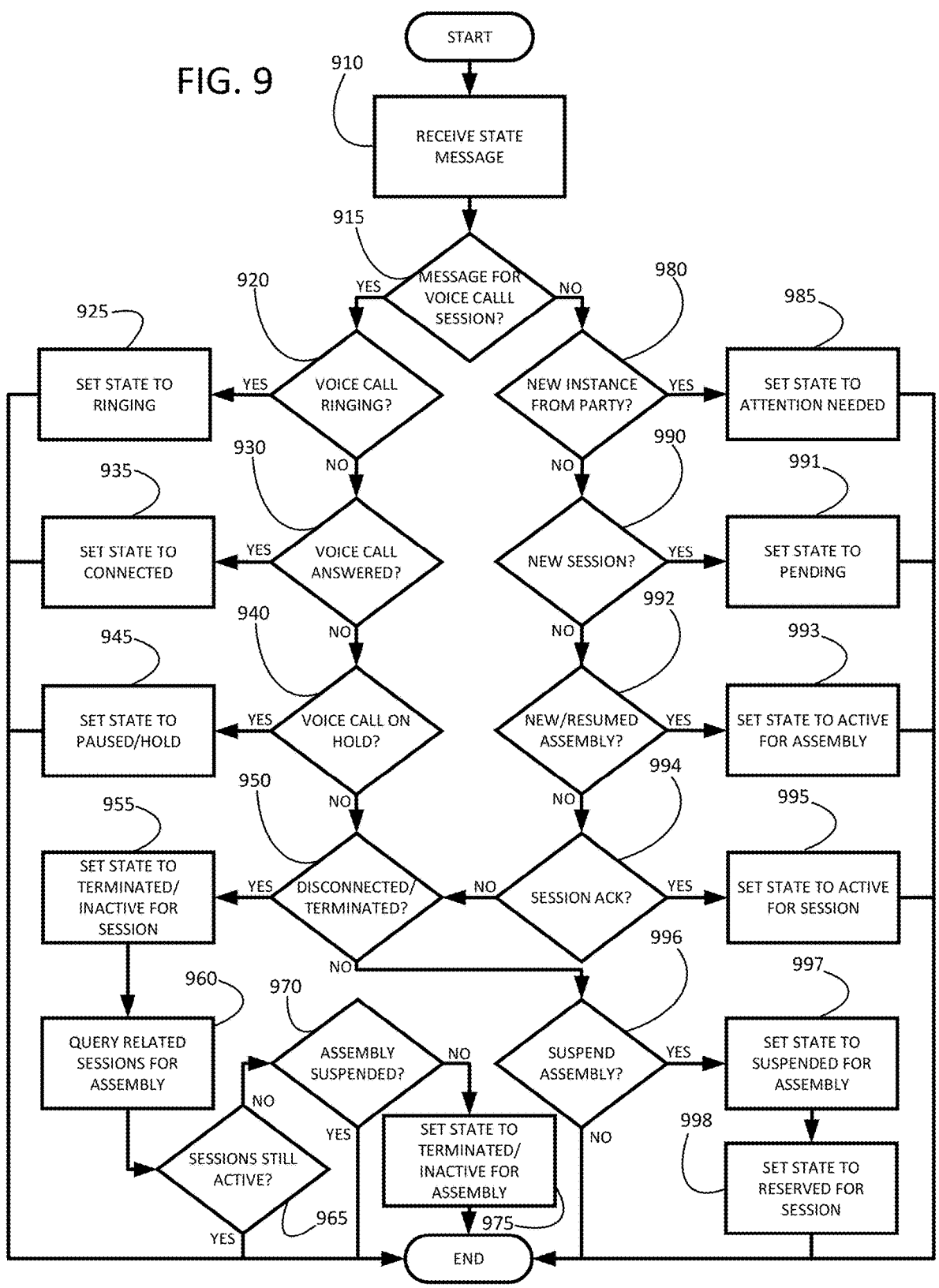
FIG. 9 illustrates a process flow for changing the states of sessions and assemblies in accordance with various embodiments of the present invention.

Turning now to FIG. 9, additional details are provided regarding a process flow for changing the states of sessions and assemblies according to various embodiments of the invention. In particular, FIG. 9 is a flow diagram showing a set state module for performing such functionality according to various embodiments of the invention. For example, the flow diagram shown in FIG. 9 may correspond to operations carried out by one or more processors in one or more components, such as, for example, the communications handler 250 described above, as it executes the set state module stored in the component's volatile and/or nonvolatile memory.

Here, the set state module is configured to receive state messages from various components within the contact center. For example, the communications handler 250 may direct a call to an agent representing a new communication session for the agent to handle. Accordingly, the communications handler 250 may send the set state module a message informing the module of the voice call being directed to the agent and a second message informing the module that the agent has answered the call. While in other instances, agents' workstations may send the set state module messages as a result of agents performing different functionality on their workstations. For example, an agent may have a chat session that has been directed to the agent but the agent has yet to acknowledge the session. Therefore, upon the agent selecting the chat session to begin interacting with the party on the chat, the agent's workstation sends the set state module a message indicating the agent is now engaging with the chat session.

Thus, the process flow begins with the set state module receiving a state message in Operation 910. Depending on the embodiment, the state message may include information on various aspects with respect to a state change for a session and/or an assembly. For instance, the state message generally includes information identifying the session and/or assembly and information identifying what state the session and/or assembly should be set to.

Moving on, the set state module first determines whether the state message is for a session involving a voice call in Operation 915 based on the information provided along with the message. This particular operation is performed in various embodiments because voice call sessions have different states than non-voice communication sessions. Therefore, if the state message does involve a voice call session, then the set state module determines whether the message indicates the voice call has been directed to an agent in Operation 920 and thus, is ringing. If so, then the set state module sets the state to ringing for the voice call session in Operation 925. That is to say, in various embodiments, the set state module sets the state (STATE_ID 331) to "ringing" in the SESSIONS structure 350 for the particular voice call session.

If the state message does not involve a voice call ringing, then the set state module determines whether the message involves a voice call that has been answered in Operation 930. For instance, the communications handler 250 may detect when an agent answers a voice call and send the set state module a message accordingly. If the message involves a voice call that has been answered, then the set state module sets the state for voice call session to "connected" in Operation 935. Again, in various embodiments, this operation would involve the set state module setting the state (STATE_ID 331) to "connected" in the SESSIONS structure 350 for the particular voice call session.

However, if the state message does not involve a voice call being answered, then the set state module determines whether the message involves an agent placing a voice call on hold in Operation 940. For instance, an agent may be conversing with a party on a voice call and places the call on hold by selecting a "HOLD" button on his workstation. Accordingly, the agent's workstation sends a message to the set state module informing the module of the agent's actions. Therefore, if the set state module determines the message involves an agent placing a voice call on hold, then the set state module sets the state for the voice call session to "paused/hold" in Operation 945 (e.g., sets the state to "paused/hold" in the SESSIONS structure 350).

At this point, if the state message does not involve placing a voice call on hold, then the set state module determines whether the state message involves a voice call that has been disconnected in Operation 950. Here, for example, the communications handler 250 or an agent's workstation may detect when the agent disconnects a call and sends the set state module a message accordingly. If the message does involve a voice call being disconnected, then the set state module sets the state for the voice session to "terminated/inactive" in Operation 955.

In addition, in particular embodiments, the set state module also considers whether the termination of the voice call session also terminates the associated assembly. Therefore, the set state module in these embodiments queries the related sessions for the assembly in Operation 960 and then determines whether any of the related sessions for the assembly are still being actively engaged by the involved party in Operation 965. If so, then the assembly is still active. However, if the assembly does not have any sessions in which the party is still actively engaged, then the set state module determines whether the assembly has been suspended in Operation 970. For instance, in particular embodiments, the set state module performs this operation by querying the state of the assembly (STATE_ID 371) in the ASSEMBLIES structure 340 and determining whether the state is set to "suspended."

For instance, an agent may be on a phone call with a party and the agent and party may decide to end the call and continue communicating via text messages. Here, the agent may suspend the assembly and then end the call before sending the party a text message. Therefore, in this instance, the set state module would receive a message indicating the call has been disconnected and would query the state of the assembly to find the assembly has been suspended.

If the assembly has been suspended, then the set state module simply ends the process. However, if the set state module determines the assembly has not been suspended, then the set state module sets the state for the assembly to "terminated/inactive" in Operation 975. For instance, in particular embodiments, this operation involves the set state module setting the state (STATE_ID 371) in the ASSEMBLIES structure 340 to "terminated/inactive."

Returning now to Operation 915, if instead the set state module determines the state message does not involve a voice call session, then the message involves some non-voice communication session. Therefore, in various embodiments, the set state module first determines whether the message involves a new instance received from a party in Operation 980.

As the reader may recall, an instance represents a single communication transferred during a communication session. For example, in a text session, each text message sent by the party or the agent may be considered an instance for the text session. Thus, if an instance has been received from a party (e.g., a text message, a chat message, or email has been received from a party), then in general the party typically expects the agent to respond. Therefore, if the set state module determines the message involves a new instance received from a party, then the set state module sets the state for the involved communication session to "attention needed" in Operation 985 (e.g., sets the state to "attention needed" in the SESSIONS structure 350).

If the message does not involve a new instance from a party, then the set state module determines whether the message involves a new session in Operation 990. For instance, in particular embodiments, the handle communication module, as previously described, may send the set state module a message upon creating a new session for a new inbound or outbound communication. Thus, if the set state module determines the message does involve a new session, the module sets the state for the session to "pending" in Operation 991 (e.g., sets the state to "pending" in the SESSIONS structure 350). As previously discussed, a pending session is a session that has been assigned to an agent but the agent has not yet acknowledged the session.

At this point, if the state message does not involve a new session, then the set state module determines whether the message involves a new assembly or a suspended assembly that has been resumed in Operation 992. Again, as previous discussed, the handle communication module in particular embodiments may send the set state module a message upon creating a new assembly for a new inbound or outbound communication or upon resuming a suspended assembly. Thus, if the set state module determines the message does involve a new assembly or a suspended assembly that has been resumed, then the modules sets the state for the assembly to "active" in Operation 993 (e.g., sets the state to "active" in the ASSEMBLIES structure 340).

Continuing on, if the state message does not involve a new assembly or a suspended assembly that has been resumed, then the set state module determines whether the message involves an agent acknowledging a session in Operation 994. For instance, a new text session may have been assigned to an agent however the agent had not yet engaged with the session on his workstation (e.g., the text session's state is "pending"). Therefore, upon the agent selecting the new text session to engage with the session on his workstation, the workstation sends a state message to the set state module informing the module that the agent has acknowledged the new text session. Accordingly, the set state module would then set the state for the session to "active" in Operation 995 (e.g., sets the state to "active" in the SESSIONS structure 350).

Continuing further, if the state message does not involve a session that has been acknowledged by an agent, then the set state module determines whether the state message involves a session being terminated in Operation 950. Recall that the termination of a non-voice session may be triggered by different mechanisms depending on the embodiment. For instance, a timer may be set to measure the time between instances for a communication session that upon expiry signals the termination of the session. Further, the agent may take some action such as closing down a chat window or selecting some functionality on his or her workstation to signal the termination of a session. Accordingly, such mechanisms may trigger the sending of a state message to the set state module indicating a session has terminated.

If the state message does involve a session being terminated, then the set state module performs the operations already discussed above. These include setting the state for the session to "terminated/inactive" in Operation 955, querying the related sessions for the assembly related to the terminated session in Operation 960, determining whether any of the related sessions for the assembly is still active in Operation 965, if not, then determining whether the assembly has been suspended in Operation 970, and if not, setting the state to "terminated/inactive" for the assembly in Operation 975 (e.g., sets the state to "terminated/inactive" in the ASSEMBLIES structure 340).

However, if the state message does not involve a session being terminated, then the set state module determines whether the state message involves an assembly that has been suspended in Operation 996. If so, then the set state module sets the state for the assembly to "suspended" in Operation 997 (e.g., sets the state to "suspended" in the ASSEMBLIES structure 340). In addition, the set state module may set the state for a session that is to be activated to resume the assembly to "reserved" in Operation 998. In particular embodiments, this Operation 998 may entail the set state module creating the session that is be activate to resume the assembly, setting the state for the created session to reserved, and linking the reserved session to the suspended assembly. If the state message does not involve a session being suspended, then the set state module simply ends.

Here, in particular embodiments, the set state module may send some type of error message indicating the module has received a state message but the module could not determine from the message what state action to perform. The error message may allow for the contact center to troubleshoot why the set state module received the message and/or why the set state module could not determine what action to take as a result of receiving the message.

Finally, in various embodiments, the setting of a state for a session and/or assembly results in the corresponding agent's GUI who is involved with the session and/or assembly being updated to reflect the state. For instance, in particular embodiments, an updated to a state in the SESSIONS structure 350 or ASSEMBLIES structure 340 causes a trigger to occur that sends a message to an agent GUI module (detailed in FIGS. 17-21) so that the corresponding agent's GUI is updated to reflect the state for the session and/or assembly involved.

Agent GUI

Figure 10:
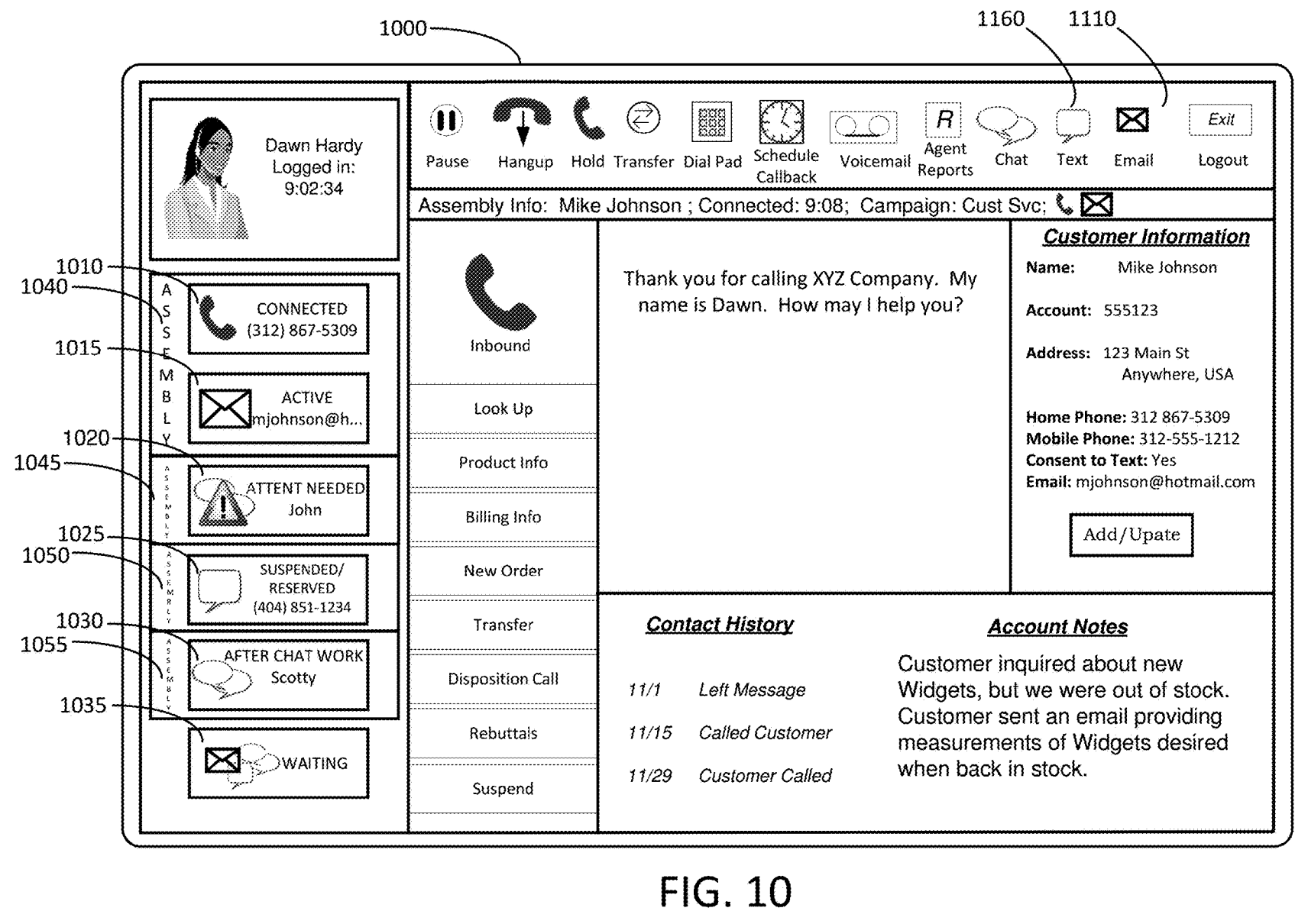

FIG. 10 illustrates a graphical user interface ("GUI") 1000 that may be used in various embodiments by an agent that may be engaged in assemblies having multiple sessions. Here, the GUI 1000 presents the agent with high level information on a number of communications sessions 1010, 1015, 1020, 1025, 1030, 1035 and associated assemblies 1040, 1045, 1050, 1055 as well as detailed information about a particular session that has been selected by the agent. In this instance, the currently selected communication session is a voice call session. Although the GUI 1000 provides various icons, functions, and information, the icons, functions, and information are carefully organized on the GUI 1000 to facilitate an agent's interaction with the various communication sessions 1010, 1015, 1020, 1025, 1030, 1035 and associated assemblies 1040, 1045, 1050, 1055. The various sections of the GUI are discussed in FIGS. 11-16C.

Figure 11:
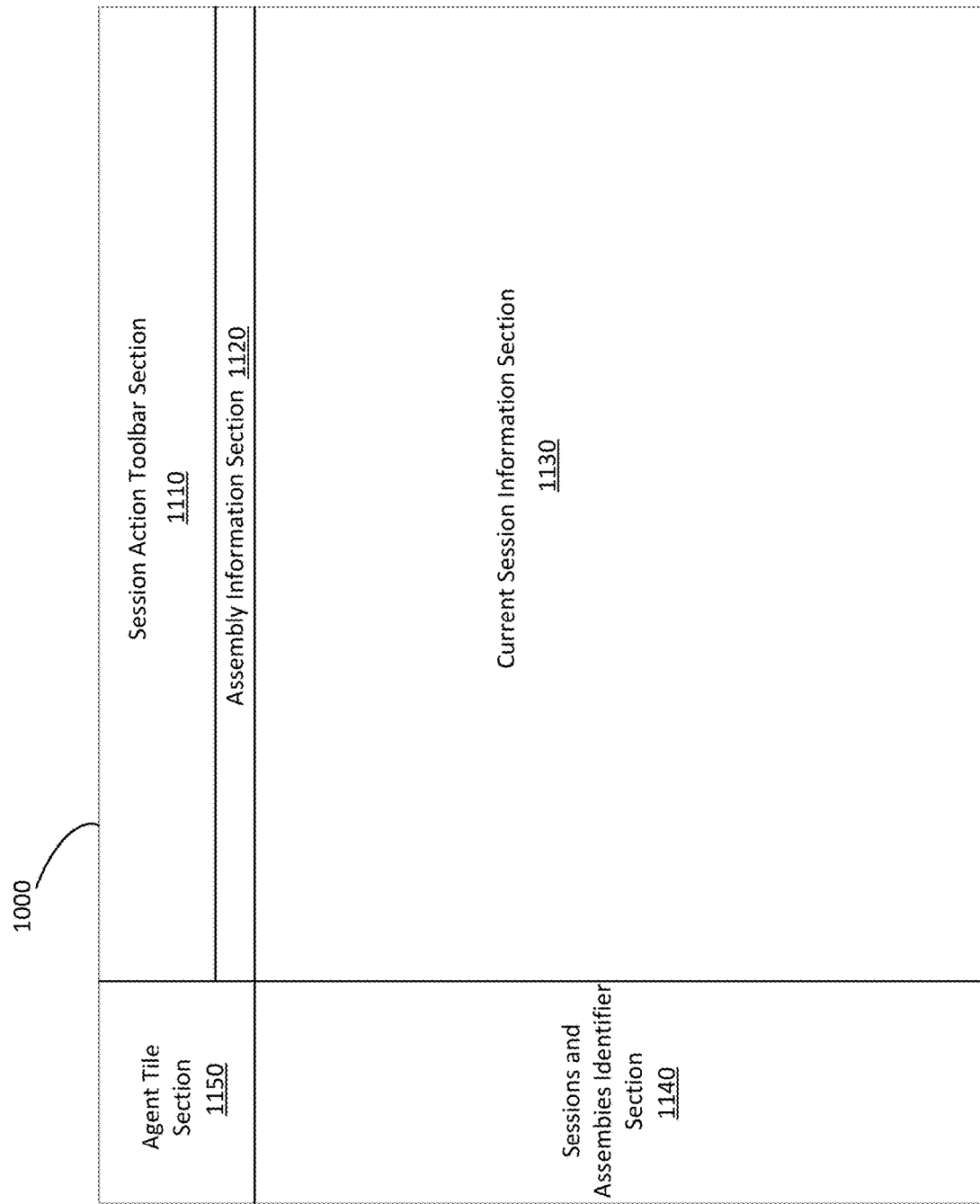
FIG. 11 illustrates the GUI of FIG. 10 without presentation of the various icons, functions, and information.

Turning to FIG. 11, this figure shows the main sections of the GUI 1000 without presentation of the various icons, functions, and information. In particular embodiments, each section of the GUI 1000 is a self-contained set of information that is displayed to the agent and has a distinct purpose, although that purpose may be related to other sections. The sessions and assemblies identifier section 1140 of the GUI 1000 contains information about the various communication sessions and assemblies being handled by the agent, but with limited information about each. Here, the sessions and assemblies identifier section 1140 displays information about the communications sessions and related assemblies the agent is handling at a given time, what channel of communication is being used for each session, state information for each session, and information delineating what party is involved in each session. That is to say, the sessions and assemblies identifier section 1140 of the GUI 1000 provides a comprehensive summary of the communication sessions, associated assemblies, attributes, and state information. In addition, the sessions and assemblies identifier section 1140 allows the agent to select a communication session to interact with. Thus, the sessions and assemblies identifier section 1140 allows the agent to control which session for a particular assembly is currently selected, and this selection impacts other sections of the GUI 1000 that the agent is viewing, such as the current session information section 1130.

The current session information section 1130 of the GUI 1000 displays information pertinent to the communication session currently selected by the agent, although in some instances a communication session may be automatically selected for the agent based on an event such as, for example, an incoming voice call. The current session information section 1130 in various embodiments presents information related to the selected session and/or functions the agent can invoke that are associated with the selected session. For this reason, the structure of the current session information section 1130 in particular embodiments for a selected communication session is largely dependent on the channel of communication being used for the selected communication session. That is say, in particular embodiments, the current session information section 1130 of the GUI 1000 is structured in a first format if the selected communication session is a voice call, is structured in a second, different format if the selected communication session is a chat, and so forth.

The assembly information section 1120 provides the agent with information about the assembly associated with the currently selected communication session. In particular embodiments, this section 1120 may also include information about a contact center campaign associated with the assembly. Accordingly, in various embodiments, the contents of the assembly information section 1120 generally changes as a communication session involving a different assembly is selected.

With that said, the session action toolbar section 1110 of the GUI 1000 displays icons for invoking functions for the currently selected communication session and associated assembly. For instance, the agent can select the text icon 1160 (shown on FIG. 10) to send a text message to a party. Here, the functions displayed in the session action toolbar section 1110 may be applicable to the specific channel of communication associated with the selected session and thus, the functions displayed in the session action toolbar section 1110 may vary based on the selected communication session.

For example, looking briefly at FIG. 10, the session action toolbar session 1110 provides a listing of icons representing functions for controlling a voice call and performing common communication functions for voice calls such as, for example, scheduling a callback or checking voice mail. Other functions shown in FIG. 10 include administrative functions, such as logging out from the contact center system or generating a report, as well as initiating another session for the assembly associated with the voice call such as a chat, text, or email.

Finally, returning to FIG. 11, the agent tile section 1150 of the GUI 1000 contains information about the agent that is currently logged into the communications handler system 250 and using the display with the GUI 1000. Depending on the embodiment, the agent tile section 1150 may include the name of the agent, a photo/image associated with the agent, and other specific information for the agent such as, for example, the agent's current shift statistics, key performance indicators, etc. Typically, portions of the agent tile section 1150 are static, such as the photo/name for example, and do not change based on the communication session selected by the agent or associated assembly. However, other portions of the section 1150, such as performance indicators for example, may be specific to the currently selected communication session and/or associated assembly.

Figure 12:
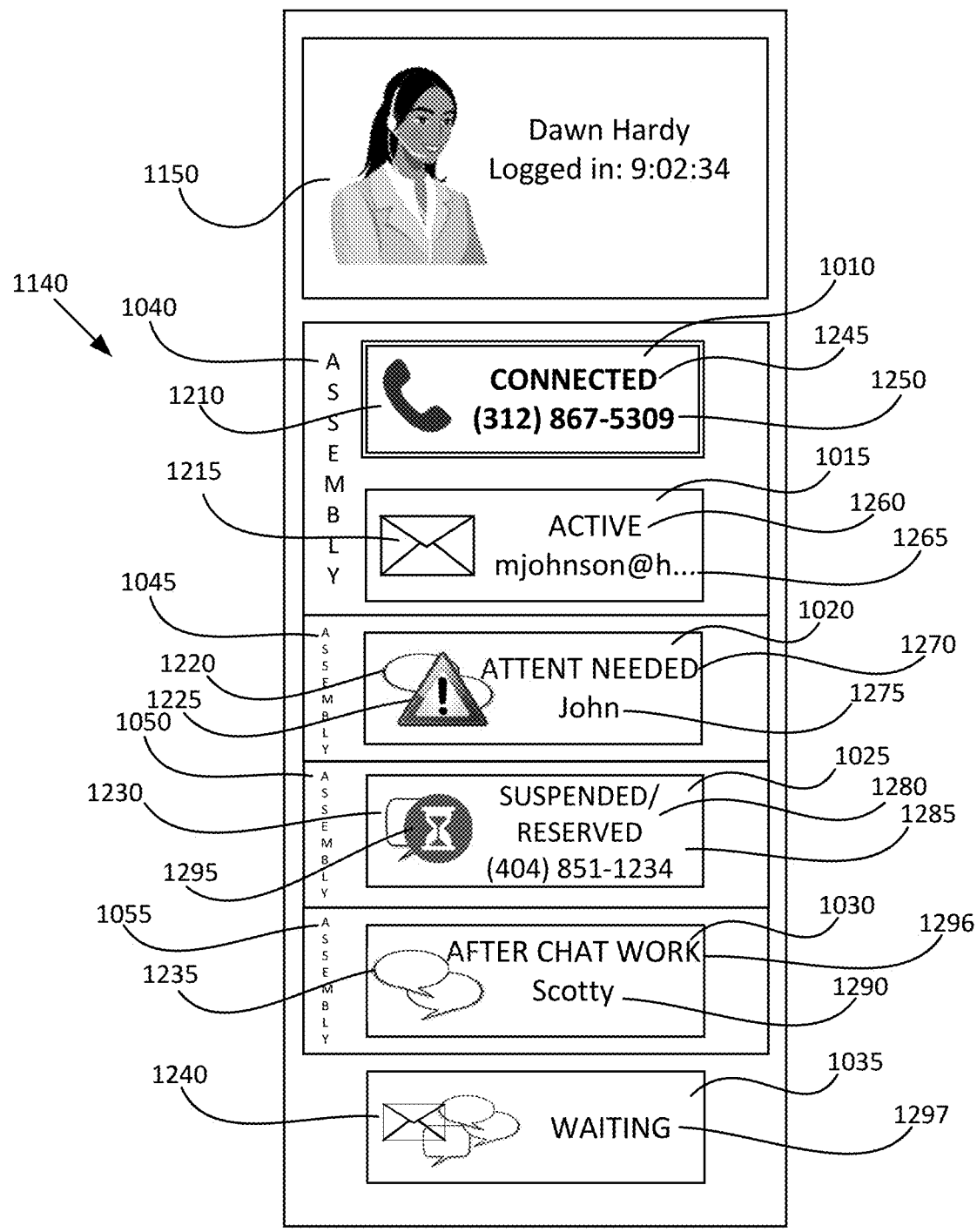
FIG. 12 provides greater detail on the agent section and the sessions and assemblies identifier section of the GUI of FIG. 10.

Turning now to FIG. 12, this figure provides greater detail on the agent tile section 1150 and the sessions and assemblies identifier section 1140 of the GUI 1000. The agent tile section 1150 may be used to indicate the agent currently logged in and using the GUI 1000. Some type of image such as a photo or caricature of the agent may be included in this section 1150 along with the agent's name, nickname, identification number, or other identifier. Other information may be included such as, for example, the time the agent has been logged in for the shift.

The sessions and assemblies identifier section 1140 shows various communication session identifiers ("CSI") 1010, 1015, 1020, 1025, 1030, 1035 along with identifiers for corresponding assemblies 1040, 1045, 1050, 1055. Accordingly, each CSI 1010, 1015, 1020, 1025, 1030, 1035 represents an active session, a suspended session, or a potentially active session for the agent. Here, the sessions and assemblies section 1140 includes six CSIs 1010, 1015, 1020, 1025, 1030, 1035, indicating the agent in this instance may have up to six communication sessions he or she is handling at virtually the same time. Furthermore, the CSIs 1010, 1015, 1020, 1025, 1030, 1035 shown on the sessions and assemblies section 1140 reflects the agent may only handle one voice call session along with five non-voice communication sessions at any given time. As previously noted, in various embodiments, the maximum number of communications sessions that an agent can handle at any given time is agent specific. Therefore, the reader should understand the configuration of the sessions and assemblies identifier section 1140 shown in FIG. 12 is specific for this particular agent and may look differently with respect the CSIs 1010, 1015, 1020, 1025, 1030, 1035 provided in the section 1140 for other agents.

For this particular configuration, each CSI 1010, 1015, 1020, 1025, 1030, 1035 includes an indication of the channel of communication associated with the session. Depending on the embodiment, the indication for the channel of communication may be an icon, text, color, or combination thereof. In addition, each CSI 1010, 1015, 1020, 1025, 1030, 1035 typically includes an indication of the state of the session. Again, this indication may also be an icon, text, color, or combination thereof depending on the embodiment.

Here, the voice call CSI 1010 shows a state indicator "Connected" 1245 and a telephone number 1250 associated with this communication session. A telephone icon 1210 provides a visual indicator of the type of communication session, which in this case is a voice call. In particular embodiments, the telephone icon 1210 may have different positions/shapes to represent different states. For example, the icon 1210 may have a first position for a connected call and a second position for a call on hold. In the figure, the voice call CSI 1010 is shown as selected as reflected by the text shown in bold font and a different border. Accordingly, a CSI 1010 that is selected may be differentiated in some manner from the other CSIs 1015, 1020, 1025, 1030, 1035 to indicate to the agent which CSI 1010, 1015, 1020, 1025, 1030, 1035 is presently selected. In various embodiments, the agent can select a CSI 1010, 1015, 1020, 1025, 1030, 1035 using a mouse, pointing device, keyboard, touch screen, or other such means. In particular embodiments, only the agent can manually select a CSI 1010, 1015, 1020, 1025, 1030, 1035. While in other embodiments, an event may result in selecting a CSI 1010, 1015, 1020, 1025, 1030, 1035, such as a voice call being directed to the agent.

As shown in FIG. 12, a CSI 1010, 1015, 1020, 1025, 1030, 1035 may have text to reflect the state of the associated session. In addition, a CSI 1010, 1015, 1020, 1025, 1030, 1035 may have a particular color, shading, or pattern to reflect the state of the associated session. That is to say, different text/colors/shades/patterns can be used to represent different states. For example, a voice call CSI 1010 that is in a "CONNECTED" state may be indicated in bright green to reflect the agent is actively engaged in the voice call. However, if the agent places the voice call in a "HOLD" state, then the voice call CSI 1010 may have a different shade of green to reflect a connected voice call on hold. Furthermore, a CSI 1010, 1015, 1020, 1025, 1030, 1035 may reflect party information such as the party's contact such as a telephone number 1250, 1285 or an email address 1265, as well as a party's name 1275, 1290. Such information can be useful to distinguish communication sessions from each other when an agent has two or more communication sessions using the same channel of communication.

The next CSI 1015 shown in the sessions and assemblies identifier section 1140 below the voice call CSI 1010 is for an email session. This CSI 1015 is identified in part by the presence of an email icon 1215 and is characterized by the state indicator "ACTIVE" 1260 and an email address 1265 of the party involved in the email session. Here, since the session is a non-voice communication session, the state indicator is "ACTIVE" 1260 as opposed to "CONNECTED" 1245 as in the case of a voice call. Accordingly, in particular embodiments, the "ACTIVE" state 1260 for non-voice communication sessions reflects the initial non-voice communication for the session has been reviewed by the agent and the session is still ongoing. If the email message had been queued up for the agent but had not yet been reviewed by the agent, then the state indicator may have another value such as "PENDING" for example.

The next CSI 1020 shown in the sessions and assemblies section 1140 is for a chat communication session. This CSI 1020 is identified in part by the presence of the chat bubbles icon 1220. In this instance, the chat communication session is marked as being in an "ATTENT NEEDED" state 1270 (attention needed state), indicating the chat communication session is in need of some action by the agent (e.g., a response to a chat message from the party). In addition, the CSI 1020 indicates a name 1275 of the party involved in the chat session. The party's name 1275 is generally provided by the party upon starting up the chat session. Again, the party's name 1275 may be useful in distinguishing this chat session from another chat session. Further, a warning symbol icon 1225 has been overlaid onto the CSI 1020 to inform the agent that a response to a chat message from the party has not been provided in an expected time frame.

Recall that a voice call typically demands a higher degree of agent interaction than a non-voice communication. Thus, it may not be unusual for a chat message from a party to go unanswered by an agent for three, ten, or twenty seconds. However, the party may become annoyed at a lack of response from the agent after say, for example, sixty or ninety seconds. Therefore, a response timer may be used in particular embodiments to remind the agent to provide a timely response. Accordingly, the response timer may be started upon the agent receiving a communication in a session and canceled upon the agent sending a response to the communication. Otherwise, an expiry of the response timer may result in displaying some type of indicator such as the warning symbol icon 1225 for the chat session to remind the agent to respond to the party's chat message. Here, the warning symbol icon 1225 serves to draw the agent's attention to this communication session.

Those of ordinary skill can appreciate that different response timer values may be used for different channels of communication in light of this disclosure. For example, a response timer for an email message may likely be set for a longer amount of time than a response timer for a chat message because a party who has sent an email may not expect a response to an email for several minutes to hours instead of several seconds like a party who has sent a chat message.

The next CSI 1025 shown in the sessions and assemblies section 1140 is for a text session. Here, the CSI 1025 is characterized by a text bubble icon 1230, shows the text session is in a "SUSPENDED/RESERVED" state 1280, and provides a corresponding telephone number 1285. The "SUSPENDED/RESERVED" state 1280 indicates that the assembly associated with the text session has been suspended and the text session has been reserved for the agent to continue the assembly at a later time. In particular embodiments, when an agent wants to suspend an assembly, the agent selects a button on the GUI 1000 that allows the agent to change the state of the assembly from active to suspended. At that time, the agent is prompted to select a channel of communication to use when the assembly is resumed. This is done so that a session is reserved for the agent so he or she will have availability to begin the session and resume the assembly at the appropriate time. If the agent is not able to reserve the particular channel of communication for the session, the agent is advised of such so that the agent can take appropriate action such as, for example, selecting a different channel of communication or not suspending the assembly at all.

In addition, the CSI 1025 is shown with an hourglass icon 1295. Here, the hourglass icon 1295 indicates to the agent that the time delay before resuming the assembly via the reserved channel of communication has expired and therefore, the agent should initiate contact with the party using the reserved channel of communication. For example, when the agent suspended the assembly and ended the current interact with the party, the party may have indicated that he would like to resume the interaction via the reserved channel of communication in twenty minutes. Therefore, a timer is set for the suspended assembly and a notification such as the hourglass icon 1295 shown in FIG. 12 is provided once the twenty minutes has expired to indicate to the agent that he or she should initiate contact with the party using the reserved channel of communication.

The next CSI 1030 shown in the sessions and assemblies section 1140 is for another chat session, as evidenced by the chat icon 1235. However, this CSI 1030 reflects the chat session is in an "AFTER CHAT WORK" state 1296. The term "after call work" originated in contact centers in regard to voice calls and refers to the work an agent carries out after the voice call has ended, but before the next call is handled. Thus, in various embodiments, the "AFTER CHAT (CALL, TEXT, EMAIL) WORK" state reflects the communication interaction (e.g., the chat exchange, voice call, text message exchange, or email exchange) between the agent and the party is completed for the session, however the agent is carrying out work as a result of the interaction that occurred during the session. Thus, the contact center still considers the session, itself, to be active and not completed when a communication session is in an "AFTER CHAT (CALL, TEXT, EMAIL) WORK" state since the agent involved in the session is engaged in work related to the session. Although this particular state is not discussed above in the process flow for the set state module, a check for such a state could be added to the process flow shown in FIG. 9.

Finally, the last CSI 1035 shown in the sessions and assemblies section 1140 is a placeholder for another non-voice communication session. Here, the CSI 1035 is characterized by a hybrid icon 1240 and is shown to be in a "WAITING" state 1297. This hybrid icon 1240 comprises the email icon 1215, the chat icon 1220, and the text icon 1230 combined. Accordingly, the CSI 1035 serves as a placeholder for a yet-to-be-assigned communication session to the agent. For this particular embodiment, this CSI 1035 indicates the agent may be assigned another non-voice communication session that could be a chat, email, or text. In addition, in particular embodiments, if the agent is only able to handle a maximum of five communication sessions, then this CSI 1035 would not appear in the sessions and assemblies section 1140 because the CSIs above 1010, 1015, 1020, 1025, 1030 would represent the five allowable sessions for the agent. Similarly, in particular embodiments, if the agent is only able to handle one email session, as is currently represented in CSI 1015, the CSI 1035 for the placeholder would only show the text and chat icons 1220, 1230. Thus, in these embodiments, the icons displayed for the placeholder correspond to what channels of communication are allowed for the sixth session.

The sessions and assemblies section 1140 show in FIG. 12 also provides information on which communication sessions are involved with which assemblies. In particular, the sessions and assemblies section 1140 shows the voice call session represented by CSI 1010 and the email session represented by CSI 1015 are in the same assembly 1040. Here, the assembly 1040 is represented as a border around both CSIs 1010, 1015 for these two sessions to show the two sessions are a part of the same assembly. In other embodiments, other mechanisms may be used to represent this such as icons, colors, shading, tables, text, etc. Therefore, this assembly 1040 involves the agent and a first party engaging in multiple communications sessions using different channels of communication. Each one of the remaining communication sessions represented by CSIs 1020, 1025, 1030 are involved in separate assemblies 1045, 1050, 1055. Thus, each of these assemblies 1045, 1050, 1055 involve the agent and a different party engaging in or to engage in a single communication session using a particular channel of communication. This is further demonstrated in the Table 1 below:

TABLE 1

|  | Session | Party |
|---|---|---|
| Assembly 1 | Voice Call Email | Mark |
| Assembly 2 | 1st Chat | John |
| Assembly 3 | Text | (404) 851-1234 |
| Assembly 4 | 2nd Chat | Scotty |

Accordingly, in various embodiments, the CSI 1010, 1015, 1020, 1025, 1030, 1035 for the different communication sessions may shuffle based on the assemblies they are associated with. For instance, looking at the sessions and assemblies section 1140 in FIG. 12, if the agent responds to John 1275 in the chat session represented by CSI 1020 and requests John to text him John's work order number, then when John's text message is received by the contact center and is forwarded to the agent, the CSIs 1025, 1030 for the text session and the second chat session will be shifted down on the sessions and assemblies section 1140 so that room is available for the CSI for the new text session with John. In addition, the border for the assembly 1045 involving John will be extended around the new text session to show the session is a part of the assembly 1045.

It is noted that in various embodiments only one CSI 1010, 1015, 1020, 1025, 1030, 1035 may be selected at any given time. Therefore, if another CSI 1010, 1015, 1020, 1025, 1030, 1035 is selected, the information presented to the agent in the current session information section 1130 is altered to reflect the newly selected session. While the selection of a non-voice CSI alters the non-voice communication session the agent is interacting with, such a selection does not alter the communication status of a voice channel in particular embodiments. That is to say, the selection of a non-voice CSI over a voice CSI does not impact the ability of the user to interact with the party using the phone device, but does change the information shown in the current session information section 1130 of the GUI 1000.

Finally, it is noted that although the CSIs 1010, 1015, 1020, 1025, 1030, 1035 and corresponding assemblies 1040, 1045, 1050, 1055 shown in FIG. 12 are arranged in a vertical column, in various embodiments the CSIs 1010, 1015, 1020, 1025, 1030, 1035 and corresponding assemblies 1040, 1045, 1050, 1055 may be arranged using other configurations such as a horizontal column. For example, in one variation, a horizontal series of "tabs," may be displayed and selected by the agent to identify a particular communication session and/or assembly. Other arrangements may include using other graphical icons such as radio buttons, checkboxes, etc.

Figure 13:
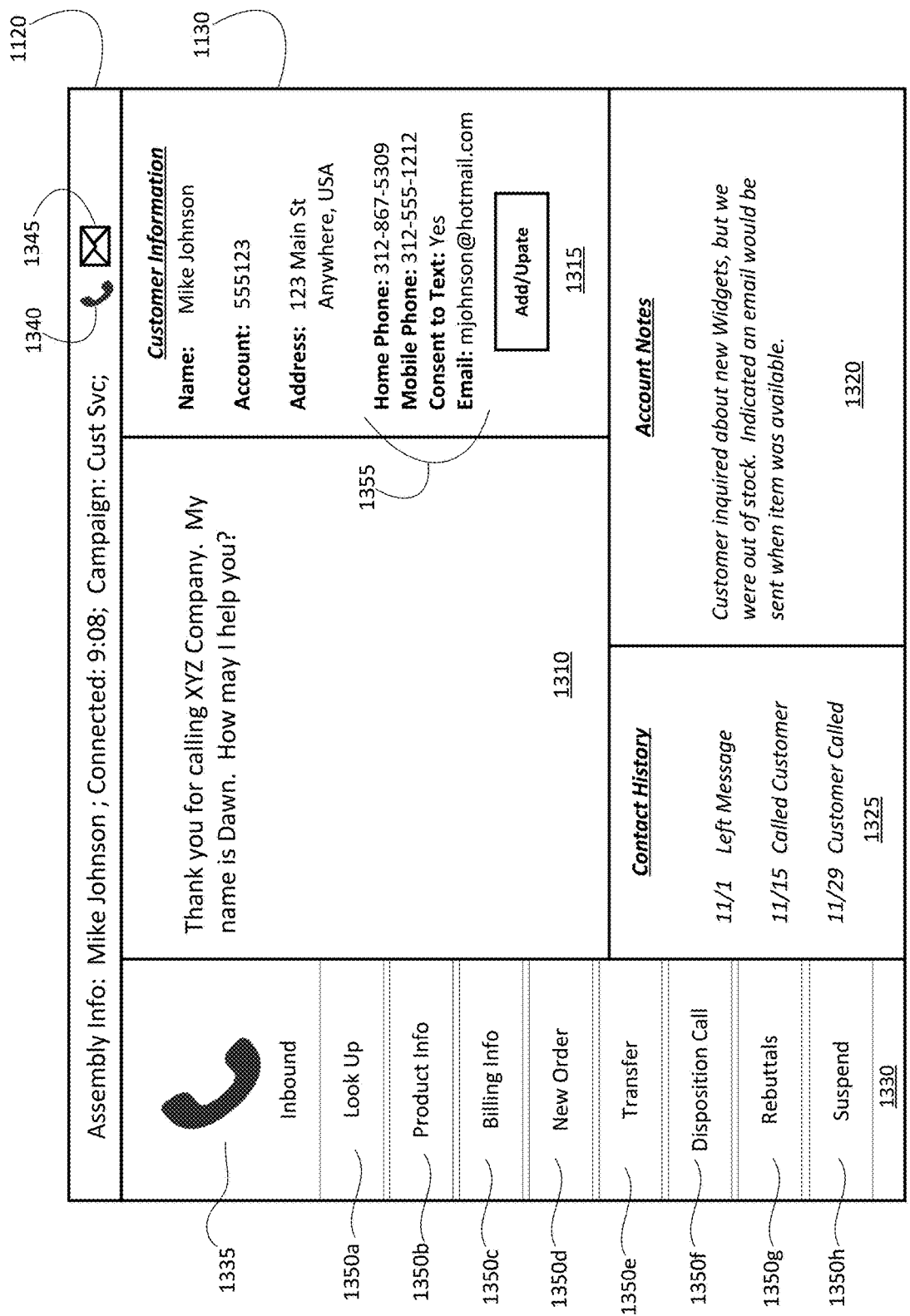
FIG. 13 provides greater detail on the current session information session of the GUI of FIG. 10.

Turning now to FIG. 13, this figure provides greater detail on the current session information section 1130 of the GUI 1000. In various embodiments, the information presented to an agent in this section 1130 depends on the currently selected CSI, as well as the structure and format of the section 1130. Furthermore, sub-sections of the session information section 1130 can vary in design and layout depending on the embodiment.

Here, the current session information section 1130 shown in FIG. 13 reflects the currently selected communication session is a voice call session as indicated by the telephone icon 1335 in the top left corner. Accordingly, information related to the assembly associated with the selected voice call is shown in the assembly information section 1120. In addition to information on the party and contact center campaign involved in the assembly, this section 1120 indicates the assembly comprises two communication sessions. A first icon 1340 identifies a voice call session, which is also the currently selected session, and a second icon 1345 identifies an email session. Besides using the CSI 1010, 1015, 1020, 1025, 1030, 1035 to select a particular communication session, the agent in particular embodiments may also select these icons to bring up information for a particular session on the current session information section 1130.

Below the telephone icon 1335 is a series of functions 1350a-1350h in a function list sub-section 1330 that can be defined as appropriate depending on the contact center campaign being conducted. Thus, in this example, the various functions 1350a-1350h are provided to assist an agent in servicing voice calls for a customer service contact center campaign. Specifically, the "Look Up" function 1350a allows the agent to request and retrieve specific information such as an account associated with the party on the call. The "Product Info" function 1350b allows the agent to retrieve product-related information. Next, the "Billing Info" function 1350c allows the agent to retrieve billing information. The "New Order" function 1350d allows the agent to indicate the party on the call would like to place a new order. The "Transfer" function 1350e allows the agent to transfer the call to different contact center personnel. The "Disposition Call" function 1350i allows the agent to disposition the call. For instance, dispositioning the call may involve the agent selecting a code that indicates a resolution of the call. For example, the code may reflect that the call reached an answering machine, the right party was not home, the party was satisfied with the product he or she ordered, etc. The "Rebuttals" function 1350g allows the agent to retrieve information to rebut a point made by a party. Finally, the "Suspend" function 1350h allows the agent to suspend the assembly associated with the call. Accordingly, the agent's selection of a particular function 1350a-1350h may trigger various functionality such as, for example, open a corresponding window with further information and related functions, launching a query over an API, or accessing a customer relationship management system.

The main information sub-section 1310 of the current session information section 1130 provides information to the agent for this particular voice call. For instance, the voice call may be related to a campaign involving customer service in which parties dial a number to have their questions answered and the main information sub-section 1310 may provide scripting information for the agent to read to the parties. The contact history sub-section 1325 provides prior contact summary information to the agent. The account notes sub-section 1320 allows the agent to write and review notes related to this party. Finally, the customer information sub-section 1315 provides summary information regarding the party. Here, this sub-section 1315 provides contact information 1355 for the party and indicates what types of communications (channels of communication) can be used to interact with the party. For example, the contact information 1355 indicates the party Mike Johnson has a mobile phone and has provided his consent to receiving text messages. Accordingly, in various embodiments, the current sessions information section 1130 provides the agent with the appropriate resources, functions, and information he or she may need while servicing the voice call.

Figure 14:
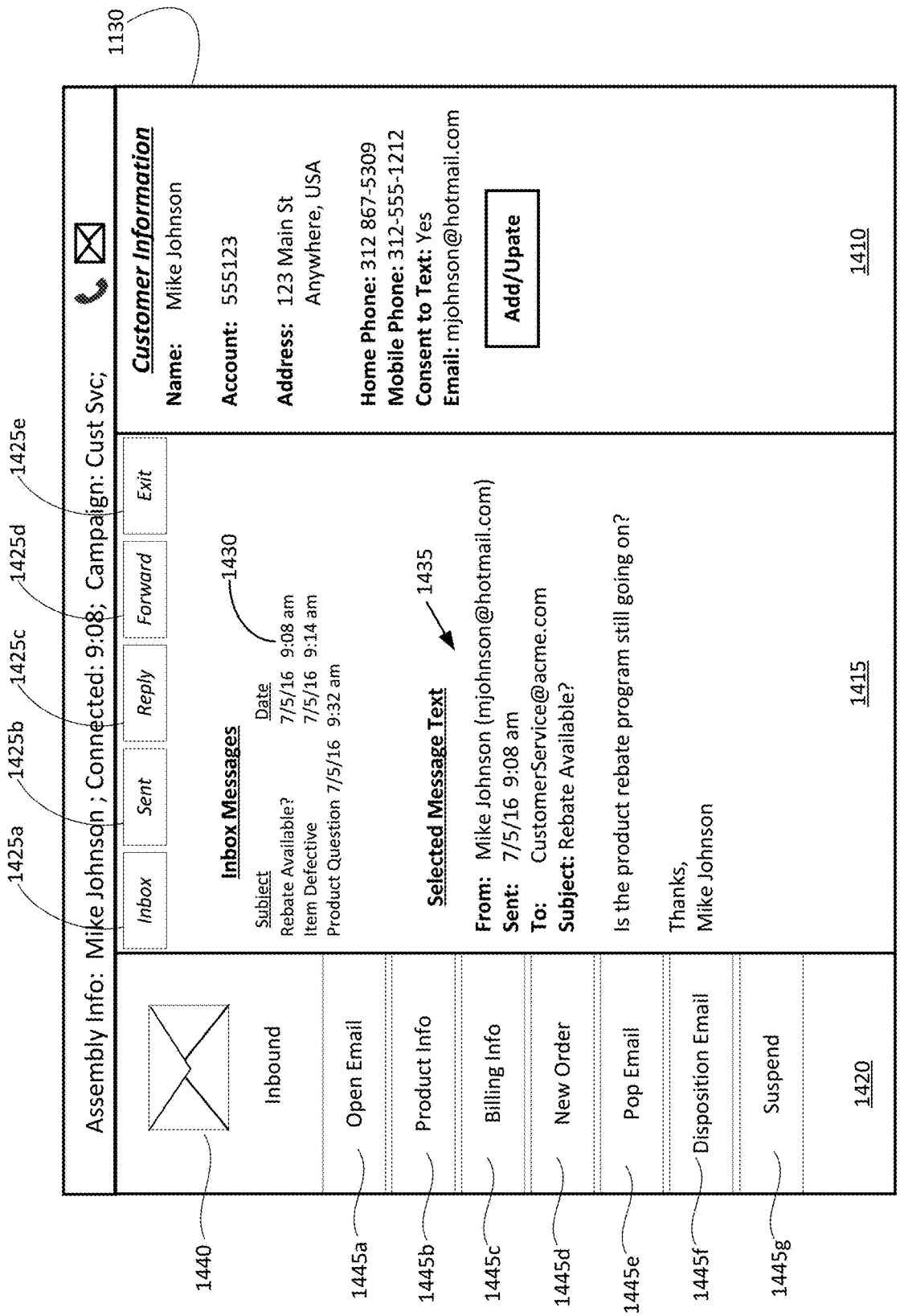
FIG. 14 illustrates the current session information session for an email session.

Turning now to FIG. 14, this figure shows the current session information section 1130 for an email session. Here, the current session information section 1130 includes a session communication icon 1440 identifying the channel of communication associated with the selected communication session as being email. The various functions 1445a-1445g located below the icon 1440 in the function list sub-section 1420 are defined in the context of the campaign associated with the communication assembly and the channel of communication for the session. The "Open Email" function 1445a allows the agent to open the email message. The "Product Info" function 1445b allows the agent to retrieve product-related information. The "Billing Info" function 1445c allows the agent to retrieve billing information. The "New Order" function 1445d allows the agent to indicate a new order is to be placed for the party associated with the email. The "Pop Email" function 1445e allows the agent to update email folders. The "Disposition Email" function 1445f allows the agent to disposition the email exchange. Again, the "Suspend" function 1445g allows the agent to suspend the assembly associated with the email session.

In this particular instance, the main sub-section 1415 allows the agent to review his or her inbox for emails related to the session, select an email to review, and view the email message itself. In this example, the agent has selected an email message 1430 and the message text 1435 is shown in a conventional manner. In particular embodiments, various function keys 1425a-1425e may also be provided to the agent to perform various email related operations. For instance, the "Inbox" function 1425a allows the agent to review incoming email messages. The "Sent" function 1425b allows the agent to review previously sent email messages. The "Reply" function 1425c allows the agent to reply to a selected email message and the "Forward" function 1425d allows the agent to forward the email message to another party such as, for example, another agent. Finally, the "Exit" function 1425e allows the agent to exit the email application.

Finally, a customer information sub-section 1410 provides customer-related information that may be useful or convenient for the agent when dealing with a particular customer (party). Typically, the contact center is able to map the email address to an account in order to retrieve the appropriate customer information for the party involved in the assembly.

Figure 15A:
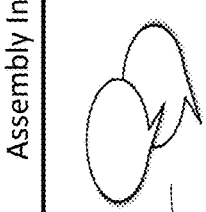
FIGS. 15A-B illustrate the current session information session for a chat session.

FIG. 15A illustrates the current session information section 1130 for a chat as identified by a chat icon 1525 in the upper left corner. Accordingly, information related to the assembly associated with the chat is shown in the assembly information section 1120. In addition to information on the party and contact center campaign involved in the assembly, this section 1120 indicates the assembly currently comprises just one session, the chat, as identified by an icon 1535.

Again, functions 1530a-1530e are provided below the icon 1525 in the function list sub-section 1520 that allow the agent to invoke functions commonly used with this channel of communication. Here, the "Agent Scripts" function 1530a allows the agent to retrieve a library of agent scripts which may be used in a response or edited to form a response to send to the party involved in the assembly. For example, if a customer (party) asks a question about the company's return policy, the agent could select a pre-canned response using this function 1530a to send to the customer. The "Transfer Chat" function 1530b allows the agent to transfer the chat to another party such as, for example, another agent to assist or takeover the chat. The "End Chat" function 1530c allows the agent to indicate that the chat session has ended. The "Disposition Chat" function 1530d allows the agent to disposition the session as needed. Finally, the "Suspend" function 1530e allows the agent to suspend the assembly related to the chat.

The main sub-section 1515 contains the current chat dialogue for the chat session. For instance, in particular embodiments, various chat boxes 1540, 1545, 1550, and 1555 may be used to represent the chat dialogue exchanged back and forth between the agent and the party, as well as with other personnel. The chat dialogue shown in FIG. 15A is based on the example in which a party and an agent are discussing a product that is advertised on a website. Here, the first chat box 1540 represents a chat message received from the customer (party) informing the agent that he may be interested in purchasing an inkjet color printer. The customer's name (to the extent it is provided) is shown as "Mark Smith." The next chat box 1545 shows the agent's response. Depending on the embodiment, the response may have a configuration such as, for example, a different color to allow the agent to quickly identify the agent's chat messages from the customer's chat messages. Next, a chat box 1550 represents the customer informing the agent that he needs to end the chat. Further, a chat box 1555 represents the agent asking the customer if he would be available to continue the discussion on the inkjet color printers using a different channel of communication such as a phone call or text. Finally, a chat box 1560 is provided at the bottom of the main sub-section 1515 to allow the agent to type another chat message to the party. As additional chat messages are sent/received in particular embodiments, the messages scroll up from the bottom of the section 1515. Furthermore, as the number of chat boxes exceeds what can be presented to the agent, a scroll bar may be provided that allows the agent to control which chat messages are viewable at any given time so that he or she may review prior chat messages. Finally, a customer information sub-section 1510 is shown that provides customer-related information.

In this instance, the customer may inform the agent that he would be available to continue the discussion via texting in approximately an hour and a half if the agent would like to text him then. Thus, the agent would like to suspend the assembly associated with the chat session and then resume the assembly by sending a text to the customer in appropriately an hour and a half. Therefore, the agent selects the "Suspend" function 1530e provided under the chat icon 1525.

Figure 15B:
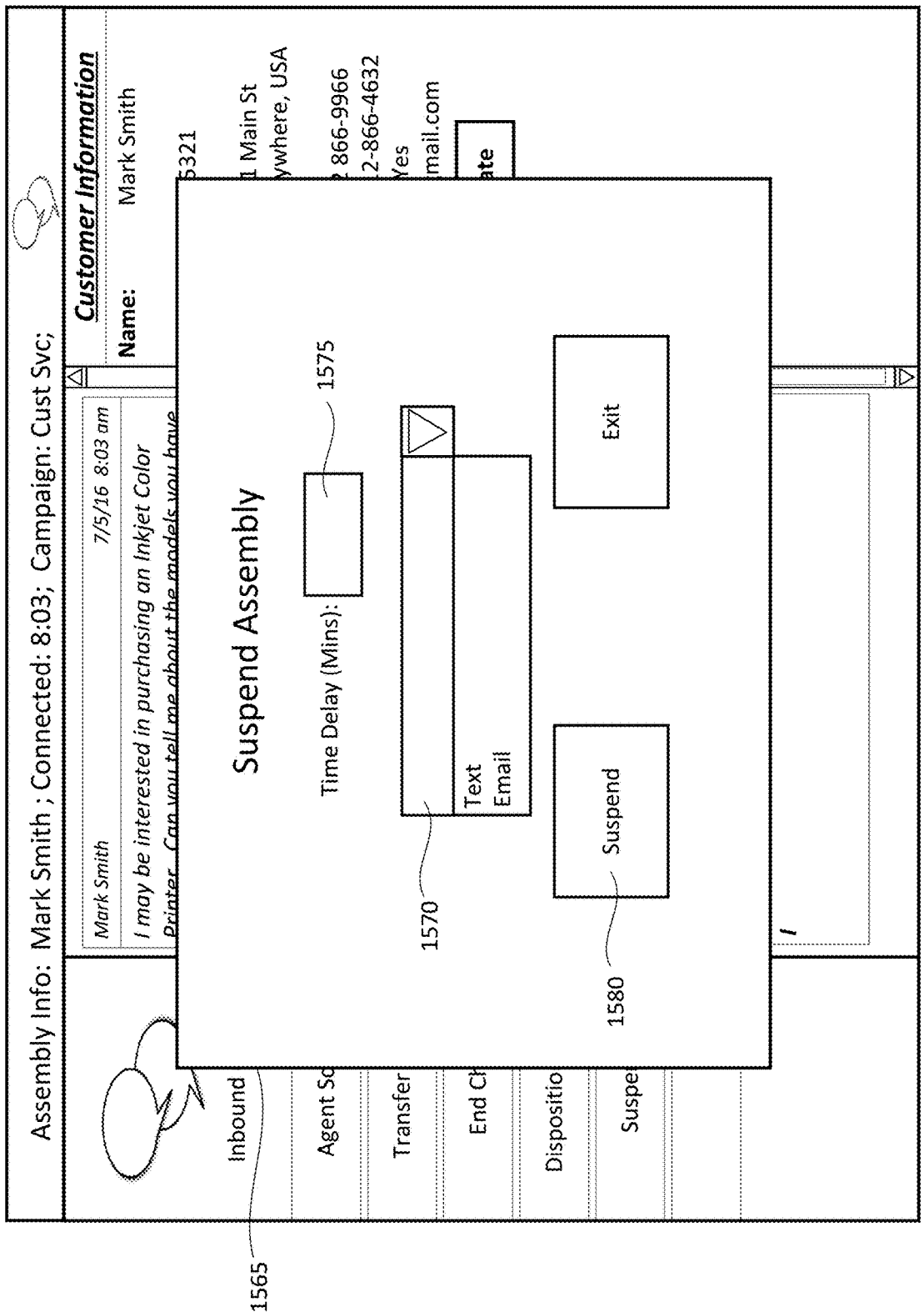

Turning to FIG. 15B, a pop-up screen 1565 is provided upon selecting the "Suspend" function 1530e that allows the agent to suspend the assembly. Here, the pop-up screen 1565 provides a drop down field 1570 that allows the agent to select a channel of communication to use to resume the assembly. In various embodiments, this operation is carried out so that the required channel of communication is reserved to ensure that the channel is available at the time the assembly is to be resumed. In particular embodiments, the drop down field 1570 may only provide the channels of communication the agent currently has available and/or the channels of communication the agent is expected to have available at the time the agent resumes the assembly. For instance, here, the agent has the selection of a text session or an email session. Although in other instances, the agent may also have the selection of the same channel of communication that is currently being used to interact with the party. That is to say, the agent and party may wish to resume the interaction (assembly) at a later time using the same channel of communication. Thus, the agent may also be provided the selection of a Web chat session along with the text and email sessions.

In addition, the pop-up screen 1565 provides a field 1575 that allows the agent to enter an amount of time to suspend the assembly before the agent is to attempt to re-contact the party using the reserved channel of communication. In particular embodiments, the amount of time the agent enters can affect the channels of communication that may be available to reserve for the suspended assembly. That is to say, the amount of time the agent enters can affect the channels of communication the agent is expected to have available at the time the agent is to resume the assembly and re-contact the party.

For instance, an agent is normally only allowed to have one active phone call at any given time. However, if the agent is suspending the assembly for a specified amount of time (e.g., over thirty minutes), then the agent may be provided the option to reserve a phone call as the channel of communication to use to resume the assembly since an agent should normally be finished with a call the agent is currently handling within the specified amount of time and have the availability to handle a new call.

Finally, the pop-up screen 1565 provides a "Suspend" button 1580 that when selected by the agent places the assembly in the suspended state. In particular embodiments, the selection of this button may also change the state(s) of the other sessions associated with the assembly such as, for example, setting the session to be used to resume the assembly to reserved. Accordingly, the agent may converse with the party once the assembly has been suspended to inform the party that he or she will be contacting the party back on the selected channel of communication at the designated time. At that point, the agent may then end the session(s) the agent is currently conducting with the party.

Accordingly, the result of suspending the assembly and reserving the session in various embodiments is the state of the session remains reserved for a time period and is then set to ringing/attention needed at a time close to when the assembly is to be resumed. This process is carried out to ensure the channel of communication to be used to resume the assembly will be available when the assembly is actually resumed. For instance, returning to the example in which the agent is to resume the assembly by placing a phone call to the party in thirty minutes. Here, the state for the phone call session is initially set to reserved for the suspended assembly. However, at a time just before the agent is to actually make the phone call to the party to resume the assembly, the state for the reserved phone call session is set to ringing. For example, at twenty minutes after suspending the assembly, the state for the reserved phone call session is set to ringing. As a result, the phone call session to the party is now considered to be engaged (even though the agent has not yet actually called the party) in determining whether another, different communication can be forwarded to the agent to handle. For example, the contact center may receive an inbound call from a different party. Here, the contact center would not route this inbound call to the agent because the agent is already considered to be engaged in the phone call session that was reserved for the suspended assembly. Therefore, when the thirty minutes has expired and the agent is ready to actually place the call to the party, the agent will have availability to place the call and resume the assembly.

Figure 16A:
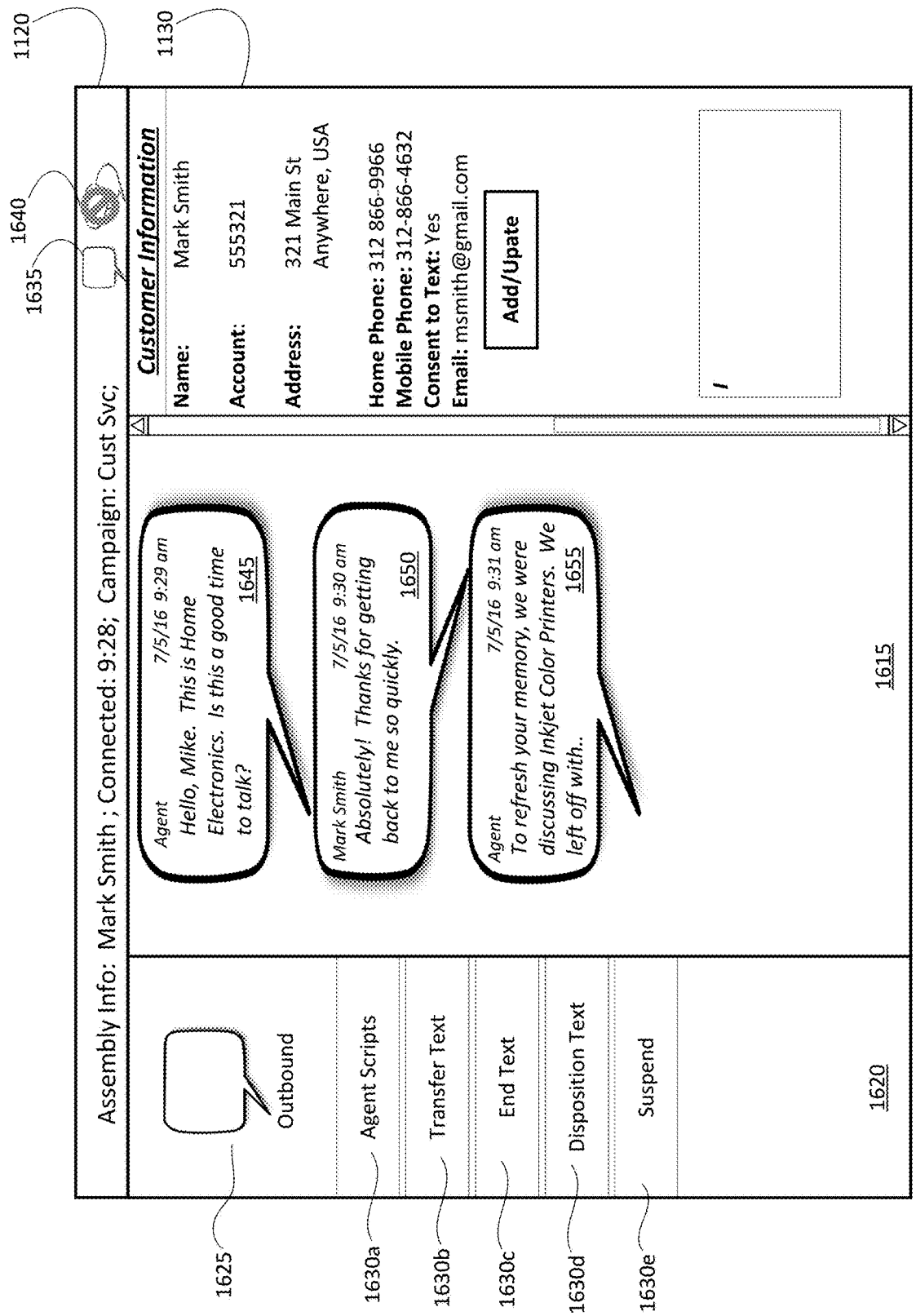

Turning now to FIG. 16A, this figure illustrates the current session information section 1130 for text as identified by a text icon 1625 in the upper left corner. Accordingly, information related to the assembly associated with the text session is shown in the assembly information section 1120. In addition to information on the party and contact center campaign involved in the assembly, this section 1120 indicates the assembly currently comprises just one active session, the text session, as identified by an icon 1635. However, the section 1120 also indicates the assembly had been suspended at one time in that the section 1120 comprises a chat session that is now terminated, as identified by a second icon 1640.

Again, functions 1630a-1630e are provided below the icon 1625 in the function list sub-section 1620 that allow the agent to invoke functions commonly used with this channel of communication. Similar to chat sessions, the "Agent Scripts" function 1630a allows the agent to retrieve a library of agent scripts which may be used in a response or edited to form a response to send to the party involved in the assembly. The "Transfer Text" function 1630b allows the agent to transfer the text session to another party such as, for example, another agent to assist or takeover the session. The "End Text" function 1630c allows the agent to indicate that the text session has ended. The "Disposition Text" function 1630d allows the agent to disposition the session as needed. Finally, the "Suspend" function 1630e allows the agent to suspend the associated assembly.

The main sub-section 1615 contains the current message dialogue for the text session. For instance, in particular embodiments, various text bubbles 1645, 1650, and 1655 may be used to represent the text messages exchanged back and forth between the agent and the party. The first text bubble 1645 represents the opening text message sent from the agent to the customer (party). The next text bubble 1650 shows the customer's response. The customer's name (to the extent it is provided) is shown. Depending on the embodiment, the response may have a configuration such as, for example, a different color to allow the agent to quickly identify the agent's text messages from the customer's text messages. Next, a text bubble 1655 represents the agent's response. Here, the agent is reminding the customer where the conversation left off in the chat session previously held.

Accordingly, in particular embodiments, the agent may be provided functionality to review the previously held chat session if desired and to insert messages from the chat session into the current text session. For instance, the agent may be able to select the chat icon 1640 located at the top of the screen to bring up the session.

Figure 16B:
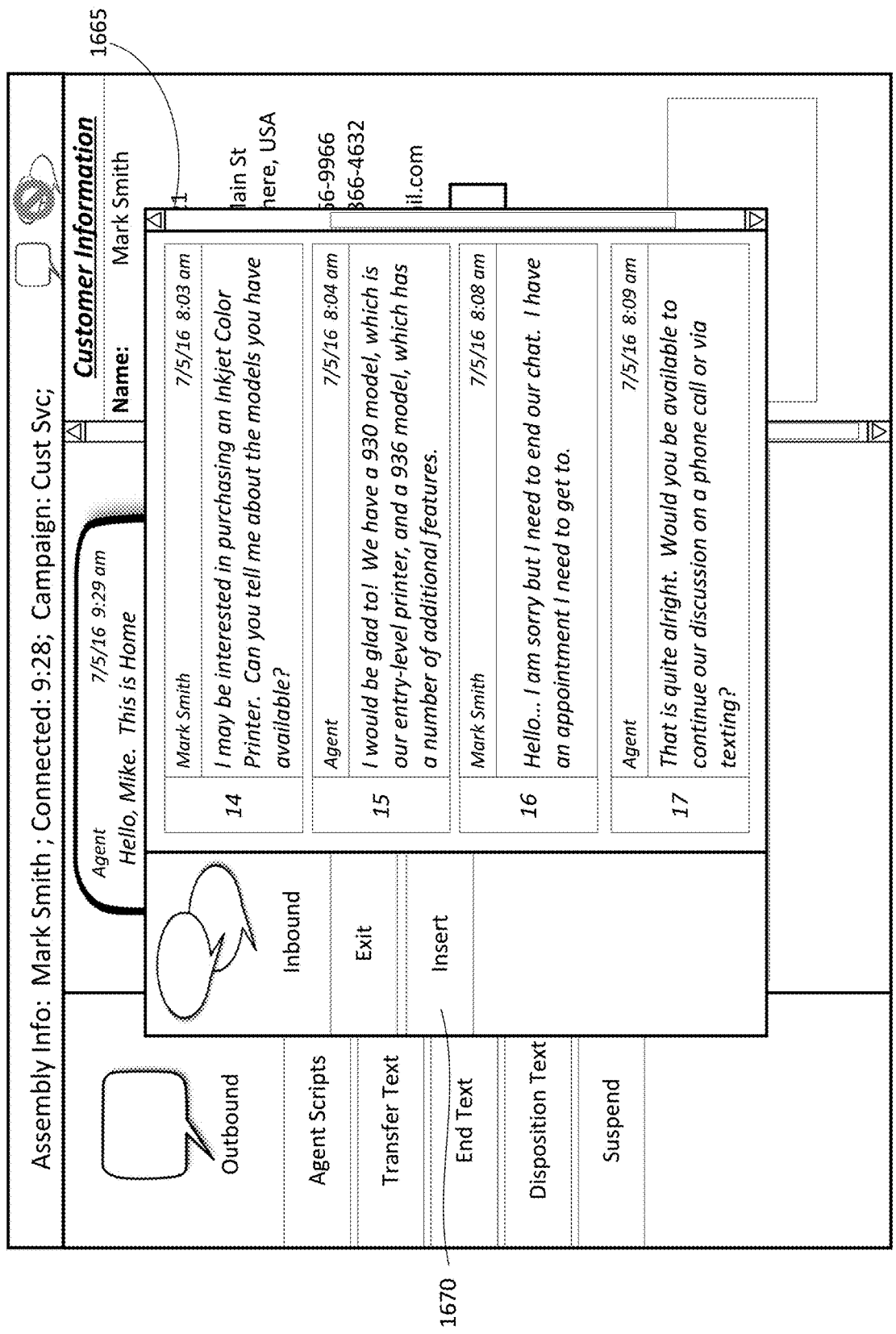
Figure 16C:
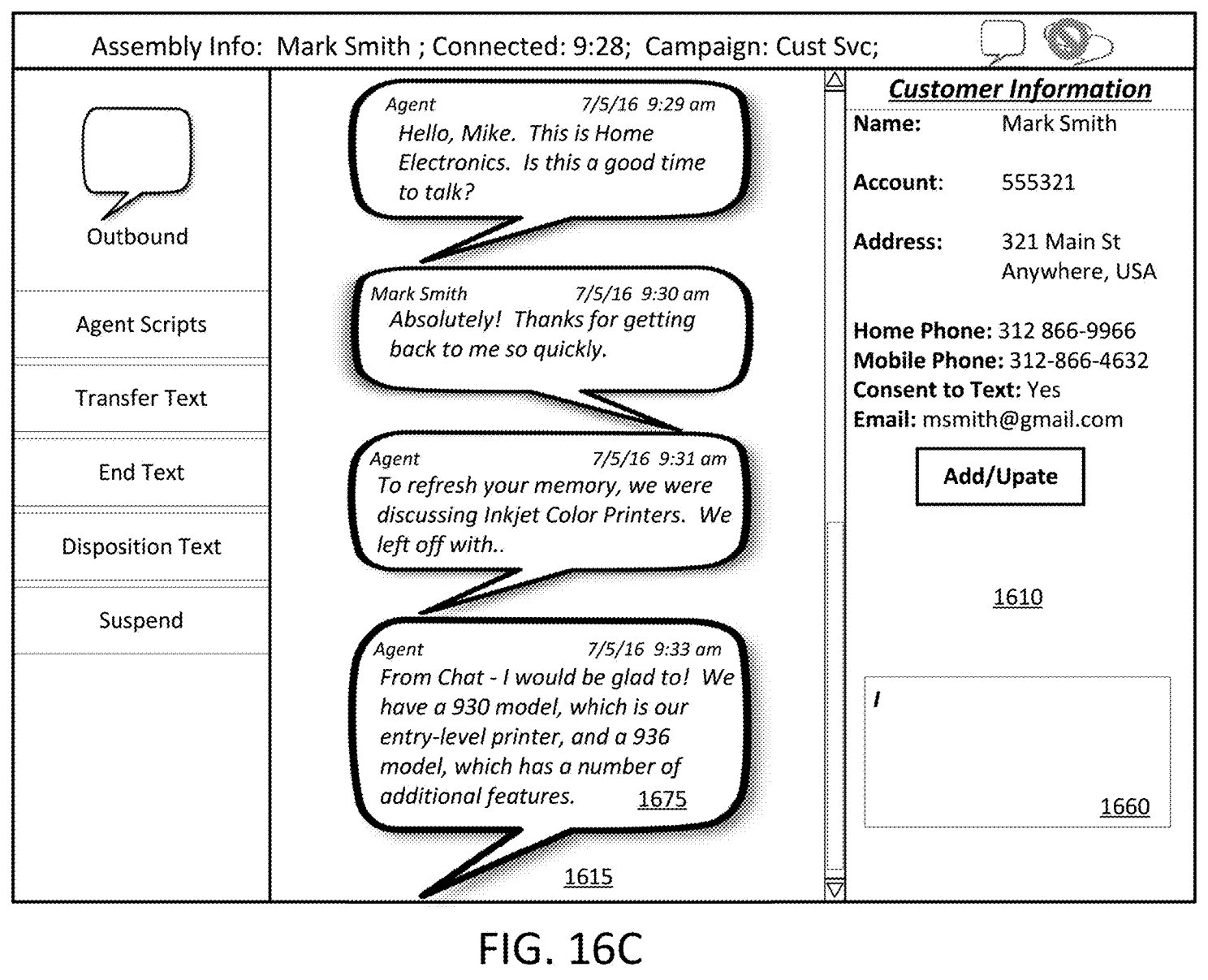

Thus, turning to FIG. 16B, a screen 1665 is provided to review the information for the past chat session held for the assembly. Here, the pop-up screen 1665 shown in FIG. 16B provides the chat messages exchanged back and forth between the agent and customer during the chat session. In addition, the pop-up screen provides a button 1670 to allow the agent to insert messages exchanged during the chat session into the text session the agent is now conducting with the customer. The messages are numbered so that the agent can select one or more of the messages by identifying the corresponding numbers for the messages to insert. Therefore, turning now to FIG. 16C, the main sub-section 1615 for the text session displays a message from the chat session that has been inserted into the text session as a new text bubble 1675 from the agent.

Finally, a text box 1660 is provided at the bottom, right of the current session information section 1130 to allow the agent to type another text message to send to the party. As additional text messages are sent/received in particular embodiments, the messages scroll up from the bottom of the main sub-section 1615. Furthermore, as the number of text bubbles exceeds what can be presented to the agent, a scroll bar may be provided that allows the agent to control which text messages are viewable at any given time so that he or she may review prior messages. Finally, a customer information sub-section 1610 is shown that provides customer-related information.

Agent GUI Module

Turning now to FIGS. 17-21, additional details are provided regarding a process flow for controlling an agent's GUI display of multiple assemblies and sessions according to various embodiments of the invention. In particular, FIGS. 17-21 are a flow diagram showing an agent GUI module for performing such functionality according to various embodiments of the invention. For example, the flow diagram shown in FIGS. 17-21 may correspond to operations carried out by one or more processors in one or more components, such as, for example, an agent's computing device 260a-260c described above, as it executes the agent GUI module stored in the component's volatile and/or nonvolatile memory.

Generally speaking, an agent is presented with information for a communication session on the current session information section 1130 of the GUI 1000 at all times when the agent is actively engaged in one or more communication sessions. The determination of which communication session information is displayed on the current session information section 1130 depends in part on which communication session has been selected by the agent.

Figure 17:
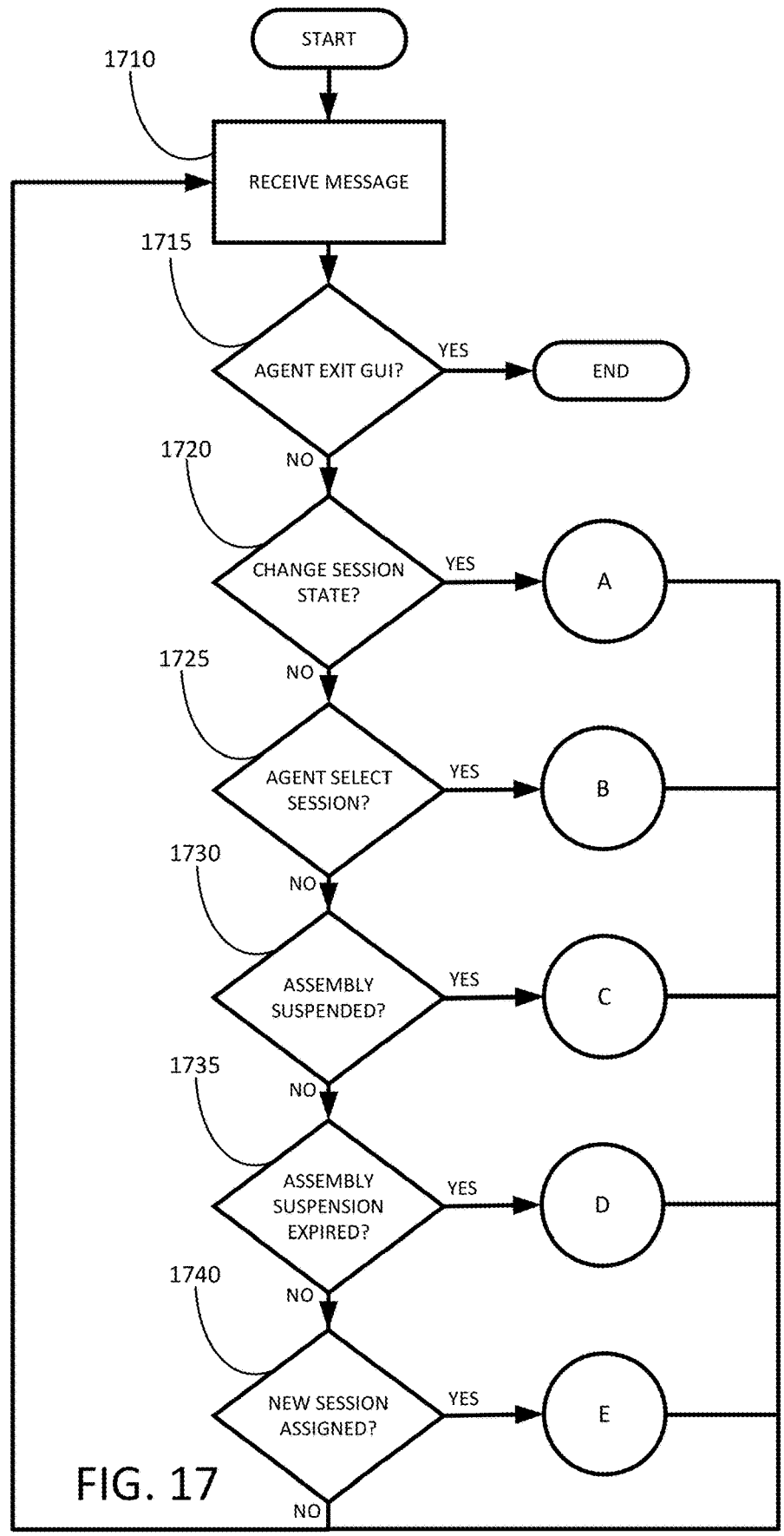
FIGS. 17-22 illustrate a process flow for controlling an agent's GUI display of multiple assemblies and sessions in accordance with various embodiments of the present invention.

Turning first to FIG. 17, the process flow begins with the agent GUI module receiving a message in Operation 1710. As discussed in further detail below, this message may be received from a number of different sources in various embodiments depending on the circumstances. For instance, a source may be the agent who has selected some type of functionality on the GUI 1000 that results in sending the agent GUI module a message such as, for example, selecting a CSI 1010, 1015, 1020, 1025, 1030, 1035 for a particular communication session to make the CSI 1010, 1015, 1020, 1025, 1030, 1035 active on the GUI 1000, or invoking a pop-up screen 1565 and indicating a particular assembly to suspend. While in another instance, a source may be some other component within the contact center such as the communications handler 250 sending the agent GUI module a message to update information displayed to the agent on the GUI such as, for example, the state of a communication session the agent is currently handling.

Upon receiving the message, the agent GUI module determines whether the message indicates the agent has selected to exit the GUI in Operation 1715. For instance, in particular embodiments, a button may be provided on the session action toolbar section 1110 of the GUI 1000 that the agent may select to exit the GUI. For example, the agent may have reached the end of his or her work shift and logs out by selecting the exit button in the session action toolbar section 1110. If so, then the agent GUI module ends the process flow.

However, if the message does not indicate the agent has existed the GUI, then the agent GUI module determines whether the message relates to a change of state for one of the communication sessions the agent is currently handling in Operation 1720. If the message is for a change of state for one of the sessions, then the agent GUI module performs the operations found in FIG. 18.

Figure 18:
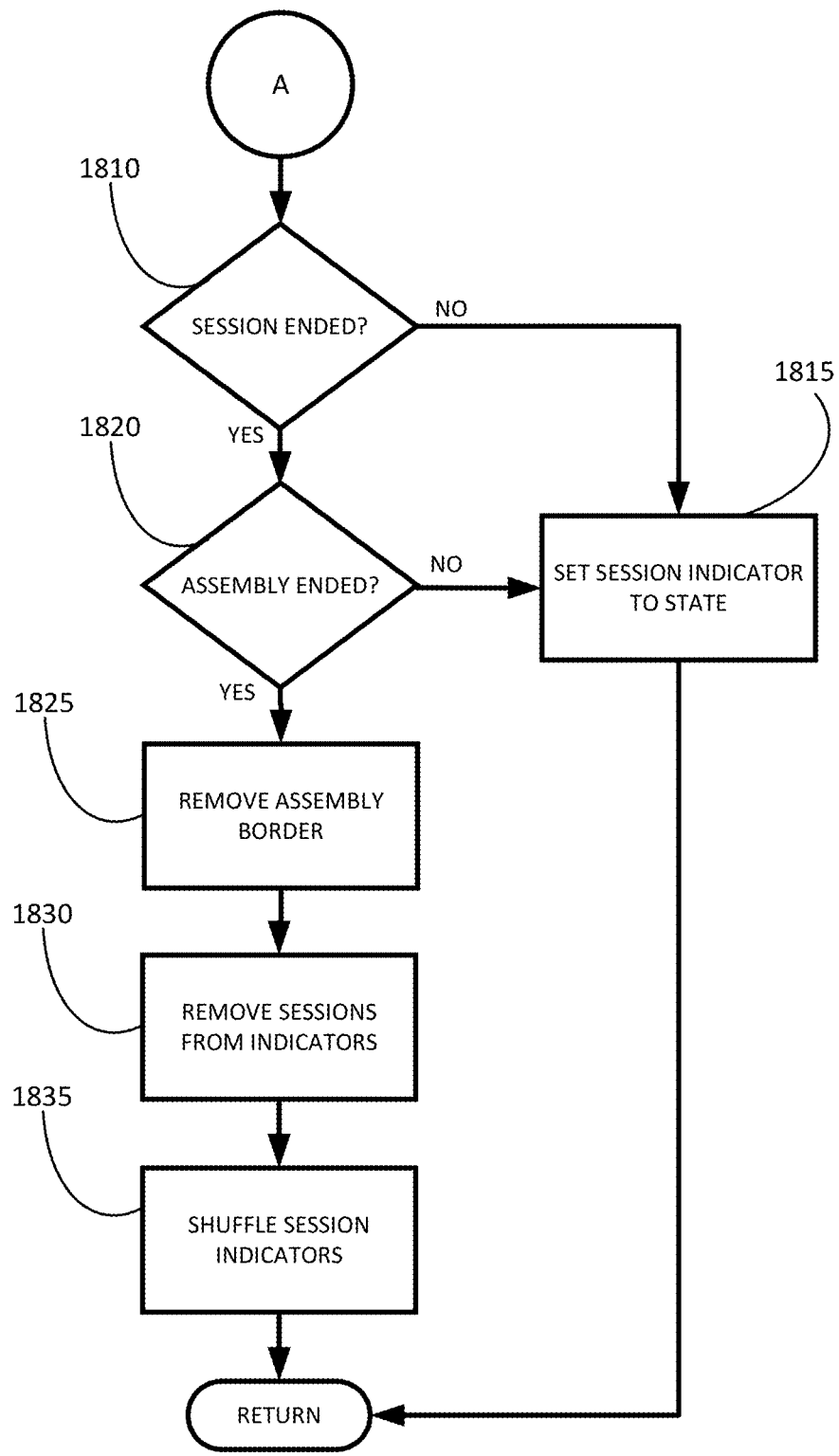

Turning to FIG. 18, the agent GUI module first determines whether the change of state indicates the session has been ended in Operation 1810. For instance, the message may indicate the state for a session has been set to terminated/inactive. If the session has not been ended, then the agent GUI module simply sets the state of the CSI 1010, 1015, 1020, 1025, 1030, 1035 for the particular session to the state indicated in the message in Operation 1815.

However, if the session has ended, then the agent GUI module determines whether the assembly associated with the session that has ended has also ended as a result in Operation 1820. Generally speaking, an assembly ends when the assembly is not suspended and no longer has any sessions associated with the assembly that the party involved in the assembly is actively engaging. Accordingly, the session indicated in the message received by the agent GUI module that has ended may have been the last session the party was actively engaging for the associated assembly and the assembly is not suspended.

Depending on the embodiment, the agent GUI module may make the determination of whether the associated assembly has ending through various avenues. For instance, in particular embodiments, the message received by the agent GUI module may simply indicate the associated assembly has ended. While in other embodiments, the agent GUI module may reach such a conclusion based on information ascertained about the sessions associated with the assembly. For example, the agent GUI module may first query the ASSEMBLIES, SESSIONS, and ASSEMBLIES_TO_SESSIONS, structures, 340, 350, 380, to determine whether the associated assembly has been suspended. If not, then the agent GUI module may query the SESSIONS and ASSEMBLIES_TO_SESSIONS structures 350, 380 to determine whether any other sessions remain for the associated assembly that have states indicating the sessions are actively being engaged by the party. While in another example, the agent GUI module may look at the states for any CSIs 1010, 1015, 1020, 1025, 1030, 1035 that are shown as part of the same assembly as the session that has ended to determine whether any other sessions remain for the assembly that are actively being engaged by the party or have been reserved.

If the agent GUI module determines the associated assembly has not ended, then the agent GUI module simply sets the state for the CSI 1010, 1015, 1020, 1025, 1030, 1035 for the session to indicate the session has ended in Operation 1815. In some embodiments, the agent GUI module may instead remove the session from the CSI 1010, 1015, 1020, 1025, 1030, 1035 so that the CSI 1010, 1015, 1020, 1025, 1030, 1035 is freed up to be used to represent another communication session the agent may be assigned. While in other embodiments, the state for the CSI 1010, 1015, 1020, 1025, 1030, 1035 for the session may first be set to indicate the session has ended and still be shown along with the CSIs 1010, 1015, 1020, 1025, 1030, 1035 for other sessions still actively being engaged or reserved. The session may then be removed from CSI 1010, 1015, 1020, 1025, 1030, 1035 if the needs rises for a CSI 1010, 1015, 1020, 1025, 1030, 1035 to represent a new communication session assigned to the agent or when the other sessions and the corresponding assembly end.

Returning to Operation 1820, if instead the agent GUI module determines the assembly associated with the session that has ended has also ended, then the agent GUI module removes the assembly border for the assembly from the GUI in Operation 1825. In addition, the agent GUI module removes the session(s) from the CSI(s) 1010, 1015, 1020, 1025, 1030, 1035 for the session(s) associated with the assembly in Operation 1830. Finally, the agent GUI module shuffles the CSIs 1010, 1015, 1020, 1025, 1030, 1035, if needed, on the GUI 1000 in Operation 1835. For instance, the session(s) and assembly that have ended may be located at the top of the list of assemblies 1040, 1045, 1050, 1055 and CSIs 1010, 1015, 1020, 1025, 1030, 1035 shown on the GUI 1000. Accordingly, when the session(s) and assembly are removed from the GUI, the remaining assemblies 1040, 1045, 1050, 1055 and CSIs 1010, 1015, 1020, 1025, 1030, 1035 shown on the GUI 1000 shift up and one or more of the CSIs 1010, 1015, 1020, 1025, 1030, 1035 at the bottom of the list are freed up to represent other communication sessions assigned to the agent.

Returning now to FIG. 17, if the agent GUI module determines the received message is not a change of state for a communication session, then the agent GUI module determines whether the agent has selected a CSI 1010, 1015, 1020, 1025, 1030, 1035 for a particular communication session in Operation 1725. For instance, the agent may select a CSI 1010, 1015, 1020, 1025, 1030, 1035 by using some type of device such as a pointer, mouse, or function key. Typically, when an agent logs into his or her workstation, the agent does not have any communication sessions that are active and therefore, the GUI 1000 does not show any CSIs 1010, 1015, 1020, 1025, 1030, 1035 having sessions actively being engaged or reserved that the agent can select from. However, if the agent has been logged into his or her workstation for a while and has begun to engage parties in one or more communication sessions, then the GUI 1000 would show CSIs 1010, 1015, 1020, 1025, 1030, 1035 for active or reserved sessions in the sessions and assemblies identifier section 1140 of the GUI that the agent could select.

Figure 19:
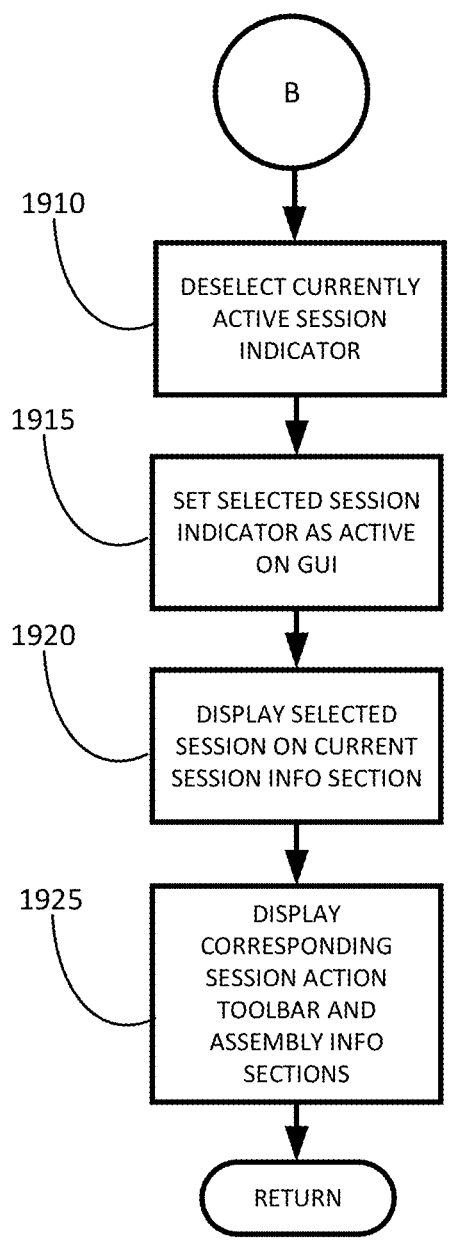

Accordingly, if the agent GUI module determines in Operation 1725 that the agent has selected a communication session from the CSIs 1010, 1015, 1020, 1025, 1030, 1035, then the agent GUI module performs the operations found in FIG. 19. Turning to FIG. 19, the agent GUI module deselects the currently active CSI in Operation 1910. For instance, in particular embodiments, this operation may entail the agent GUI module altering the color, de-highlighting, and/or altering a text label of the currently active CSI 1010, 1015, 1020, 1025, 1030, 1035.

At this point, the agent GUI module sets the selected CSI 1010, 1015, 1020, 1025, 1030, 1035 as active on the GUI 1000 in Operation 1915. Again, this particular operation may involve altering the color, highlighting, and/or altering a text label of the CSI 1010, 1015, 1020, 1025, 1030, 1035 selected by the agent.

Next, the agent GUI module displays information for the selected session on the current session information section 1130 of the GUI 1000 in Operation 1920. In addition, the agent GUI module displays the corresponding session action toolbar section 1110 and corresponding assembly information in the assembly information section 1120 for the selected communication session in Operation 1925. As a result, the GUI 1000 displayed on the agent's workstation now provides information for the selected communication session to the agent.

Returning to FIG. 17, if instead the agent GUI module determines the agent has not selected a CSI 1010, 1015, 1020, 1025, 1030, 1035 for a communication session, then the agent GUI module determines whether the agent has suspended an assembly in Operation 1730. For instance, the agent may have invoked the assembly pop-up screen 1565 while actively engaged in a particular communication session and decided to suspend the associated assembly for the session. Accordingly, the agent selects the button 1580 on the screen 1565 to suspend the assembly and an indication is provided to the agent GUI module indicating such. Information may be sent along with the indication such as the assembly that is being suspended and the channel of communication being reserved to resume the suspended assembly.

Figure 20:
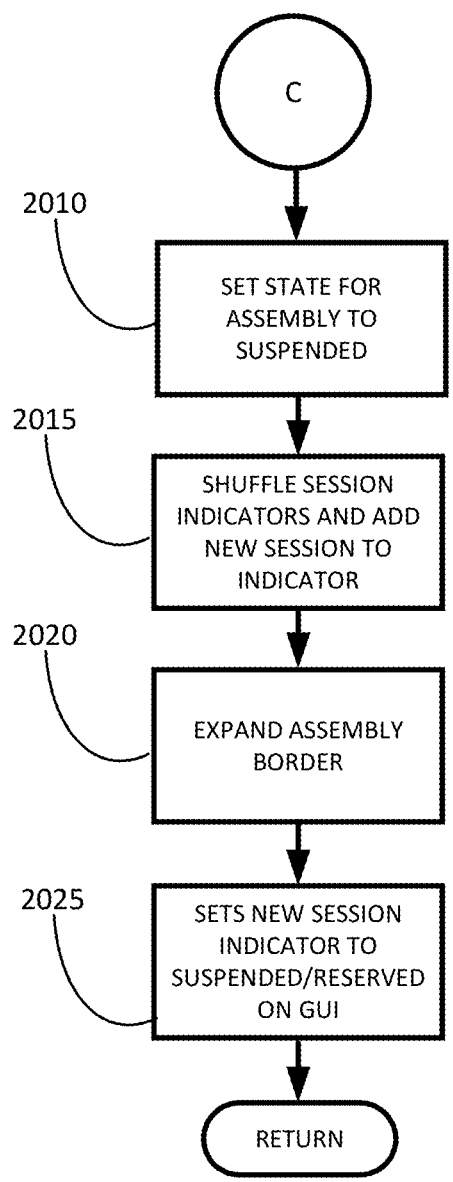

Therefore, in this instance, the agent GUI module determines an assembly has been suspended and performs the operations found in FIG. 20. Turning to FIG. 20, the agent GUI module sets the state for the assembly to suspended in Operation 2010. That is, for particular embodiments, the agent GUI module updates the STATE_ID 371 field in the ASSEMBLIES data structure 340 for the particular assembly to suspended.

Next, the agent GUI module shuffles the CSIs around in Operation 2015 so that a new communication session that is reserved for the suspended assembly can be added to a CSI 1010, 1015, 1020, 1025, 1030, 1035 to show the reserved communication session as part of the suspended assembly. For example, the agent may be handling a voice call session and decide to end the call and suspend the assembly associated with the voice call session so that the agent and party may converse later over a text session. Here, the text session is reserved as a new communication session that is associated with the suspended assembly. In addition, the agent may be conducting a chat session with another party that is part of a different assembly other than the suspended assembly. Therefore, the CSIs 1010, 1015, 1020, 1025, 1030, 1035 may show the two communication sessions associated with the suspended assembly in the sessions and assemblies identifier section 1140 of the GUI 1000 in descending order with a first CSI 1010 representing the voice call session that has been terminated (or is to be terminated) and the second CSI 1015 representing the chat session for the other assembly. When the new text session is reserved for the suspended assembly, the agent GUI module shifts (shuffles) the chat session down one to the third CSI 1020 and adds the new text session to the second CSI 1015 so that the CSIs 1010, 1015 for the voice call session and the reserved text session are shown together. Accordingly, the agent GUI module then expands the border for the suspended assembly in Operation 2020 around the two CSIs 1010, 1015 for the voice call session and the reserved text session to shown the two sessions are part of the same assembly. Finally, the agent GUI module sets the CSI for the reserved text session to "SUSPENDED/RESERVED" on the GUI 1000 to indicate to the agent that the assembly has been suspended and the text session has been reserved in Operation 2025.

Returning to FIG. 17, if instead the agent GUI module determines the agent has not suspended an assembly, then the agent GUI module determines whether a suspension for an assembly has expired in Operation 1735. As mentioned, when an agent suspends an assembly, the agent can provide a time delay that indicates an amount of time that is to pass before an assembly is resumed and a new communication is established between the agent and party involved in the assembly. Thus, in particular embodiments, an agent is provided with some type of indicator to communicate that the assembly should be resumed once the delay time has expired.

Figure 21:
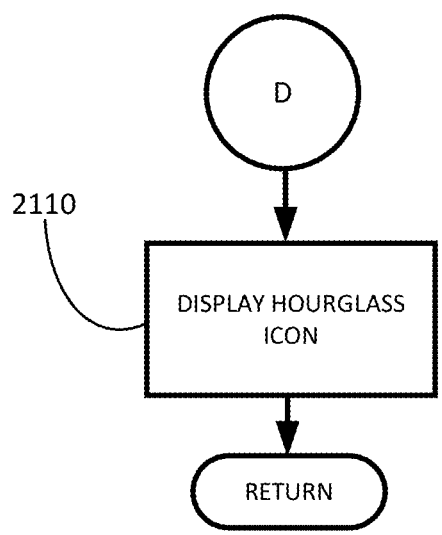

Accordingly, the agent GUI module performs the operation found in FIG. 21 to provide such an indication to the agent. Therefore, turning briefly to FIG. 21, the agent GUI module in this particular instance displays an hourglass icon 1295 over the indicator for the session that has been reserved for the assembly in Operation 2110. Here, the agent GUI determines from the information received along with the indication that an assembly's suspension has expired is the suspended assembly that is applicable and the session that has been reserved for the assembly so that the hourglass icon 1295 is placed on the correct indicator on the agent's GUI.

Returning again to FIG. 17, if instead the agent GUI module determines the agent has not suspended an assembly, then the agent GUI module determines whether a new session has been assigned to the agent in Operation 1740. For instance, in particular embodiments, the communications handler 250 may send an indication to the agent GUI module that a new communication session has been assigned to the agent. Information may be sent along with the indication such as the channel of communication being used for the session and whether or not the session is part of an assembly the agent is already handling.

Figure 22:
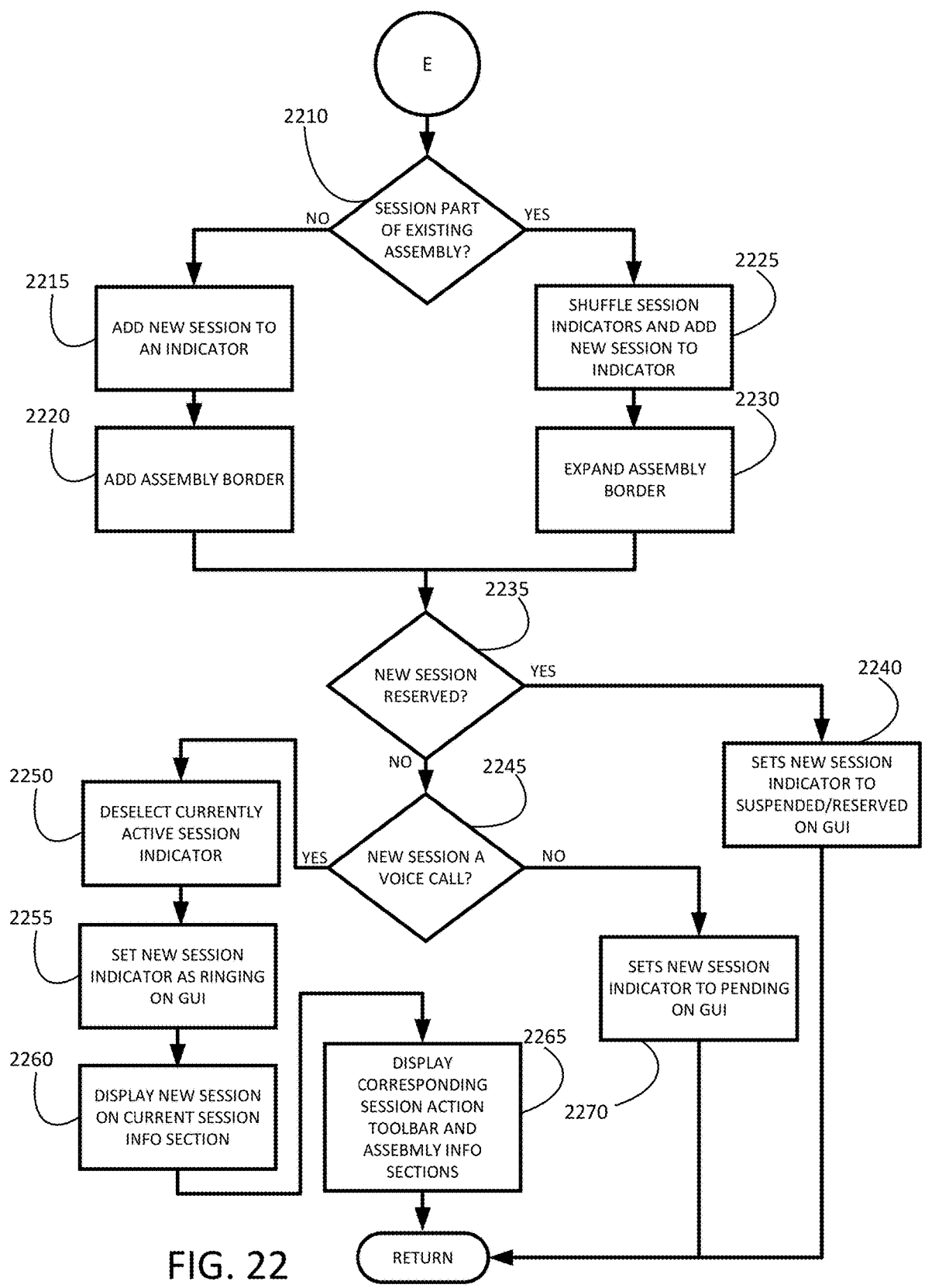

Accordingly, the agent GUI module performs the operations found in FIG. 22. Turning to FIG. 22, the agent GUI module determines from the information received along with the indication of the new session whether the new session is a part of an existing assembly the agent is currently handling in Operation 2210. If not, then the agent GUI module adds the new session to a CSI 1010, 1015, 1020, 1025, 1030, 1035 shown on the GUI 1000 in Operation 2215. For instance, in particular embodiments, the listing of CSIs 1010, 1015, 1020, 1025, 1030, 1035 provided on the sessions and assemblies identifier section 1140 of the GUI has the first CSI 1010 reserved for a voice call session and the remaining CSIs 1015, 1020, 1025, 1030, 1035 reserved for non-voice communication sessions. Therefore, if the new communication session is for a chat session, then the agent GUI module adds the new session to the last non-voice CSI 1035 in the listing that is not representing a session that is currently being engaged or is reserved. In addition, the GUI module adds an assembly border around the CSI 1035 for the new session in Operation 2120 to show the new communication session is part of a new assembly.

However, returning to Operation 2210, if the agent GUI module instead determines the new session is part of an existing assembly the agent is currently handling, then the agent GUI module shuffles the CSIs around in Operation 2225 so that the new communication session can be added to a CSI 1010, 1015, 1020, 1025, 1030, 1035 to show the session is part of an existing assembly. For example, the agent may be handling a voice call session and the party he is conversing with on the voice call sends the agent some account information via an email. Here, the email is routed to the agent as a new communication session that is associated with the same assembly as the voice call. In addition, the agent may be conducting a chat session with another party that is part of a different assembly than the voice call. Therefore, the CSIs 1010, 1015, 1020, 1025, 1030, 1035 may show the two current communication sessions in the sessions and assemblies identifier section 1140 of the GUI 1000 in descending order with a first CSI 1010 representing the voice call and the second CSI 1015 representing the chat session. When the new session is received for the email, the agent GUI module then shifts (shuffles) the chat session down one to the third CSI 1020 and adds the new session for the email to the second CSI 1015 so that the CSIs 1010, 1015 for the voice call session and the email session are shown together. Accordingly, the agent GUI module then expands the border for the assembly in Operation 2230 around the two CSIs 1010, 1015 for the voice call session and the email session to shown the two sessions are part of the same assembly.

At this point, the agent GUI module determines whether the new session is reserved in Operation 2235. Such a determination is made to identify the new session is part of an assembly that has been suspended. Thus, if the state of the new session is reserved, then the agent GUI module sets the new CSI to "SUSPENDED/RESERVED" in Operation 2240.

However, if the agent GUI module determines the new session is not reserved, then the agent GUI module determines whether the new session is for a voice call in Operation 2245. Such a determination is made because a voice call is treated slightly different in various embodiments from a non-voice communication in that information for a voice call session is automatically displayed in the current session information section 1130 of the GUI 1000 to the agent upon the agent being connected to a voice call (unless the voice call is reserved for a suspended assembly). Therefore, if the new communication session is for a voice call, then the agent GUI module first deselects the currently active CSI in Operation 2250 and then sets the CSI for the new session to ringing in Operation 2255. In addition, the agent GUI module displays information for the new session on the current session information section 1130 of the GUI 1000 in Operation 2260.

In particular embodiments, although not shown in FIG. 22, the agent GUI module may carry out this particular operation by first determining whether the agent is actively engaged in a communication with a party before updating the current session information section 1130 with information for the voice call. For example, the agent may also be involved in a chat session with another party and may be actually typing a response chat message to the party when the voice call is received. Therefore, in this example, the agent GUI module may first determine whether the agent is actively typing a chat message for the chat session when the voice call is assigned to the agent and may wait to change the current session information section 1130 to display information for the voice call session once the agent has completed typing his chat message and has sent it.

Finally, the agent GUI module displays the corresponding session action toolbar and assembly information sections 1110, 1120 in Operation 2265. At this point, the agent can engage the party by conversing on the voice call and view the relevant information on the GUI 1000 for the voice call session.

Returning to Operation 2245, if the agent GUI module determines the new session is not for a voice call, then the new session must be for a non-voice communication. Accordingly, the agent GUI module sets the CSI 1010, 1015, 1020, 1025, 1030, 1035 to pending for the new session on the GUI 1000 in Operation 2270. Thus, the agent is made aware of the new session and that the new session is waiting for his attention/acknowledgement. At this point (returning to FIG. 17), the agent GUI module returns to the beginning of the process flow to monitor for more messages.

Suspend Assembly Module

Figure 23:
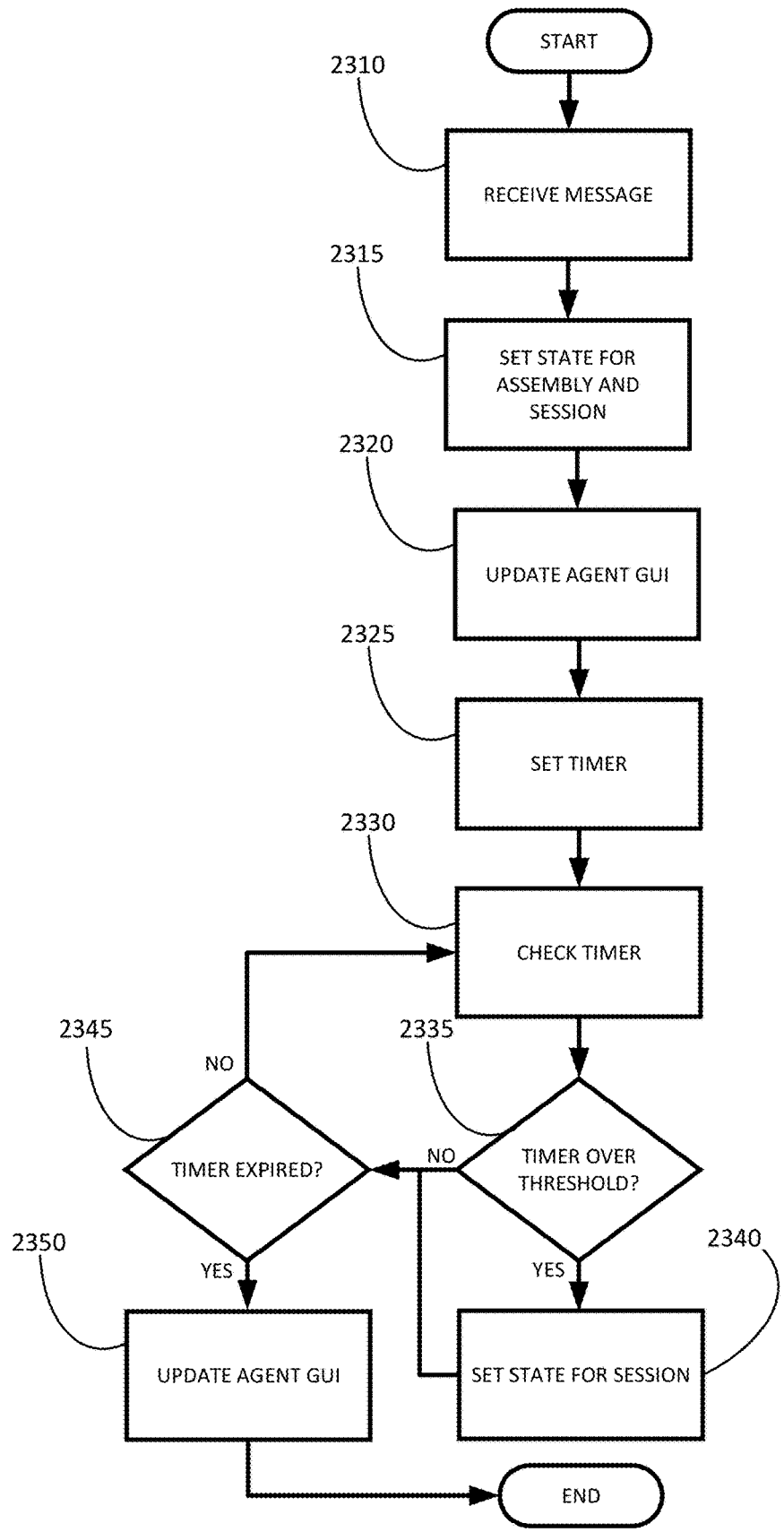
FIG. 23 illustrates a process flow for managing a suspended assembly in accordance with various embodiments of the present invention.

Turning now to FIG. 23, additional details are provided regarding a process flow for handling an assembly that has been suspended according to various embodiments of the invention. In particular, FIG. 23 is a flow diagram showing a suspend assembly module for performing such functionality according to various embodiments of the invention. For example, the flow diagram shown in FIG. 23 may correspond to operations carried out by one or more processors in one or more components, such as, for example, an agent's computing device 260a-260c described above, as it executes the suspend assembly module stored in the component's volatile and/or nonvolatile memory.

In particular embodiments, an agent may bring up a pop-up screen, such as the screen 1565 shown in FIG. 15B, that can be used to suspend an assembly. The agent enters a time delay to suspend the assembly in a field 1575 provided on the screen 1565, selects a channel of communication from a dropdown 1570 to be used to resume the assembly, and selects the "Suspend" button 1580 on the screen 1565. As a result, the suspended assembly module is invoked and a message is provided to the module.

Thus, turning now to FIG. 23, the suspend assembly module receives the message in Operation 2310. Here, in this particular embodiment, the message identifies the assembly to be suspended along with the channel of communication to be used to resume the assembly and the time delay to suspend the assembly. Accordingly, the suspend assembly module sets the state for both the assembly and session in Operation 2315.

In particular embodiments, this operation is carried out by the suspend assembly module invoking the set state module (shown in FIG. 9) and providing the necessary information in a message to the set state module. In turn, the set state module sets the state for the assembly to suspended and creates a new session for the channel of communication to be used to resume the assembly and sets the state for the new assembly to reserved.

Next, the suspend assembly module updates the agent's GUI to show the assembly as suspended and the created session as reserved on the GUI in Operation 2320. Here, the suspend assembly module invokes the agent GUI module (shown in FIG. 17) in particular embodiments and the agent GUI module updates the agent's GUI to display the information for the assembly accordingly.

At this point, the suspend assembly module sets a timer based on the time delay entered by the agent in Operation 2325. Accordingly, the timer counts down to the time delay and the suspend assembly module checks the timer in Operation 2330.

In various embodiments, the suspend assembly module initially determines whether the timer is within a threshold from the delay time in Operation 2335. As the reader may recall, the contact center may wish to ensure the agent will have availability to place the communication for the reserved session once the time delay has expired. Therefore, in particular embodiments, the contact center may wish to place the reserved session from a state of reserved to a state of ringing/attention needed (depending on the channel of communication) so that other communication sessions are not assigned to the agent that may interfere with the agent contacting the party at the appropriate time to resume the suspended assembly.

For example, the contact center may set a threshold of five minutes. Thus, in Operation 2235, if the suspend assembly module determines the time is within five minutes of the timer expiring, then the suspend assembly sets the state for the reserved session to ringing/attention needed accordingly in Operation 2340. Again, the suspend assembly module may invoke the set state module to accomplish this operation.

At this point, the suspend assembly module determines whether the timer has expired in Operation 2345. If so, then the suspend assembly module updates the agent's GUI to indicate that it is time to resume the assembly in Operation 2350. For instance, in particular embodiments, the suspend assembly module invokes the agent GUI module to update the agent's GUI to show an hourglass icon 1295 over the indicator for the reserved session. As a result, the agent is provided a visual indicator that he or she should take steps to resume the assembly.

It should be noted that in particular embodiments, the agent is not always required to enter a time delay. For instance, the agent may be suspending an assembly in which the party may be contacting the contact center (agent) to resume the assembly instead of the agent contacting the party. Therefore, the agent may not enter a time delay since he or she is not the one initiating the communication to resume the assembly. Such a situation may be handled differently depending on the embodiment. For instance, in some embodiments, the suspend assembly module may not set the timer and therefore, the assembly remains suspended until the party contacts the agent. While in other embodiments, the suspend assembly module may still set the timer to some default value to ensure the assembly is not suspended indefinitely. For example, the suspend assembly module may set the timer for two hours. Therefore, in these instances, if the party has not contacted the agent (or the agent has not contacted the party) before the two hours has expired, the suspend assembly module performs Operations 2330-2350 accordingly. As a result, the agent then has the option of either trying to contact the party and resuming the assembly or terminating the assembly.

Exemplary Processing Device Architecture

Figure 24:
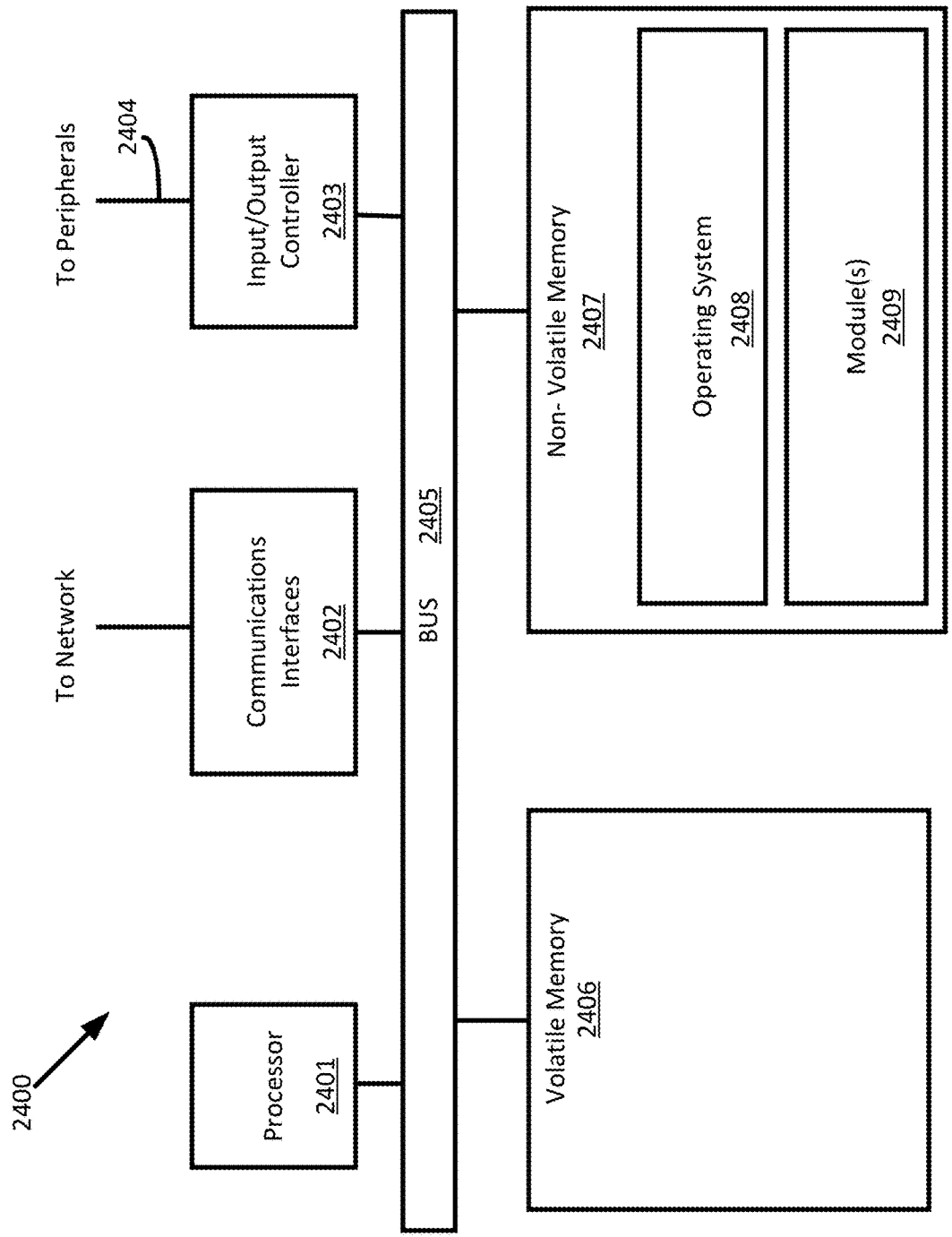
FIG. 24 is an exemplary schematic diagram of a processing component used in various embodiments of the contact center architecture to practice the technologies disclosed herein.

As discussed in conjunction with FIG. 2, the contact center architecture 200 may comprise various components. Accordingly, FIG. 24 is an exemplary schematic diagram of a processing component 2400 that may be used in various embodiments of the contact center architecture 200 to practice the technologies disclosed herein such as, for example, the communications handler 250, the email server 235, the text gateway server 240, the web server 245, and/or an agent's computing device 260a-260c. In general, the term "processing component" may be exemplified by, for example, but without limitation: various types of computers, servers, blades, gateways, switches, and the like, as well as any combination of devices or entities adapted to perform the functions described herein.

As shown in FIG. 24, the processing component 2400 may include one or more processors 2401 that may communicate with other elements within the processing component 2400 via a bus 2405. The processor 2401 may be implemented as one or more complex programmable logic devices ("CPLD"), microprocessors, multi-core processors, digital signal processors ("DSP"), system-on-a-chip ("SOC"), co-processing entities, application-specific integrated circuits ("ASIC"), field programmable gate arrays ("FPGA"), programmable logic arrays ("PLA"), hardware accelerators, other circuitry, or the like.

In one embodiment, the processing component 2400 may also include one or more communication interfaces 2402 for communicating data via the local network with various external devices, such as other components of FIG. 2. Depending on the embodiment, communication may be via wired, optical, or wireless networks (or a combination thereof). The communication may use a variety of data transmission protocols, such as fiber distributed data interface (FDDI), Ethernet, asynchronous transfer mode ("ATM"), or frame relay.

The processing component 2400 may further include an input/output controller 2403 that may communicate with one or more input devices or peripherals using an interface 2404, such as, but not limited to: a keyboard, a mouse, a touch screen/display input, microphone, pointing device, etc. The input/output controller 2403 may also communicate with output devices or peripherals, such as displays, printers, speakers, headsets, banner displays, etc.

The processor 2401 may be configured to execute instructions stored in volatile memory 2406, non-volatile memory 2407, or other forms of computer-readable storage media accessible to the processor 2401. The volatile memory 2406 may comprise various types of memory technologies, including, but not limited to: random access memory ("RAM"), dynamic random access memory ("DRAM"), static random access memory ("SRAM"), and other forms well known to those skilled in the art. The non-volatile memory 2407 may comprise various technologies, including, but not limited to: storage media such as hard disks, floppy disks, read only memory ("ROM"), programmable read only memory ("PROM"), electrically erasable read only memory ("EPROM"), flash memory, and other forms well known to those skilled in the art.

The non-volatile memory 2407 may store program code and data, which also may be loaded into the volatile memory 2406 at execution time. Specifically, the non-volatile memory 2407 may store one or more program modules 2409, such as the handle communication module, the agent capacity module, the set state module, the agent GUI module, and/or the suspend assembly module described above containing instructions for performing the processes and/or functions associated with the technologies disclosed herein, and/or operating system code 2408. In addition, these program modules 2409 may also access, generate, or store data 2410, in the non-volatile memory 2407, as well as in the volatile memory 2406. The volatile memory 2406 and/or non-volatile memory 2407 may be used to store other information including, but not limited to: records, applications, programs, scripts, source code, object code, byte code, compiled code, interpreted code, machine code, executable instructions, or the like. These may be executed or processed by, for example, the processor 2401 and/or may form a part of, or may interact with, the program modules 2409.

The technologies described herein may be implemented in various ways, including as computer program products comprising memory storing instructions causing a processor to perform the operations associated with the above technologies. The computer program product may comprise a tangible non-transitory computer readable storage medium storing applications, programs, program modules, scripts, source code, program code, object code, byte code, compiled code, interpreted code, machine code, executable instructions, and/or the like (also referred to herein as executable instructions, instructions for execution, program code, and/or similar terms). Such non-transitory computer readable storage media include all the above identified media (including volatile and non-volatile media), but does not include a transitory, propagating signal. Non-volatile computer readable storage medium may specifically comprise: a floppy disk, flexible disk, hard disk, magnetic tape, compact disc read only memory ("CD-ROM"), compact disc compact disc-rewritable ("CD-RW"), digital versatile disc ("DVD"), Blu-ray™ disc ("BD"), any other non-transitory optical medium, and/or the like. Non-volatile computer-readable storage medium may also comprise read-only memory ("ROM"), programmable read-only memory ("PROM"), erasable programmable read-only memory ("EPROM"), electrically erasable programmable read-only memory ("EEPROM"), flash memory, and/or other technologies known to those skilled in the art.

CONCLUSION

Many modifications and other embodiments of the concepts and technologies set forth herein will come to mind to one skilled in the art having the benefit of the teachings presented in the foregoing descriptions and the associated drawings. Therefore, it is to be understood that embodiments other than the embodiments disclosed herein are intended to be included within the scope of the appended claims. Although specific terms may be employed herein, they are used in a generic and descriptive sense only and not for purposes of limitation.

The invention claimed is:

1. A method for transitioning an interaction taking place between an agent in a contact center and a party from a first instance of communication associated with a first channel of communication to a second instance of communication associated with a second channel of communication comprising:
    establishing the first channel of communication between the agent and the party, causing creation of an instances data structure, a sessions data structure, and a communication assembly data structure all stored in a memory of a communications handler,
        whereby the communication assembly data structure is associated with the sessions data structure, the sessions data structure is associated with the instances data structure, and
    the instances data structure is associated with the first instance of communication;
    modifying the communication assembly data structure to reflect the second communication session identified in the sessions data structure, wherein modifying the communication assembly data structure occurs while the agent and the party are interacting over the first channel of communication and before the agent and the party interact over the second channel of communication;
    terminating the first communication session after modifying the communication assembly data structure and before the agent and the party interact over the second channel of communication;
    identifying the second communication session at the communications handler based on the communications handler processing the second communication instance associated with the party; and
    after identifying the second communication session:
        linking the second communication instance with the second communication session, and
        routing the second communication instance to the agent by the communications handler so that the agent can transition the interaction with the party over the second channel of communication.

2. The method of claim 1, wherein the first channel of communication is different than the second channel of communication.

3. The method of claim 1 further comprising:
    setting a state associated with the communication assembly data structure to "suspended" upon terminating the first communication session; and
    setting the state associated with the communication assembly data structure to "active" upon routing the second communication instance to the agent.

4. The method of claim 1, wherein the routing of the second communication instance to the agent comprises:
    determining a current number of communication sessions the agent is actively engaged in;
    determining a maximum number of communication sessions the agent is authorized to be actively engaged in; and
    routing the second communication instance to the agent by the communications handler upon determining the current number of communication sessions the agent is authorized to be actively engaged in is less than the maximum number of communication sessions the agent is actively engaged in.

5. The method of claim 1, wherein the routing of the second communication instance to the agent comprises:
    determining a proficiency level for the agent using the second channel of communication; and
    routing the second communication instance to the agent by the communications handler upon determining the proficiency level for the agent is greater than a predefined proficiency level for the second channel of communication.

6. The method of claim 1 further comprising:
    displaying an icon on a workstation used by the agent to alert the agent that the second communication instance has been routed to the agent, wherein the icon is configured to display information related to the first communication instance on the workstation in response to the agent selecting the icon.

7. The method of claim 1, wherein identifying the second communication session at the communications handler comprises identifying the second communication session initiated as a result of an incoming communication from the party at the communications handler.

8. A non-transitory, computer-readable medium comprising computer-executable instructions for transitioning an interaction taking place between an agent in a contact center and a party from a first instance of communication associated with a first channel of communication to a second instance of communication associated with a second channel of communication, that when executed, cause at least one computer processor to:
    establish the first channel of communication between the agent and the party, thereby creating an instances data structure, a sessions data structure, and a communication assembly data structure all stored in a memory of a communications handler, whereby the communication assembly data structure is associated with the sessions data structure, the sessions data structure is associated with the instances data structure, and the instances data structure is associated with the first instance of communication;

modify the communication assembly data structure to reflect the second communication session identified in the sessions data structure, wherein the communication assembly data structure is modified while the agent and the party interact over the first channel of communication and before the agent and the party interact over the second channel of communication;

terminate the first communication session after modifying the communication assembly data structure and before the agent and the party interact over the second channel of communication;

identify the second communication session at the communications handler based on the communications handler processing the second communication instance associated with the party; and after identifying the second communication session:
link the second communication instance with the second communication session, and
route the second communication instance to the agent by the communications handler thereby transitioning the interaction of the agent with the party to the second channel of communication.

9. The non-transitory computer readable medium of claim 8, wherein the first channel of communication is different than the second channel of communication.

10. The non-transitory computer readable medium of claim 8, wherein the instructions when executed further cause the at least one computer processor to:
set a state associated with the communication assembly data structure to "suspended" upon terminating the first communication session; and
set the state associated with the communication assembly data structure to "active" upon routing the second communication instance to the agent.

11. The non-transitory computer readable medium of claim 8, wherein the instructions when executed further cause the at least one computer processor to:
determine a current number of communication sessions the agent is actively engaged in;
determine a maximum number of communication sessions the agent is authorized to be actively engaged in; and
route the second communication instance to the agent by the communications handler upon determining the current number of communication sessions the agent is authorized to be actively engaged in is less than the maximum number of communication sessions the agent is actively engaged in.

12. The non-transitory computer readable medium of claim 8, wherein the instructions when executed further cause the at least one computer processor to:
determine a proficiency level for the agent using the second channel of communication; and
route the second communication instance to the agent by the communications handler upon determining the proficiency level for the agent is greater than a predefined proficiency level for the second channel of communication.

13. The non-transitory computer readable medium of claim 8, wherein the instructions when executed further cause the at least one computer processor to:

display an icon on a workstation used by the agent to alert the agent that the second communication instance has been routed to the agent, wherein the icon is configured to display information related to the first communication instance on the workstation in response to the agent selecting the icon.

14. The non-transitory computer readable medium of claim 8, wherein the instructions when executed further cause the at least one computer processor to:
identify the second communication session initiated as a result of an incoming communication from the party at the communications handler.

15. A communications handler for transitioning an interaction taking place between an agent in a contact center and a party from a first instance of communication associated with a first channel of communication to a second instance of communication associated with a second channel of communication comprising a computer processor configured to:
establish the first channel of communication between the agent and the party, thereby creating an instances data structure, a sessions data structure, and a communication assembly data structure all stored in a memory of a communications handler,
whereby the communication assembly data structure is associated with the sessions data structure, the sessions data structure is associated with the instances data structure, and
the instances data structure is associated with the first instance of communication;
modify the communication assembly data structure to reflect the second communication session identified in the sessions data structure, wherein the communication assembly data structure is modified while the agent and the party interact over the first channel of communication and before the agent and the party interact over the second channel of communication;
terminate the first communication session after modifying the communication assembly data structure and before the agent and the party interact over the second channel of communication;
identify the second communication session at the communications handler based on the communications handler processing the second communication instance associated with the party; and
after identifying the second communication session:
link the second communication instance with the second communication session, and
route the second communication instance to the agent by the communications handler thereby transitioning the interaction of the agent with the party to the second channel of communication.

16. The system of claim 15, wherein the first channel of communication is different than the second channel of communication.

17. The system of claim 15, wherein the computer processor is further configured to:
set a state associated with the communication assembly data structure to "suspended" upon terminating the first communication session; and
set the state associated with the communication assembly data structure to "active" upon routing the second communication instance to the agent.

18. The system of claim 15, wherein the computer processor is further configured to:
determine a current number of communication sessions the agent is actively engaged in;

determine a maximum number of communication sessions the agent is authorized to be actively engaged in; and route the second communication instance to the agent by the communications handler upon determining the current number of communication sessions the agent is authorized to be actively engaged in is less than the maximum number of communication sessions the agent is actively engaged in.

19. The system of claim 15, wherein the computer processor is further configured to:

determine a proficiency level for the agent using the second channel of communication; and route the second communication instance to the agent by the communications handler upon determining the proficiency level for the agent is greater than a predefined proficiency level for the second channel of communication.

20. The system of claim 15, wherein the computer processor is further configured to:

display an icon on a workstation used by the agent to alert the agent that the second communication instance has been routed to the agent, wherein the icon is configured to display information related to the first communication instance on the workstation in response to the agent selecting the icon.

* * * * *